United States Patent [19]

van Vliembergen

[11] Patent Number: 5,068,789
[45] Date of Patent: Nov. 26, 1991

[54] METHOD AND MEANS FOR GRAMMATICALLY PROCESSING A NATURAL LANGUAGE SENTENCE

[75] Inventor: Eduardus J. W. van Vliembergen, Venlo, Netherlands

[73] Assignee: OCE-Nederland B.V., Netherlands

[21] Appl. No.: 407,564

[22] Filed: Sep. 15, 1989

[30] Foreign Application Priority Data

Sep. 15, 1988 [NL] Netherlands .................. 8802271
Apr. 26, 1989 [NL] Netherlands .................. 8901050

[51] Int. Cl.5 .................. G06F 15/38; G06F 1/00
[52] U.S. Cl. .................. 364/419; 364/274.8; 364/DIG. 2
[58] Field of Search .................. 364/419, 900 MS File, 364/200 MS File, 917.92, 274.8; 400/83, 63; 382/46, 56

[56] References Cited

U.S. PATENT DOCUMENTS

| | | | |
|---|---|---|---|
| 4,862,408 | 8/1989 | Zamora | 364/419 |
| 4,864,501 | 9/1989 | Kucera et al. | 364/419 |
| 4,868,750 | 9/1989 | Kucera et al. | 364/419 |
| 4,887,212 | 12/1989 | Zamora et al. | 364/419 |

OTHER PUBLICATIONS

J. J. Robinsion, Diagram: A Grammar Fox Dialogues, Communications of the Association for Computing Machinery, vol. 25 (Jan./82), No. 1, pp. 27–47.
Machine Translation Technology: On the Way to Market Introduction, Siemens Reviews, vol. 54, No. 6, Nov./Dec. (1987).
Steps Toward an Actor–Oriented Integrated Parser, Proceeding of the International Conference of Fifth Generation of Computer Systems 1984, Tokyo, Japan, Nov. 6–9, 1984 (Icot, North Holland).

*Primary Examiner*—Allen R. MacDonald
*Assistant Examiner*—Xuong M. Chung
*Attorney, Agent, or Firm*—Reed Smith Shaw & McClay

[57] ABSTRACT

A computer method of parsing a sentence into sentence parts to be described with functional indications, by means of lexicalized word units. The method includes determining, for each word unit and for each constituent, the functional word category within the constituent or a new constituent and, for each constituent, describing a step relating to closure of the constituent, and allocating a functional label to that constituent. The current constituent is then tested against rules relating to the context of the words and/or subsidiary constituents, and probability factor allocated to the sentence representation is reevaluated. Each sentence representation having a probability factor above a certain threshold value is then selected. A grammatically incorrect sentence already parsed can be corrected by selecting the grammatically incorrect constituent within that sentence and changed by reference to rules stored in the computer.

18 Claims, 26 Drawing Sheets

METHOD AND MEANS FOR GRAMMATICALLY PROCESSING A NATURAL LANGUAGE SENTENCE

FIELD OF THE INVENTION

The invention relates to a method of and means for grammatically processing a sentence composed in natural language, which method includes the parsing of the sentence into sentence parts to be described with functional indications. Parsing is by means of word units which are lexicalized in accordance with verbal categories and application-directed categories.

BACKGROUND OF THE INVENTION

Processing natural language for numerous applications is generally well known. Recent interest in processing has been due in large part by computer applications such as language translation, grammatical correction of sentences as part of word processing systems, and the like. For example, Machine Translation Technology: On the Way to Market Introduction, Siemens Review, Vol. 54, No. 6 Nov/Dec (1987) describe research into machine translation of text in several languages. Also, the use of language parsing in processing natural language is well known. Many parsing techniques have been described, see for example, J. J. Robinson, Diagrams: A Grammar for Dialogues, Communication of the Association for Computing Machinery, Vol. 25, No. 1, Jan. 1982, pp. 27-47, which discloses an interactive filter procedure, a grammar core, a weakening factor, a probability factor and a threshold mechanism; and K. Vehara, et al., Steps Toward an Actor-Oriented Integrated Parser, Proceeding of the International Conference of Fifth Generation of Computer Systems 1984, Tokyo, Japan, Nov. 6-9, 1984 (ICOT, North Holland).

Methods of grammatically processing a sentence using parsers are described in: Allen, James; Natural Language Understanding. (The Benjamin/Cummings Publishing Company Inc., Menlo Park, U.S.A. 1987.)

The parsers there described operate according to an algorithm based on a rewriting mechanism. This mechanism requires that the parsers carry out parsing by reference to a large number of rewriting rules. These rewriting rules make a connection between a group of words and/or sentence constituents, on the one hand, and a parent constituent, i.e. a constituent dominating this group, on the other hand.

The number of rewriting rules depends on the extent of the description mechanism to be used and forming the basis of the parser. The description mechanism is in turn determined by the syntax and morphylgy of the language which imposes limitations on the parser in respect of its ability to arrive at a solution to the parsing in the event of a non-grammatical input. Only by including a very large number of rewriting rules in the parser is it possible to parse incorrectly composed and infrequently used sentence constructions. This in turn has the adverse effect of requiring a great deal of memory space for the rewriting rules in the computer on which the parser runs, and, at the same time requiring much longer time to parse such a sentence. In addition, under such conditions it is very difficult to detect nongrammatical expressions. Accordingly, it is the object of the invention to obviate these disadvantages and to provide a sentence processing method and means which detects a high number of nongrammatical expressions.

SUMMARY OF THE INVENTION

The invention is based on the principle of associating the parsing with rules ("right associate grammar rules") in order to fit a word within the existing constituent, or a constituent to be newly formed, in the sentence part representation already obtained, with the allocation of a certain functionality at word level (functional word category) based on at least one verbal category associated with that word, and rules ("constituent closure grammar rules") for searching the possibility of closing a constituent with the allocation of a functionality which may or may not be provisional, at constituent level (functional constituent category). A probability factor is used for the sentence being updated during the parsing procedure by reference to a search for a connection between the various words and/or constituents within one and the same constituent level. By means of the probability factor, it is possible to select the most obvious sentence representation.

According to the invention, the method of grammatically processing is generally characterized by steps to be performed separately for each word unit from the sentence, these steps comprise:

a. Determining, for each word unit and for each constituent, the functional word category within the constituent and/or within a constituent which is to be newly made, by referring to data concerning the verbal category of the relevant word unit and the category of the constituent, b. Describing for each constituent by reference to data concerning the category of the constituent and the category of the constituent dominating the said constituent, a step relating to closure of the constituent, and allocating a functional label, which may or may not be provisional, to a constituent which is then to be closed, and c. Testing of the current constituent against regulations, based on grammar rules, concerning the context of the words and/or constituents within the constituent in at least one of the two latter steps and, if necessary, revaluating a probability factor assigned to the sentence representation, and selecting each sentence representation whose probability factor is above a certain threshold value.

The above method of grammatically processing a sentence may be completed advantageously with measures for correcting a grammatically incorrect sentence. For this purpose the steps of the method of grammatically processing such a sentence has to be supplemented by the following step:

d. Selecting the grammatically incorrect constituent within the sentence and changing this constituent by referring to regulations based on grammar rules.

A model grammar or exemplary grammar built up by a collection of selected grammar rules for defining precisely the central, agreed-upon grammatical structures of a language, is often called a core grammar.

In one embodiment of the invention, the parser for grammatically processing a sentence is a parser with an external grammar (syntax directed parser). In this case, the grammar rules are maintained outside the actual program and stored in memory parts or memory modules. This offers the possibility of changing the grammatical content outside the program. Also, by simply changing the contents of the memory or memory modules, the parser can be made suitable for another natural language. The grammar core is preferably structured to process a large number of possible structures with a limited number of rules.

Also, in the event of a nongrammatical input, this parser is generally capable of reaching a solution and in most cases, indicating what type of error has been made. This makes the parser suitable for use, for example, within an editor. Accordingly, the parser and the basic principles of this parser can form the bases for a program for correcting incorrect sentences. Additionally, it can be used for correcting a text with inconsistent word usage or to carry out a different choice of word in a text.

In addition to a parser with an external grammar it is, of course, possible to use a parser for grammatic processing having an internal or integrated grammar (syntax embedded parser) by accommodating the grammar rules within the parser itself. This has the advantage of enhanced parsing speed. Other advantages of the invention will become apparent from a perusal of the following presently preferred embodiments taken in connection with the accompanying drawings.

PRESENTLY PREFERRED EMBODIMENTS

As will be explained in describing the invention, the parsing phase and, if necessary, the correcting phase, of a sentence undergoing grammatic processing will occur using an exemplary grammar or core grammar, which is added in table form in English as well as in dutch language.

For the purpose of this invention, a parser provides the means of converting a sentence composed in natural language into a syntactic representation by means of a formalism in which the relationships between the various entities are expressed. Such formalism is based on the idea that it is possible to represent the substantive sentence parts (constituents) by means of a hierarchical structure, such as a branching network (tree structure). Strictly speaking, the parser input does not comprise a sentence line, but a series of words obtained by lexicalization of the sentence. The process described hereafter can be executed using a general purpose computer such as a Sun Workstation 3/60 made by Sun Microsystems, Inc., U.S.A. Although a number of programming languages can be used in executing this process in a computer, the COMMON LISP programming language is preferred.

Figure 1:
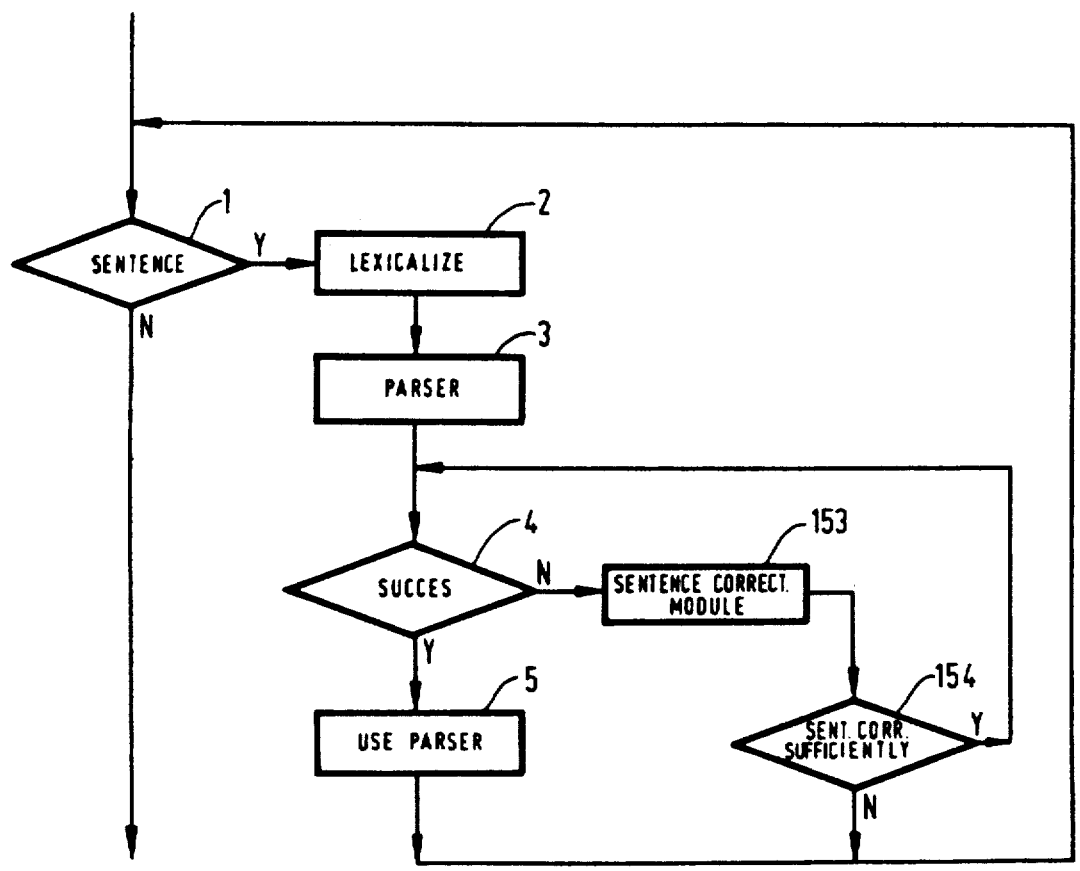
FIG. 1 is a flow diagram showing a general overview of the method of the invention used in grammatically processing a text.

As shown in FIG. 1, this means that each sentence presented at program phase 1 must first be lexicalized at program phase 2 before parsing of the sentence by the parser which takes place in program phase 3. In the lexicalization of a sentence, the associated lexical information of each word relating to the possible verbal categories and the application-directed categories is searched or generated by means of a lexical memory which forms part of the computer memory. For example, it may be present on a memory disk and this information is stored by means of one or more word structure sin a word memory, which also forms part of the computer memory.

The results of the lexicalization process of a word unit in respect of the application-directed categories will be grouped hereinafter under the term "Features". The description will include a discussion of why there may be said to be more than one word structure, but the term word structure will first be explained in detail.

A word structure is a composition of data constituents associated with a word. The data constituents being assigned a structure having a number of memory fields. The word structure comprises the following fields: a Category field, a Command field, a String field and a Features field.

The Category field contains the word category found in the lexical memory. The following word designations are illustrative and depend on the grammatical tables and dictionary used: article, noun, pronoun, verb, preposition, conjunction, adjective or adverb.

The Command field is in the first instance empty but is filled by the parser during parsing. The meaning of the Command field will be explained in connection with the description of the constituent structure, where there is also a similar Command field.

The String field is filled with a string representation of the Word, i.e., a linear sequence of the elements of the Word. The Features field contains the other Word features, i.e. those word features which were obtained during the lexicalization process from lexical memory, but which were not included in the Category field. The word features included in the Features field are of a functional nature. The following designations are illustrated and depend on the grammatical tables and dictionary used: definite, indefinite, male, female, neutral, proper nominative, and not-nominative.

The above will be explained with reference to two examples: In the case of the Dutch word "huis" (English: "house") the following are entered in the Category field" 'noun'; in the Command field: "NIL"; in the String field: "house" and in the Features field: "sing 3" and "neuter".

In the English language the word "house" corresponding to the Dutch word "huis", has the similar word structure with the exception of the Features field, in which "neuter" is replaced by "neutral".

Such a representation of a word structure has the result that a word such as the Dutch word "regent" is given a Category field with the entry "verb" and also a Category field with the entry "noun" with a separate Features field for each Category field. As a similar example in the English language it is possible to use the word "saw", to which three word structures are connected: one having the category field "noun" and two having the category field "verb".

Since, therefore, a Word may occur in a number of word categories, and also, as a result of non-unambiguous relationships between Constituents, a plurality of sentence structures are feasible between there sentence parts. This approach results in a plurality of forms of tree structure, and hence a plurality of syntactic representations of the parsed sentence. The parser attempts to accommodate each word structure of the current word within each open constituent structure. This means that the parsing speed falls off if there are many representations present.

Since, however, not all representations will subsequently prove suitable, it is the object of the invention to examine how one or more less attractive forms of representation of sentence part structures can be eliminated in the interim period, i.e. during the operative phase of the parser. The starting point for this is the fact that after each phase in which a word is added to the existing form of representation, the Constituent involved therein is subjected to certain syntactic rules, and the initial probability factor assigned to the Constituent is lowered in accordance with a set of individual correction factors, on the basis of certain error detections, and then the corrected probability factor is tested against a certain threshold value. All forms of representation of Constituents having a probability factor less than the threshold value can be eliminated then as being "less probable". This method is then repeated to enable the next word to be taken into the representation structure.

An action of this kind may take place both directly after inclusion of a word in an existing or new constituent and also after a subsequent examination as to the closure of that constituent. In the case of the parser to be described here, a filter action of this kind will take place in both situations.

Although the lexicalization as described here takes place before the actual parsing, so that the parsing process does not start until all the words have been lexicalized, it is also possible to lexicalize a word and then parse that word, to lexicalize the next word—in the interim period as far as possible—and then parse that, and so on. An advantage of such an approach is that it is possible to start parsing a sentence while a user is still inputting the sentence (real time parsing].

In the flow diagrams of a presently preferred embodiment described hereinafter, however, the lexicalization taken as a basis precedes the actual parsing process. The parser is called up after the lexicalization. If the parser successfully finds an analysis at step 4 (Y), FIG. 1, this analysis can be used in the remainder of the program (step 5). This may be a tree drawing program, in which a graphic representation of the parsing found is drawn, an editor, an indexing and retrieval system, and so on, after which it is possible to proceed with the next sentence at step 1. If, however, step 4 does not yield a usable result (N), then the parser has been unsuccessful in finding a good analysis This is equivalent to the sentence being very ungrammatical. If necessary some action can be taken, such as a correction phase for this sentence, whereupon the next sentence can be processed.

Before starting the actual description of the parser (see step 3, FIG. 1), it is important to understand the Constituent structure. The Constituent structure is a set of data constituents relating to a part of a sentence and associated with the following memory fields: Category field, Command field, Members field, Features field, Stack field, Violations field and a Probability field.

The Category field is reserved for information concerning the category of the constituent. In the example grammar must include the following sentence parts inter alia: main clause, co-ordinate clause or subordinate clause (sentence, abbreviated to S), the noun phrase or part of a sentence (noun phrase, abbreviated to NP), the prepositional group or part of a sentence (Prepositional phrase, abbreviated to PP) and the adjectival/adverbial phrase (abbreviation AP). The Category field initially contains the designation NIL, but during the parsing process it will be filled in with the information concerning the constituent. The Command field is the field which, after the parsing operation, contains address information (pointer) concerning the Parent Constituent, i.e. the Constituent dominating the present constituent. The Members field is reserved for information concerning one or more combinations—occurring in pairs—of the functional label associated with a Word or Constituent structure belonging to that constituent, and also the address information concerning the associated Word or Constituent structure. Generally, a Constituent can be built up from a number of Word structures and/or Constituent structures.

The functional labels used in the example grammar are, inter alia, as follows:
Subj : Subject.
Indobj. : Indirect Object.
Obj : Object.
Smod : Sentence Modification or Adverbial Modification.
Comp : Complement.
Pred : Predicate.
fNP : Functional NP, to be used as a provisional label which will subsequently be replaced by a final functional label at sentence level.
Nmod-a : A modification in connection with a noun in the form of an AP.
Nmod-s : A modification in connection with a noun in the form of an S.

Nmod-p : A modification in connection with a noun in the form of a PP.

Det : A determiner.

Head : Central element within an NP, PP qr AP.

Pobj : A part adjoining a preposition, embodied by an NP.

Amod : A modification of the main word of an AP.

Seq : A copulative, inclusive comma mark, with co-ordinative purpose between two sentence parts or sentences (sequencer). sentence parts.

Conj : One of the co-ordinated sentence parts.

The Features field is reserved for the information concerning the features associated with the Constituent. As soon as a Constituent is made with a specific Category, the Features field will be filled with the features associated with the category. It should be noted that in the case of a Word category, the Features field is provided with the features associated with that Word as found during the lexicalization process. During the parsing process, the Features field of the associated Constituent will, for each element (Word or Constituent) to be included in the associated Constituent, be adapted to the information associated with that element. The Stack field contains an enumeration of the functional labels, which are also given in the Members field of the Constituent. The Violations field contains information concerning all violation codes relating to incorrect grammar which have been made within the Constituent. This field is empty in the first instance.

The Probability field indicates the probability factor assigned to the occurrence of this Constituent. In the first instance this is "1", but for each incorrect grammar detected this value will fall by a value dependent upon the detected type of such incorrect grammar. By means of the Constituents it is possible to compile a parser tree. Each Constituent, of course, can in turn contain Constituents and/or Words. The Members field indicates not only the functional category but also the memory address information associated with the Constituent or Word structures. It is possible to go down into the parsing tree by reference to this information. Conversely, the Command field of a Constituent gives address information concerning its Parent constituent, i.e. the Constituent dominating the other Constituent, and this offers the possibility of climbing up the parser tree. It should be noted that Words cannot contain members, while the Command field of the highest Constituent (root) in the parsing tree contains no information (NIL).

As is already apparent to some extent from the Probability field, the parser works with probability factors and has a threshold which can be modified if required, with reference to which threshold all available structures are tested in respect of their probability factor. Only structures which have a probability factor greater than or equal to the threshold value are processed by the parser. In this way it is possible to parse grammatical and almost-grammatical sentences more quickly.

The operation of the parser is explained in detail in the following section; however, it is important to note here that the parser is based on the principle that a Word of a certain Category within a Constituent of a certain Category will in many cases have an unambiguously defined functional meaning within the Constituent. The same applies to Constituents within Constituents. The method of parsing is accordingly based on the fact that in most cases, it will be adequate to know the Categories of the Parent Constituent, on the one hand, and those of the Word or Constituent, on the other hand, in order to determine the function (functional category) or that Word or Constituent within the Parent Constituent.

A program associated with the parser is reproduced in the subsequent figures by means of a flow diagram in which the method of parsing a text in a computer is carried out. The complete parser will first be described in a fairly general manner. Two program parts, i.e. the "word right associate" and "closure", will be indicated only summarily, whereafter in a following part of the description these program parts will be explained in detail with reference to the detailed drawings. The method to be described can be divided up into two phases, the possible sentence representations being formed by a syntactic analyses in a first phase, which comprises the actual parsing process, and final functional labels being assigned in the second (additional) phase to constituents still having an indistinct functional character. Filter procedures suitable for the purpose will be discussed in both phases.

This method is performed for each word (with all its use functions) and is performed again whenever a subsequent word has to be included within the representation structure.

In the flow diagram shown in FIG. 1, the read-in phase of a sentence to enable the parser method to be performed starts at reference 1. In this phase the sentence for parsing is presented to the computer in known manner (e.g. by means of a keyboard), and the sentence is written word by word in the computer memory section which may be designated the word memory. The number of words ($k_{max}$) composing the sentence is computed for each entry. The applicable principle is that the words are separated from one another by spaces, tabulations and punctuation marks, and each punctuation mark is included in a word category. The number $k_{max}$ is also stored in the word memory.

The next phase (2) then takes place i.e. lexical description of all words from the sentence presented. In this phase, the word structures present in connection with each word are searched in the words of the sentence, this is done by means of a memory stage in the computer memory which may be designated the lexical memory, and in which a large collection of one or more possible word structures is stored.

Figure 2:
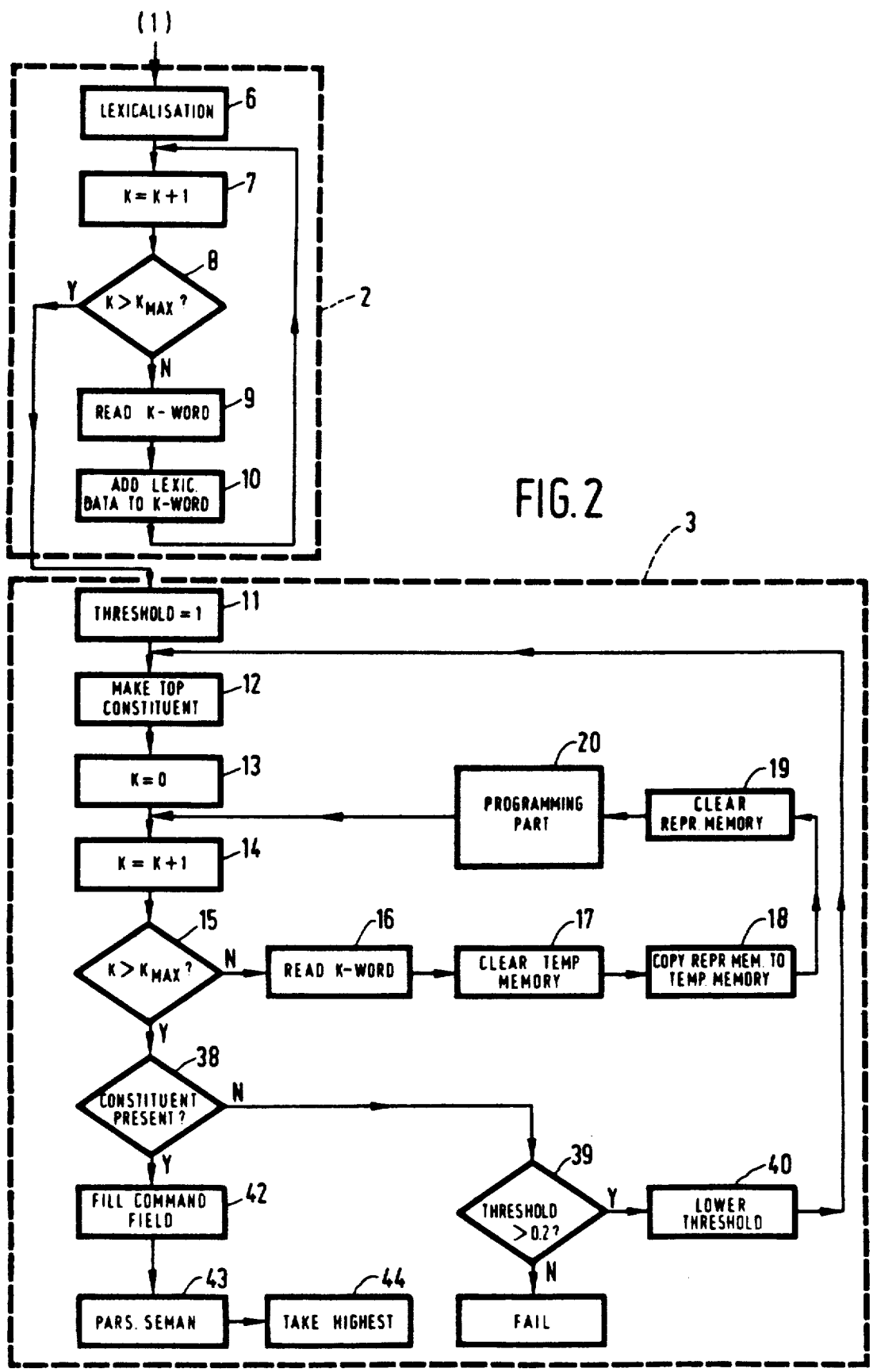
FIG. 2 is a flow diagram of the basic principle of the parser used in a system for grammatically processing.

A detailed explanation of phase 2 is provided with reference to FIG. 2 in which the lexical description takes place. In the next program step 6 a counter unit (k-counter), which indicates the serial number of the word (k) for treatment, is reset to 0. In step 7, the count of the k-counter is raised by 1 ($k=k+1$), and in step 8 the count of the k-counter is checked to determine whether the maximum k value ($k_{max}$) has been exceeded, i.e. ($k > k_{max}$). If this is the case (Y), the program goes to step 11. It it has not (N), it goes to step 9, in which the next word is called up from the word memory by means of an address determined by the count of the k-counter, and written into the computer memory which is designated the working memory. In step 10 the word written into the working memory is searched in the lexical memory and the specific information found there in connection with the word is written in the word memory. The program then returns to step 7.

In sentence parsing, each word should be examined for all the stated word functions (word categories). The associated Word structure is individualized by its own serial number (1), each time a word has a different word category and/or different features. At the same time, the number of serial numbers ($1_{max,k}$) assigned per word (k) will also be updated. Instead of ($1_{max,k}$) it may be sufficient to assign a specific label to the last array in order to indicate in the subsequent syntactic analysis that the last word function of that word has been reached.

During the syntactic analysis to be performed in phase 3, a plurality of representations with different constituent structures may occur simultaneously as possible solutions and they may have different probability factors because of conflict with certain grammar rules. Since one is only interested in the solution or series of solutions with the highest probability factor, solutions having a lower probability factor are normally qualified as non-interesting solutions and, accordingly, eliminated. This is done by testing the probability factors associated with those solutions against a certain threshold value. At the start of the syntactic analysis this threshold value is set to the value "1", but can be set to a lower value during such analysis if it is found that none of the probability factors obtained satisfies the threshold value. Accordingly, the program comprises a step 11 in which the initial threshold value is set to "1".

A starting constituent is then made for the sentence in step 12. This is a Constituent of which the fields contain the following information in the initial phase:
Category field : S
Command field : NIL
Members field : NIL
Features field : NIL
Stack field : NIL
Violations field : NIL
Probability field : 1

In order to fill in the Features field, a memory stage designated the first tabular memory (see Table A) is first searched for the Features indicated under the category S. Since in this example grammar no Features are indicated, the associated field remains empty (NIL). The memory also contains a Representation memory to receive actual Constituents (e.g. in list form as conventional in LISP programming language) with which the parser is to work continuously. The starting constituent S is written into this Representation memory which was empty till then.

The k-counter is then reset to the initial value "0" in step 13, and the count of the k-counter is increased by "1" in step 14. After step 14 the program reaches step 15, in which a check is made to see whether all the words (including the punctuation marks) in the sentence were involved in the syntactic analysis and whether, therefore, $k > k_{max}$ applies to the count of the k-counter. If this is the case (Y), then each Word is evidently accommodated in the Constituents and the syntactic analysis should be regarded as rounded off. If the statement $k > k_{max}$ is not true (N) in step 15, the program goes on to step 16. Fitting the word indicated by means of the k-counter into the Constituent structures available at that moment will start here The word being fitted into the as yet not closed Constituent structures present in the above-mentioned representation memory.

All the Word structures (1) of this word are now available as a result of the lexicalization process. In fitting a Word with a certain word structure within a Constituent with a certain Category, the Word will in many cases fulfil a certain function and therefore can be assigned a certain functional Word category. The same applies in a later stage to Constituents within their Parent constituent. On the basis of the Constituent category, on the one hand, and the Word category, on the other hand, the function (functional category) of the Word within the Constituent will be determined.

If the described fitting of the Word in the Constituent is not directly possible, it is sometimes possible to couple a new Constituent thereto, within which it is possible to include the Word. In this connection it should be noted that the inclusion of a Word structure in an open Constituent structure may result in some multiplication of the number of Constituent structures, because of a number of grammar rules and because of the number of Word structures ($1_{max,k}$) associated with that word (k). Since the results of the parsing process are always to be included in the Representation memory, and the actual Constituent structures occurring therein should be taken as input values for the parsing process, a memory stage in the computer. This memory may be designated the "Temporary Memory" and is first cleared in step 17. The Representation memory with all its Constituent structures is then copied to the Temporary Memory in step 18 and then the Representation memory is cleared in step 19. A number of variants of the following program section 20 are possible. These will be explained successively by reference to FIGS. 3, 4 and 5. The first embodiment of program section 20 described hereafter is presently preferred.

Taking as basis that the coupling possibility must be checked for each structure in the case of a Word (k) having a plurality of Word structures (1) the computer comprises a counting unit (the 1-counter) whose count corresponds to the associated word structure each time.

The 1-counter must also be reset to 0 for a following word (k+1) required to be accommodated in the sentence part structure ($S_m$) present. This is also the case with the counting unit (the m-counter) which represents the serial numbers (m) of the constituents.

Figure 3:
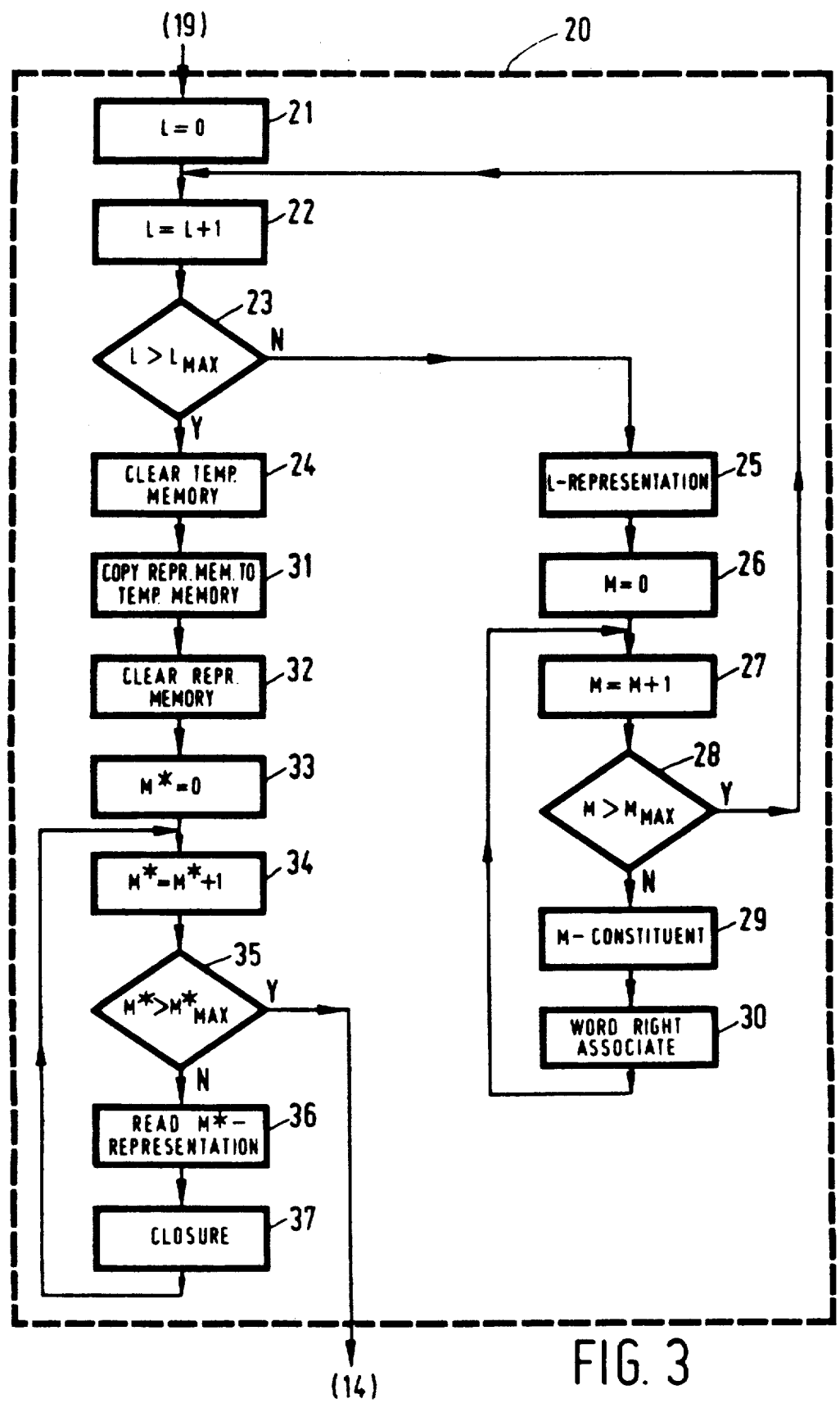
FIG. 3 is a flow diagram of one embodiment of the core part of the flow diagram shown in FIG. 2.

Accordingly, in step 21 in FIG. 3, the count of the 1-counter will be reset to 0 (1=0), and then in step 22 the count of the 1-counter is increased by "1" (1=1+1). In step 23 the question is put whether the count of the 1-counter has already exceeded ($1 > 1_{max}$) the maximum value ($1_{max,k}$) which represents the number of Word structures of the word with the serial number k.

If this question is answered in the affirmative (Y), the program goes on to step 24.

If, however, the question is answered in the negative (N) in step 23, then the 1-th Word structure will be transferred from the Word Memory to Working Memory in the next step 25 in order to overwrite the previous Word structure to enable a number of operations to be carried out on the newly written-in Word structure. In step 26 the m-counter will then be reset to zero (m=0) and then in step 27 the count of the m-counter is increased by "1" (m=m+1). In step 28 the question is then put whether the count of the m-counter has exceeded ($m > m_{max}$) the number $m_{max}$ representing the number of constituents then occurring. If this is the case (Y), it establishes that the word (k) to be fitted in with the intended structure (1) has been examined for connection in all the Constituent structures present at that time in the Temporary Memory and that this part of the program should therefore be repeated for the same word (k) but then for a following Word structure (1+1).

Accordingly, the program goes back to step 22. In the event of a negative reply (N) to the question in step 28, it is followed by step 29 where the m-th Constituent is called up from the Temporary Memory and brought to the Working Memory for overwriting the previous constituent. Thus both the l-th Word structure of the k-th Word and the m-th Constituent are in the Working Memory. A number of operations are performed in the program part 30 with these two structures (Word structure and Constituent structure). In fact, the attempt is then made to accommodate the Word structure within the Constituent structure, if necessary by making other Constituent structures. The program part is developed further in FIG. 6. After program part 30 has been performed the program returns to step 27.

If the question is answered in the affirmative (Y) in step 28, the program returns to step 22. Thus the word right associate-process has been performed for one word structure (l) in the case of one word (k) on all the actual constituents ($m_{max}$).

If a certain time thereafter the question is answered in the affirmative (Y) in step 23, the program goes on to step 24. At that time, the word right associate process has been carried out for all the Word categories ($l_{max}$) in the case of one word (k) on all the actual constituents ($m_{max}$) and the constituents thus formed are stored in the Representation Memory. All these constituents should now be subjected to a program part for the "constituent closure".

In Constituent closure, the Temporary Memory is first cleared in step 24 and in the next step, step 31, all the constituents stored in the Representation Memory are copied to the Temporary Memory. In step 32 the Representation Memory is then cleared. An $m^*$-counter whose count corresponds to a specific constituent in the Temporary Memory is reset to 0 ($m^*=0$) in step 33.

In step 34 the count of the $m^*$-counter is increased by "1" ($m^*=m^*+1$). In step 35 the question is then put whether the $m^*$-counter has already exceeded ($m^*>m^*_{max}$) the maximum value ($m^*_{max}$) corresponding to the number of constituents. If this question is answered in the affirmative (Y), all the representations ($m^*_{max}$) obtained in the case of all the word categories ($l_{max}$) of the k-th word have been subjected to the program part for the "constituent closure". The program then returns to step 14 to make representations by means of the next word (k+1) If, however, the question in step 35 is answered in the negative (N), then, in the next step 26, the $m^*$-th representation is called up from the Temporary Memory and then subjected to the above-mentioned program part for the "constituent closure" in step 37. The result obtained during this step is written into the Representation Memory, whereafter the program returns to step 34.

If, in step 15 in FIG. 2, the question is answered in the affirmative (Y), then all the words ($k_{max}$) with all the associated Word structures ($l_{max,k}$) are accommodated in the constituents and in the next step 38 the question is put whether there is at least one Constituent in the Representation Memory with an empty Command field. An empty Command field of course indicates that we are concerned with the Top Constituent (Root). This question is real, since steps 30 and 37 incorporate a filter procedure which filters (eliminates) faulty representations, by reference to a threshold circuit in which the value of the Probability field is compared with the actual threshold value. This comparative test will be explained below with reference to FIGS. 6 to 9.

In the event of the question being answered in the negative (N) in step 38, a check should be made whether the thus described program part about the parser, after lowering the threshold value, will deliver a usable result, i.e. a meaningful representation. However, the threshold value may not be brought below a specific value, e.g. 0.2, since it will then be thought that the presented sentence is structurally and grammatically so defective that no usable representation may be expected from the parser process.

Accordingly, if the question is answered in the negative (N) in step 38, then during the next step 39 the question is put whether the threshold value is still above a predetermined minimum value, e.g. 0.2. If the answer is in the affirmative (Y), then in the next step 40 the threshold value will be put at a subsequent lower numerical value in accordance with a fixed series of numerical values. If desired, a lower threshold value may also be inputted manually. The program will then return to step 12 to carry out once again the program with regard to parsing the presented sentence, but in this case by reference to a lower threshold value. Thus grammatically incorrect sentences are also allowed. If the question is answered in the negative (N) in step 39, and if therefore it is to be assumed that no usable analysis can be found, then a corresponding action must be taken. The sentence may possibly be considered as being suspect, with presumably many and/or very serious grammatical errors. If necessary, a note of this can be made. It is permissible for step 40 to precede step 39, in which case step 39 is given a different value as criterion.

If the question of step 38 is answered in the affirmative (Y), and, hence in the presence of at least one representation of the Top Constituent, then in next step 42 the Members field of the Top Constituents present is adapted. The situation taken as a basis is that the structure belonging to the sentence has already been made. A number of Command fields, however, must still be filled in or adapted. The Constituents (Parent Constituents) occurring in the Representation Memory will contain in their Members field a number of Constituents (Member constituents) and/or Words (Member words). A member constituent is a constituent which is dominated by its parent constituent. The Command field of these Member constituents and Member words is now filled in with a designation of reference to the associated Parent constituent. In this way, the Command fields of all the Member constituents and Member words given in the Member of a given Parent constituent are also provided with a designation or reference relating to this Parent constituent. The same also happens for each Command field of the Constituents and the Words within a Constituent whose Command field has been filled in during the parsing process.

Since provisional functional labels may be assigned during the parsing process, they are replaced in step 43 by final functional labels. In the example grammar still to be described, the provisional label fNP is used for each Constituent with the Category NP within, inter alia, a Constituent with the Category S. During this step, labels of this kind are replaced by the final labels "Subject", "Object", "Indirect Object" (Indobj.) and "Predicate" (Pred). This step 43 is explained in more detail below.

Finally, in step 44, there is selected from the Representation Memory that Representation which has the highest probability factor. This can also result in a plurality of Representations. Thus, in the Dutch sentence "Ik zag een meisje met de verrekijker" (English translation: "I saw a girl with the binocular") there will be two possible solutions, since the phrase "with the binocular"

may be a qualification of the "verb" and also of the "Object".

A second embodiment of the program part 20 will now also be explained with reference to FIG. 3. The index l now refers to a certain constituent structure (and not to a certain Word structure), while as a result the index m refers to a specific word structure. As a current index in steps 33 to 37 $1^*$ and $L^*_{max}$ must be used instead of $m^*$ and $m^*_{max}$. Accordingly, in step 21 the count of the l-counter is reset to "zero" ($l=0$) in respect of the serial number of the constituent to be used. In step 22 the count of the l-counter is increased by "1" ($l=l+1$) and in step 23 the question is asked whether the count of the l-counter has already exceeded ($l > l_{max}$), the maximum value ($l_{max}$) corresponding to the number of constituents present. In step 25, the constituent designated by the count of the l-counter is called up from the Temporary Memory, such Constituent overwriting the previous Constituent in the Working Memory. In step 26 the m-counter, the count of which corresponds to the serial number of a certain Word category, is then reset to 0 ($m=0$). In step 27 the count of the m-counter is increased by "1" ($m=m+1$) and in step 28 the question is asked whether the count of m-counter has already exceeded ($m > m_{max}$) the maximum value mmax corresponding to the number of word structures. In step 29 the m-th Word is called up from the Word Memory and the m-th Word will overwrite the previous word in the Working Memory. The m-th Word and the l-th Constituent are then subjected to the adaptation process of step 30.

An affirmative answer (Y) to the question in step 28 means that all the word structures ($m_{max}$) associated with one word (k) have been checked for connection to one Constituent (l) in program part 20. The other steps take place in accordance with their previous description. In the prior embodiments, all the possible representations of constituents which are possible in connection with one Word (k) for all the Word structures by reference to available constituents are made or expanded before program part 37 is performed for "closure of these Constituents".

In the following embodiment, all the possible representations ($m^*_{max}$) of constituents which are possible in connection with one Word (k) for one Word structure (l) with reference to all the constituents ($m^*_{max}$) are made or expanded before program part 37 is carried out for closure of these constituents ($m^*$). The same program part is then repeated, but for a following Word structure ($l+1$).

Figure 4:
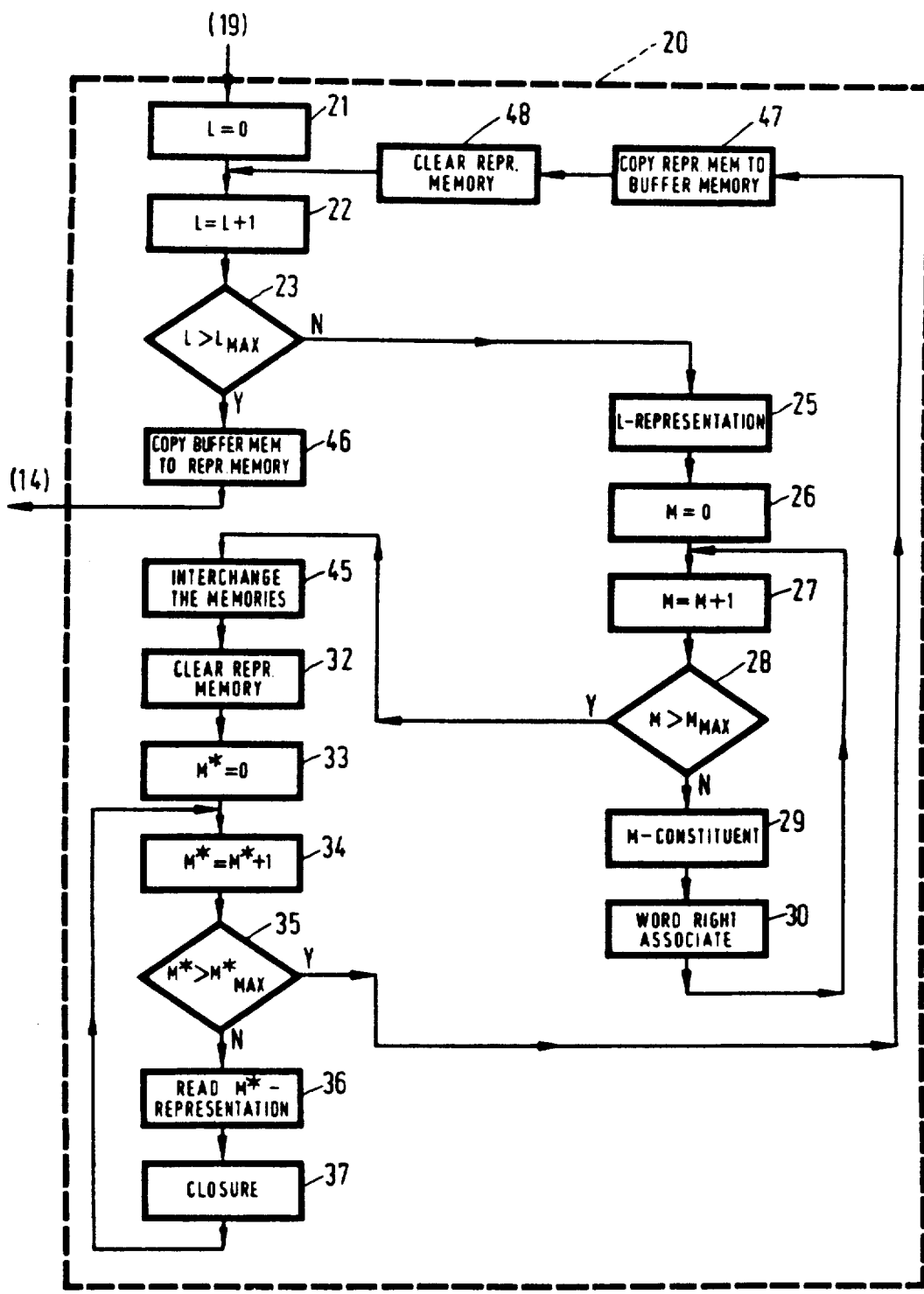
FIG. 4 is a flow diagram of another embodiment of the core part shown in FIG. 3.

The third embodiment based on the flow process is shown in FIG. 4.

In step 21 the l-counter relating to the serial number of a Word structure associated with Word (k) is reset to "0" ($l=0$) and in step 22 the count of the l-counter is increased by "1" ($l=l+1$). In step 23, the question is then asked whether the count of the l-counter has exceeded ($l > l_{max}$) the maximum value ($l_{max}$). In step 25, the word with the Word structure defined by the l-counter is called up from the Word Memory and placed in the Working Memory. In step 26, the m-counter (whose count represents the serial number of a constituent in the Temporary Memory) is then reset to "0" ($m=0$). In step 27 the count of the m-counter is increased by "1" ($m=m+1$). In step 28 the question is asked whether all the constituents ($m_{max}$) have been examined for connection by the program part of step 30 ($m > m_{max}$). If the question is answered in the negative (N), then in step 29 the constituent defined by the count of m-counter is brought out of Temporary Memory and placed in the Working Memory. Thereafter, in step 30, the connection of the l-th Word structure to the m-th Constituent structure is examined, and the result thereof written into the Representation Memory.

In the event of an affirmative answer to the question in step 28, then, in the next step 45, the contents of the Representation Memory and those of Temporary Switching Memory are changed over. Thereafter the Representation Memory is cleared in step 32. In step 33 the $m^*$-counter whose count represents the serial number of a specific Constituent in the Temporary Switching Memory is reset to "0" ($m^*=0$). In step 34 the count of the $m^*$-counter is increased by "1" ($m^*=m^*1$) and in step 35 the question is put whether the count of the $m^*$-counter has already exceeded ($m^* > m^*_{max}$) the maximum value ($m^*_{max}$). If this is not the case (N), the constituent indicated by the $m^*$-counter is called up from the Temporary Switching Memory in step 36 and is subjected in step 37 to the program part for Constituent closure. The result is then stored in the Representation Memory and the program returns to step 34. In the event of an affirmative answer (Y) to the question in step 35, then in the next step 47 the contents of the Representation Memory are copied to a Buffer Memory and in step 48 the Representation Memory is cleared.

The program then returns to step 22. The program part performed in this way is then repeated, but then for the following Word structure ($l+1$) in connection with the k-th word.

In the event of an affirmative answer (Y) to the question in step 23, the program goes to step 46, the Buffer Memory being copied to the Representation Memory and then the Buffer Memory being cleared. The program then returns to step 14 (see FIG. 2).

Instead of first placing the results of the process steps 37 and 30 in the Representation Memory and then in the Buffer Memory, it is also possible to place the results directly in the Buffer Memory. This will have the necessary consequences in connection with treatment of these program parts in FIGS. 6 and 9.

A fourth embodiment which differs from the above embodiment in the same way as the second embodiment differs from the first embodiment will now be described in detail. Here the indices l and m refer to a serial number relating to a Constituent and a Word respectively. The designation $1^*$ will be again used as current index for the steps 33 to 37.

Accordingly, in step 21 the count of the l-counter with reference to the Constituent to be used is reset to "0" ($l=0$), the count of the l-counter is increased by "1" ($l=l+1$) in step 22, and in step 23 the question is put whether the count of the l-counter has already exceeded ($l > l_{max}$) the maximum value ($l_{max}$), corresponding to the number of constituents present. In step 25 the Constituent indicated by the count of the l-counter is called up from the Temporary Memory and placed in the Working Memory. Then in step 26 the m-counter whose count corresponds to the serial number of a certain Word structure is reset to "0" ($m=0$). In step 27 the count of the m-counter is increased by "1" ($m=m+1$) and in step 28 the question is answered whether the count of the m-counter has already exceeded ($m > m_{max}$) the maximum value mmax, corresponding to the number of word structures.

In step 29 the m-th word structure is called up from the Word Memory and placed in the Working Memory.

This m-th Word structure and the l-th Constituent are then subjected to the fitting-in process of step 30, the result of which is stored in the Representation Memory and the program returns to step 27. Thus, an affirmative answer (Y) to the question in step 28 means that all the Word structures ($m_{max}$) associated with one word (k) have been examined for connection to one constituent (l) in the program part 30; then, in step 45, the contents of the Representation Memory are transferred to the Temporary Switching Memory and the Representation Memory is cleared. A phase leading to the closure process of the present Constituents in step 37 then starts at step 33. In the event of an affirmative answer (Y) to the question in step 35 the program goes to step 47, whereupon the program part thus described is repeated, but then for the next Constituent (l+1) in the Temporary Memory. In the event of an affirmative answer (Y) to the question in step 23, the program returns to step 14 via step 46 (see FIG. 2).

Figure 5:
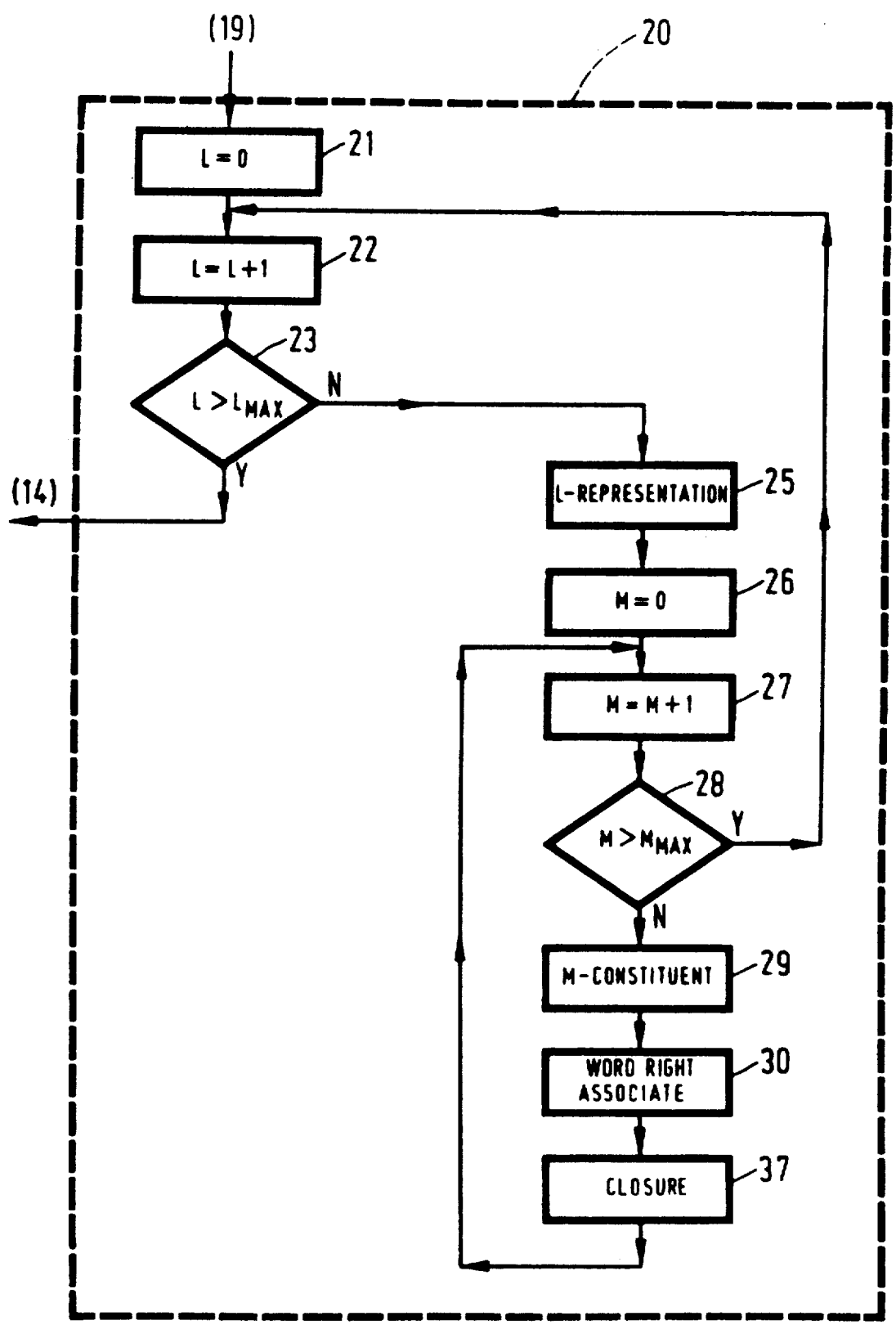
FIG. 5 is a flow diagram of another embodiment of the core part shown in FIG. 3.

FIG. 5 shows a fifth embodiment of the program part 20 based on the idea that whenever one Word and one Constituent have been transferred to the Working Memory, there should be carried out both program part 30 concerning the fitting of that Word to that Constituent, and also directly following that program part 37 concerning closure of the Constituents obtained. Accordingly, in step 21, l-counter whose count represents the serial number of the Word structure is reset to "0" (l=0), in step 22 the count of the l-counter is increased by "1" (l=l+1), and in step 23 the question is put whether the count of the l-counter has exceeded the maximum value ($l_{max}$), which corresponds to the number of Word structures associated with the k-th word. If this is not the case (N), then in step 25 the l-th Word structure indicated by the l-counter is called up from the Word Memory and written into the Working Memory. In step 26 the m-counter whose count corresponds to the serial number of the m-th constituent in the Temporary Memory is then reset to "0" (m=0), and in the next step 27 the count of the m-counter is increased by "1" (m=m+1).

In step 28 the question is put whether the count of the m-counter has exceeded (m > $m_{max}$) the maximum value ($m_{max}$), corresponding to the number of constituents in the Temporary Memory. If this is not the case (N), then in the step 29 the m-th Constituent is written from the Temporary Memory to the Working Memory. Program part 30 relating to the connection of the l-th Word structure to the m-th Constituent structure is then carried out, and stored in the Representation Memory. Directly thereafter, the supplementary (or new) constituent(s) is/are called up from the Representation Memory and removed and then subjected to the program part 37 concerning closure thereof. During step 37 the result is written to the Representation Memory, whereupon the program returns to step 27.

If the question of step 28 is answered in the affirmative (Y), the program returns to step 22.

If in step 23 the question is answered in the affirmative (Y), then the program returns to step 14 (see FIG. 2).

In a sixth embodiment the indices l and m are changed over in comparison with those of the fifth embodiment.

Steps 21, 22, 23 and 25, therefore, relate to the Constituent representation with index l and steps 26, 27, 28 and 29 to the Word structure with index m.

Figure 6:
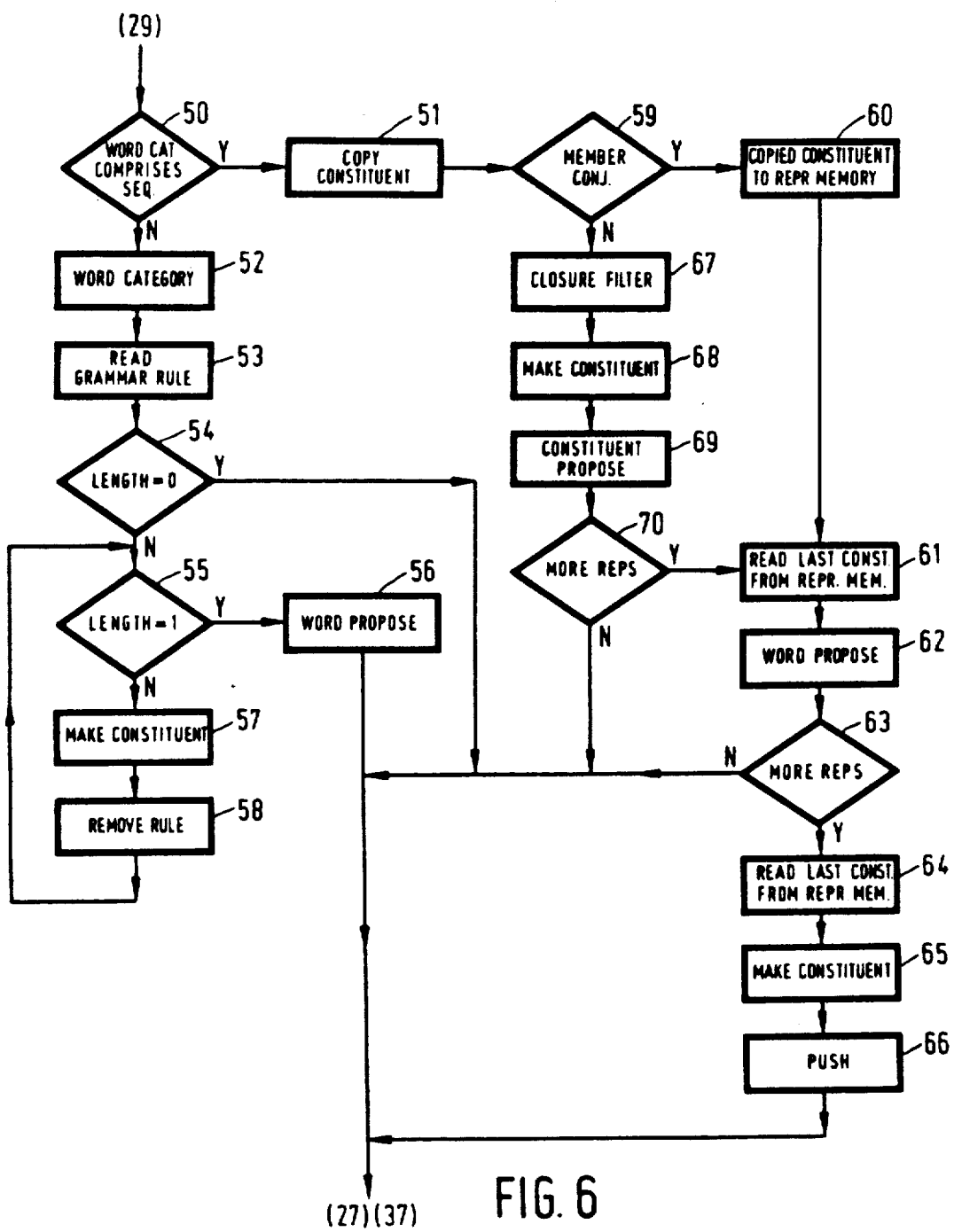
FIG. 6 is a detailed flow diagram of a first common part of the core part shown in FIGS. 3 to 5.

Program part 30 will now be explained in detail with reference to the flow diagram of FIG. 6.

This program part is used in the attempt to accommodate the presented Word structure in the presented Constituent structure. Although a punctuation mark such as the "comma" and the conjunctions "en" (English: "and"), "alsmede" (English "as well as" ) and "of" (English "or" ) are noted as Words, and are also stored as such in the lexicological memory, they nevertheless occupy a separate position with respect to other Words in the parsing process. They can be treated as a Member element within a new Parent Constituent to be created for the associated Constituent, within which the process of fitting in those conjunctions or punctuation marks really should take place. For this reason, such conjunctions and punctuations will follow a different route within the word fitting in process.

Consequently, at the start of this program part in step 50 the question is asked whether the Word category of the Word presented and to be fitted in is indicated in the lexical memory by "Seq" . If this is the case (Y), the program goes to step 51. If it is not the case (N), then in the next step 52 the Word structure as well as the Constituent structure, within which the Word is fitted in, are written into the Working Memory. In step 53, a search is carried out in a memory part concerning grammar rules which may be designated the second tabular memory by reference to the information concerning the Category field of the Word and that of the presented Constituent. Thus in the core grammar indicated, the Word category "article" and the presented Constituent "NP" are associated with the grammar rule "article (NP(det))" , which means that the Word is fitted by means of the functional label "det" into the presented Constituent. A number of grammar rules of this type will be found in the accompanying table B.

In the next step 54 the question is asked whether the grammar rule searched exists and, therefore, has a data field. If the data field is idle (Y) and the grammar rule does not, therefore, have a functional Word label, then the program part 30 relating to the connection of a Word within a Constituent is regarded as completed. This is the case, for example, if a search is to be made for the connection of a verb in an NP: this does not provide any solution (label length=0). In the event of a negative answer (N) in step 54 in the next step 55 the question is put whether the grammar rule has a data field with just one functional label. If that is the case (Y), as in the case of the rule "article (NP(det))", then in the next program part 56 the presented word, "article" in this case, with the functional label "det" in this case, is included within the present Constituent structure. This program part will be explained in greater detail with reference to FIG. 7. If, however, a negative answer is given (N) in step 55 and a plurality of elements therefore occur in the data field, as is the case with the grammar rule "article (PP(det NP))", then, in the next step 57 a new Constituent is made for the last element, NP in this case, and is included between the Parent Constituent PP and the Word "article".

This new Constituent thus obtains the following structure:

Category field: the last element of the grammar rule, NP in this case.
Command field: Parent Constituent, PP in this case.
Members field: NIL, i.e. the field contains no information.

Features field: All the features associated with this Constituent category (NP) which can be taken from the first tabular memory. In this case: "neuter, inneuter, sing 1, sing 2, sing 3, plu 1, plu 2 plu 3, definite, indefinite". A number of examples of this type are given in Table A.

According to English grammar, it gives the following features: "definite", "indefinite", male", "female", "neutral", "sing 1", sing 2", sing 3", plu 1", "plu 2", "plu 3".

Stack field: NIL, i.e. the field contains no information.

Violations field: NIL, i.e. the field contains no information.

Probability field: 1

This new Constituent structure is now regarded as the current constituent structure.

In the next step 58 the last element, NP in this case, is removed from the grammar rule and the program returns to step 55. Since in the present case there is only one element left in the grammar rule, the program will now proceed with step 56. Step 56 is carried out with the current Word structure and the current Constituent structure. It should be noted that the structure regarded as the current Constituent structure may have been changed during step 57.

In step 51 the presented Constituent (within which by means of steps 25 to 30 a Word is to be fitted in) is copied. In the next step 59 a check is made to see whether the copied Constituent already has an element "Conj" within the Constituent Stack field. If that is the case (Y), it is inadvisable to introduce a new Constituent with again the prefix "Conj" as a Parent Constituent for the copied Constituent and the Word or Punctuation to be fitted in. The process then goes to step 60, where the copied Constituent is placed in the Representation Memory awaiting next steps 61 to 66, in which this Constituent is involved. If the question is answered in the negative (N) in step 59, then step 67 follows, where a check is made to see whether this Constituent at this time already satisfies the conditions for closure of a Constituent. A first condition is that the element last added to the Stack field is also a suitable element in which the Constituent may end. A second condition is that certain elements must be present as a minimum in the Stack field of the Constituent.

The first condition is also replaceable by another condition which indicates those elements in which a Constituent may not end. The first replacement condition and the second condition are searched by reference to grammar rules stored in a memory part designated the third tabular memory. Thus the information (NP(det Nmod-a)head) indicates that no "determiner" or Nmod-a" can function as the last element in an NP, and the a "head" must occur therein anyhow. A number of examples are given in Table C. If an NP does not satisfy such conditions, the value of the Probability field is lowered, and a matching violation code is included in the Violations field. If these conditions are satisfied, then no further action takes place in this step. Lowering the probability factor increases the chance of this Constituent being eliminated in a subsequent filter procedure (in program part 69).

In step 67 a check is also made whether there is an essential element lacking with the current Constituent. This is done by reference to a Table K, in which there are given for each Constituent a number of group related segments. This Table specifies that if none of the elements functioning as Features from the first list segment is present in the Constituent, the members from the second list segment are compulsory and the members from the third list segment are prohibited.

Thus, the specification NP ((plu 3 proper pro) (det) ()) indicates that if none of the elements from the first list segment "plu 3", "proper", "pro" is present in an NP constituent then the element from the second list segment, in this case "determiner", must be present. The third list segment is idle here and therefore imposes no obligation. Table K gives several examples. If such conditions are not satisfied, then the value of the Probability Field is lowered and an associated violation code is included in the Violations Field, the intended combination of list segments also being shown.

In the next step 68, in connection with the inclusion of a "comma" or the co-ordinative conjunctions, in addition to the copied Constituent a new Parent Constituent is generated which is given the same Category designation as the copied Constituent but with the prefix "Conj". The Command field of the new Constituent becomes identical to that of the copied Constituent. The other fields are filled in the same way as was the case in step 57.

In the next step 69 a proposal is made to fit the copied constituent within the newly formed constituent with "Conj" as the functional label. This is done using the functional label "Conj", the copied Constituent structure itself and the newly made Parent Constituent. The associated program part will be explained in detail with reference to the steps 81 to 89 and can result in the addition of a new Constituent structure to the Representation Memory.

In the next step 70 a check is made to see whether a Constituent structure actually has been added to the Representation Memory. If this is not the case (N) and the copy constituent has therefore been eliminated, the fitting-in process for the "sequencer" is regarded as terminated. If, on the other hand, the question is answered in the affirmative in step 70, then step 61 follows, in which the Constituent last added is read out of the Representation Memory and also removed therefrom. In the next step 62 an identical program is followed as took place in step 56, but the functional label "seq" is proposed in the Stack field. Since, in step 62, an element may have been added to the Representation Memory, the question is put in step 63 whether this really is the case. In the event of a negative answer (N) this program part is regarded as terminated. In the event of an affirmative answer (Y), then in step 64 the last element added is called up from the Representation Memory and then in step 65 a new Constituent structure is made in the manner already described in connection with step 57. The Command field is filled in with a reference to the Parent Constituent in this case. Here the Parent Constituent is considered to be the Constituent which was called up from the Representation Memory in step 64 and which is now regarded as the current Constituent.

The category field is given the same value as the category field of the member constituent having the functional label "conj" within the current constituent.

The other fields are filled in in exactly the same way as was the case in step 57. In the next step 66 the new constituent structure just made is added to the Representation Memory, whereupon the program regarding the fitting of a word within a constituent is regarded as terminated.

Figure 7:
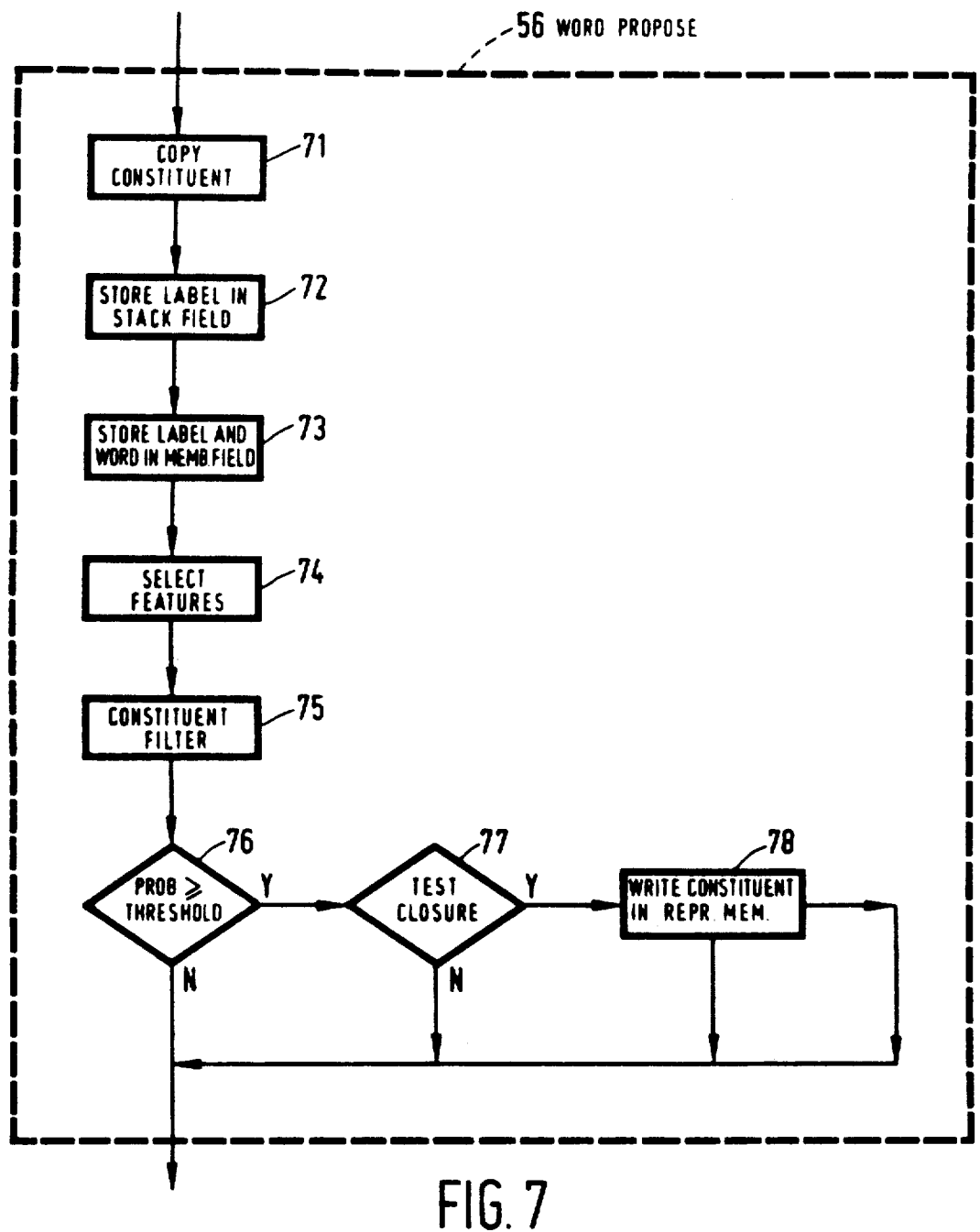
FIG. 7 is a detailed flow diagram of a first part of the common part shown in FIG. 6.

FIG. 7 represents a flow diagram of a detailed program to which reference was made during the program parts 56 en 62. In step 71 a copy of the current Constituent structure, i.e. the structure of the constituent in which the associated Word is to be accommodated, is written into the Working Memory. In the next step 72 the functional label obtained in steps 53 and 56, or 62 is added to the Stack field of this copy. In step 73 a combination of members, i.e. the functional label and the Word structure to be fitted in, are then added to the Members field as a label pair. In practice the address of the Word structure will be added instead of the Word structure itself.

In step 74, a selection is then made in a memory part designated the fourth tabular memory, for the series of features associated with the category of the current Constituent and the functional label of the Word. Each element of this series of Features which does not occur in the Features field of the Word structure and does occur on the Features field of the Constituent structure, is removed from the Features field of the Constituent structure.

The following example is given as an illustration of the foregoing: According to the fourth tabular memory (see Table D) the following series of features belongs to "NP" and "determiner": "neuter, inneuter, sing 1, sing 2, sing 3, plu 1, plu 2, plu 3, definite, indefinite". Let us assume that the Constituent structure with the category "NP" has the features "sing 1, sing 2, sing 3, plu 1, plu 2, plu 3, neuter, inneuter". Since the Word structure now has, for example, in the Features field the features "neuter, definite, sing 3" (as applies, for example, for the article "the"), the features sing 1, sing 2, plu 1, plu 2, plu 3 and inneuter must be removed from the Features field of the Constituent structure. According to English grammar a similar series of features will be found for NP and "determiner", however, with deletion of "neuter" and "inneuter". As an example in the English language a word structure with the features "indefinite", "sing 3" will be chosen, i.e. the article "a". As the consequence of this choice, the features "sing 1, "sing 2", "plu 1", "plu 2", "plu 3" and "definite" will be removed from the Features field of the Constituent structure.

In the following step 75, some check operations are carried out if required, this being done by reference to a memory part designated the fifth tabular memory (see Table E). In these operations incorrect combinations, incorrect sequence and incorrect number of functional labels are searched in the Stack field for each constituent type (constituent category). Thus the occurrence of two functional labels "head" one after the other in a constituent NP is to be interpreted as an incorrect combination, the functional labels "Nmod-S" and then a "head" as a combination with an incorrect sequence, and more than one functional label "determiner" in an NP as an incorrect number of functional labels for such a constituent. An incorrect sequence of two functional labels is also present if a "head" is followed by an "Nmod-A". It must be taken into account that the last added elements in the Constituent structures will come at the head.

Table E indicates these checks by: "NP ((head head)) ((head Nmod-S) (Nmod-a head)) ((det 1))".

This Table can be expanded for other constituents and also in the number of test rules per constituent. In this check, both a specific violation code and the associated element pairs are written in the Violations Field. A second check is effected for each constituent category by searching for incorrect combinations in the Features field by reference to Table F, which is stored as such in a memory part designated the sixth tabular memory. Thus the combination "inneuter" and "neuter" associated with the word combination "the house" is to be regarded as incorrect in an NP. This expresses itself in the absence of both neuter and inneuter in the Features field. When the program finds that not one of the features combination (neuter, inneuter) is present in the Features Field, a violation and the associated feature combination is included in the Violations Field. As an example in the English language as to an NP the combination of "sing 3" and "plu 3" pertaining to "a houses" can be regarded as incorrect. This manifests itself in the lacking of one of the features "sing 1", "sing 2", "sing 3", "plu 1", "plu 2" and "plu 3". When the program establishes that no element of said features combination is present in the Features Field, a violation code and the respective features combination is stored in the Violations Field.

A search can also be made for combinations considered necessarily present in the Features field.

Each constituent should show at least one sanctioned combination of Feature labels in the Features field.

Thus the Features field of the NP constituent "a large house" comprises the combination "indefinite, sing 3, adj.-not-infl., adj. enumerative, neuter" while a tested standard combination is, for example, (indefinite, adj.-not-inflected, neuter) which is found in the said Features field. The NP constituent "the large house" has the Features field (definite, sing 3, ajd.-inflected, adj.-enumerative, neuter) in which the standard combination (definite, adj.-inflected) is found. Thus a series of standard combinations of Feature labels can be compiled for an NP constituent. A series of standard combinations of this kind for an NP could be: NP ((definite, adj.-inflected) (plu 3, adj.-inflected) (inneuter, adj.-inflected) (neuter, indefinite, adj.-not inflected)). Standard combinations of this kind can be compiled for other types of constituents as well, and are stored together in the memory part designated the sixth tabular memory (see Table F).

A constituent must then satisfy at least one of the associated standard combinations. If this is not the case, then the value of the probability field associated with that constituent should be lowered. Thus the incorrect NP constituent "a large house" has as Features field: (indefinite, sing 3, ajd. inflected, adj.-enumerative, neuter), in which none of the tested standard combinations is found. Here too a violation code can be included in the Violations field and also be displayed on the screen in any display of the parsed sentence. When employing the used core grammar expressed in the attached tables, such as Table F in the English language, an equivalent example as discussed above is not available.

In the next step 76, the question is asked whether the value of the Probability field of the copy constituent is larger than or equal to the threshold value. In the event of the question is answered in the negative (N), the copy constituent is eliminated, and step 56 or 62 in question (FIG. 6) is considered terminated.

If the question of step 76 is answered in the affirmative (Y), then in next step 77 the question is asked whether the copy Constituent then considered as the current Constituent, still can be closed in view of the current threshold value. In this case, a test is carried out on the possible functional labels for the current Constituent within the Constituent on the Command field. If the present Constituent has more than one functional label in the Stack field (Y), this test is already carried out with a positive result in a previous stage and need not therefore be carried out again. In this way just as in the situation in which it appears that the Constituent can still be closed with the current threshold value the program proceeds to step 78. Otherwise, the part of the program shown in FIG. 7 can then be regarded as terminated (N). This step can be considered optional, since it is not essential for the parsing process, but rather has an accelerating effect on obtaining the end result. In the next step 78 this constituent is included in the Representation memory.

Figure 8:
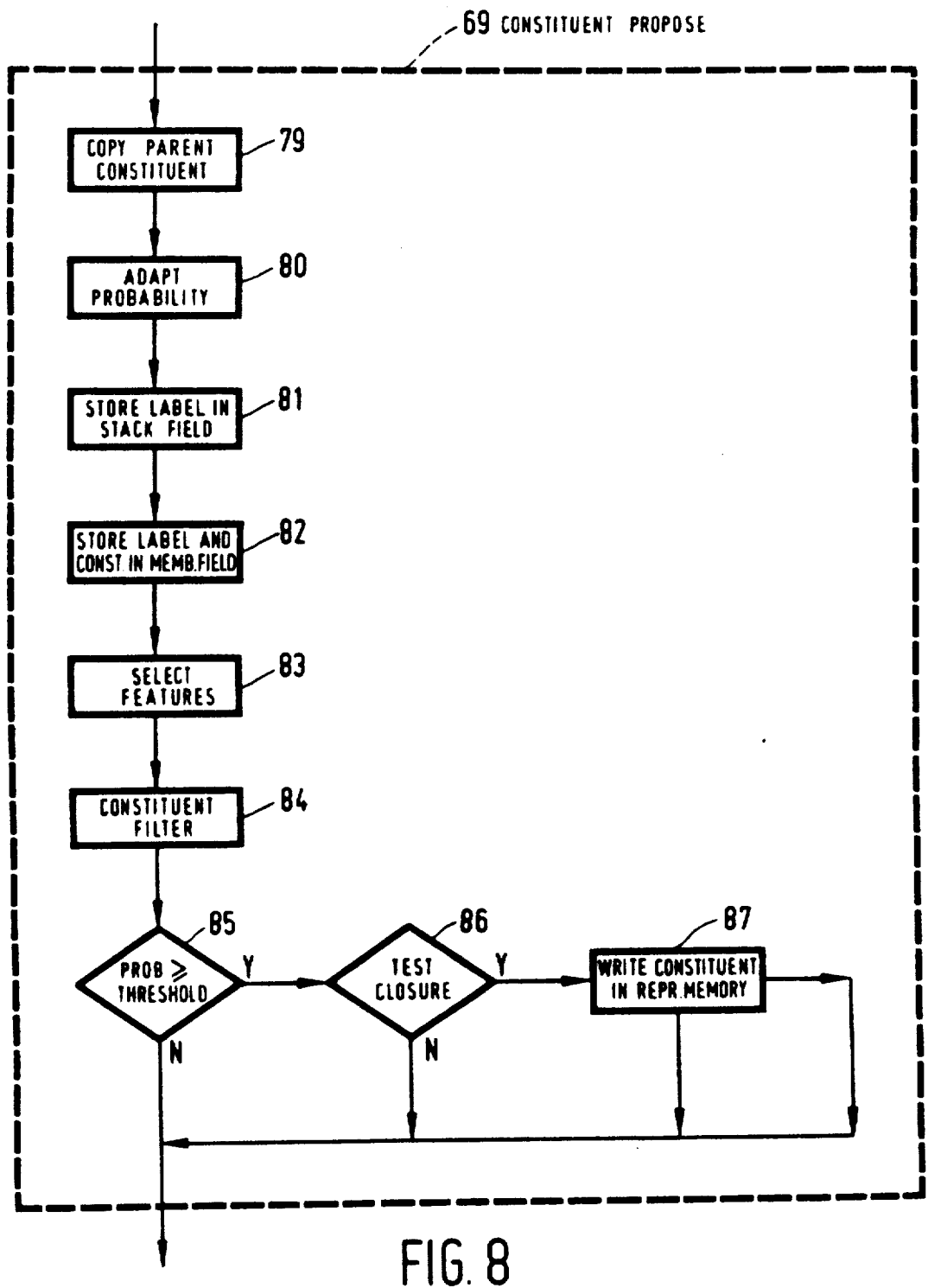
FIG. 8 is a detailed flow diagram of a second part of the common part shown in FIG. 6.

A detailed explanation of the part 69 of the program will now be given with reference to the flow diagram of FIG. 8.

Since this part of the program has many similarities to the program steps 71 to 78, reference will be made thereto in some of the program steps.

In step 79 a copy is made of the Parent Constituent for the working memory and is used as such in the next steps.

In step 80, the Probability factor of the copied constituent is adapted by correcting that Probability factor with the Probability factor of the constituent dominated by the Parent Constituent (the Member constituent), e.g. by multiplying the two Probability factors. To determine the new value of the Probability factor it is also possible to use another suitable function f(x, y) from the two Probability factors x and y.

In step 81 the functional label, as mentioned in connection with step 69 and steps 99 and 104, described hereinafter, is included in the Stack field of the copy constituent.

In step 82 a combination pair of, successively, the functional label and the dominated constituent is then added to the Members field of the copy constituent.

In step 83 a Features list is run through (see Table D) in the fourth tabular memory in connection with the category designation of the Parent Constituent and the functional label of the Member Constituent dominated by that constituent. All the Features which occur both in this and in the Features list of the constituent copied in step 79, but not in the Features list of the Member Constituent, are removed from the Features field of the copied constituent. In addition, all the Features present in the second Features list from the Table, insofar as they are not already present in the Features field of the copied constituent, are added to the Features field of the copied constituent. This step is comparable to step 74.

In step 84 a program is processed as already described in connection with step 75.

The following steps 85, 86 and 87, which are applicable to the copied constituent, are comparable to the steps 76, 77 and 78, with the proviso that what is involved here is a Constituent and not a Word.

Figure 9:
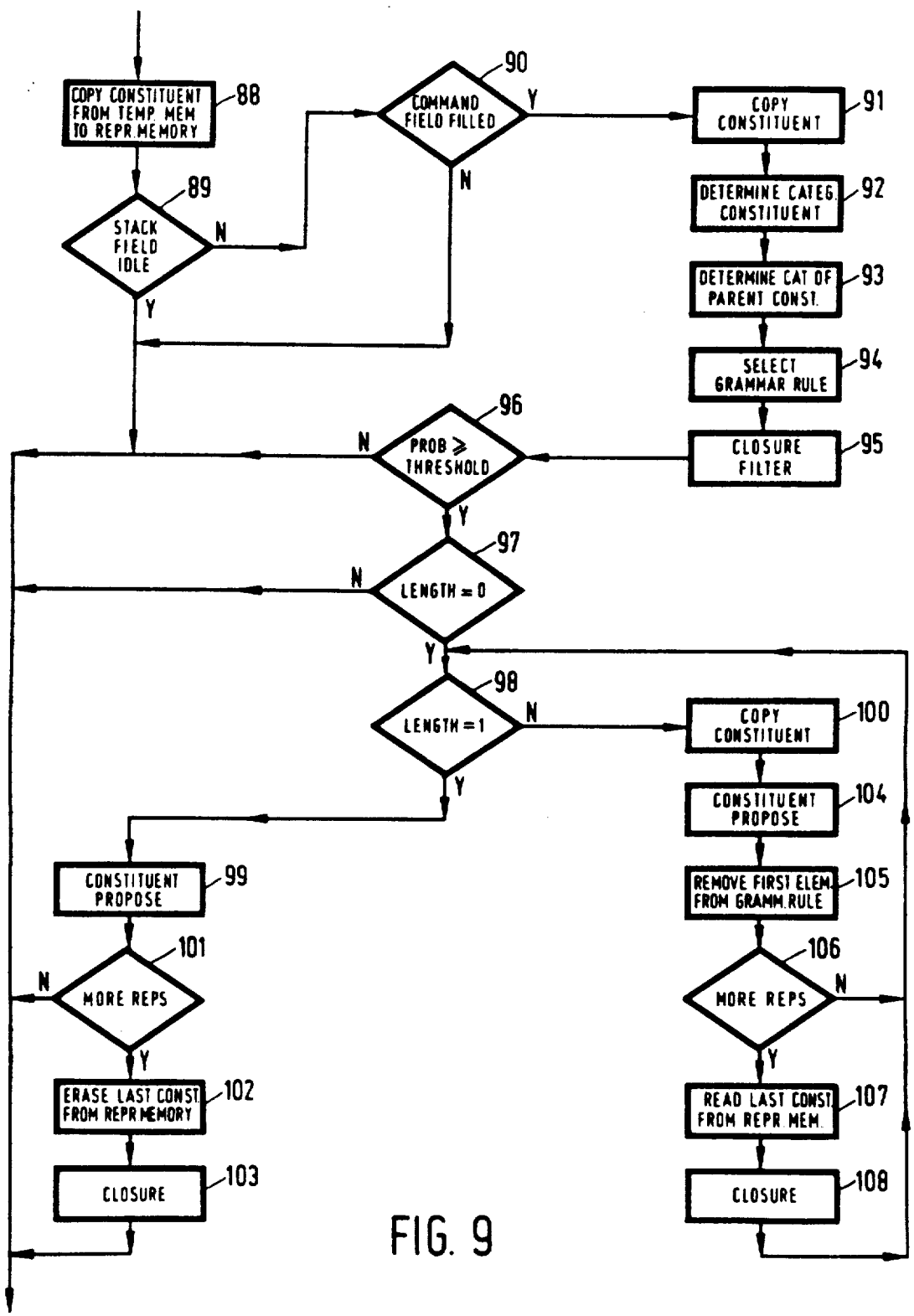
FIG. 9 is a detailed embodiment of a second common part, of the core part shown in FIGS. 3 to 5.
Figure 10:
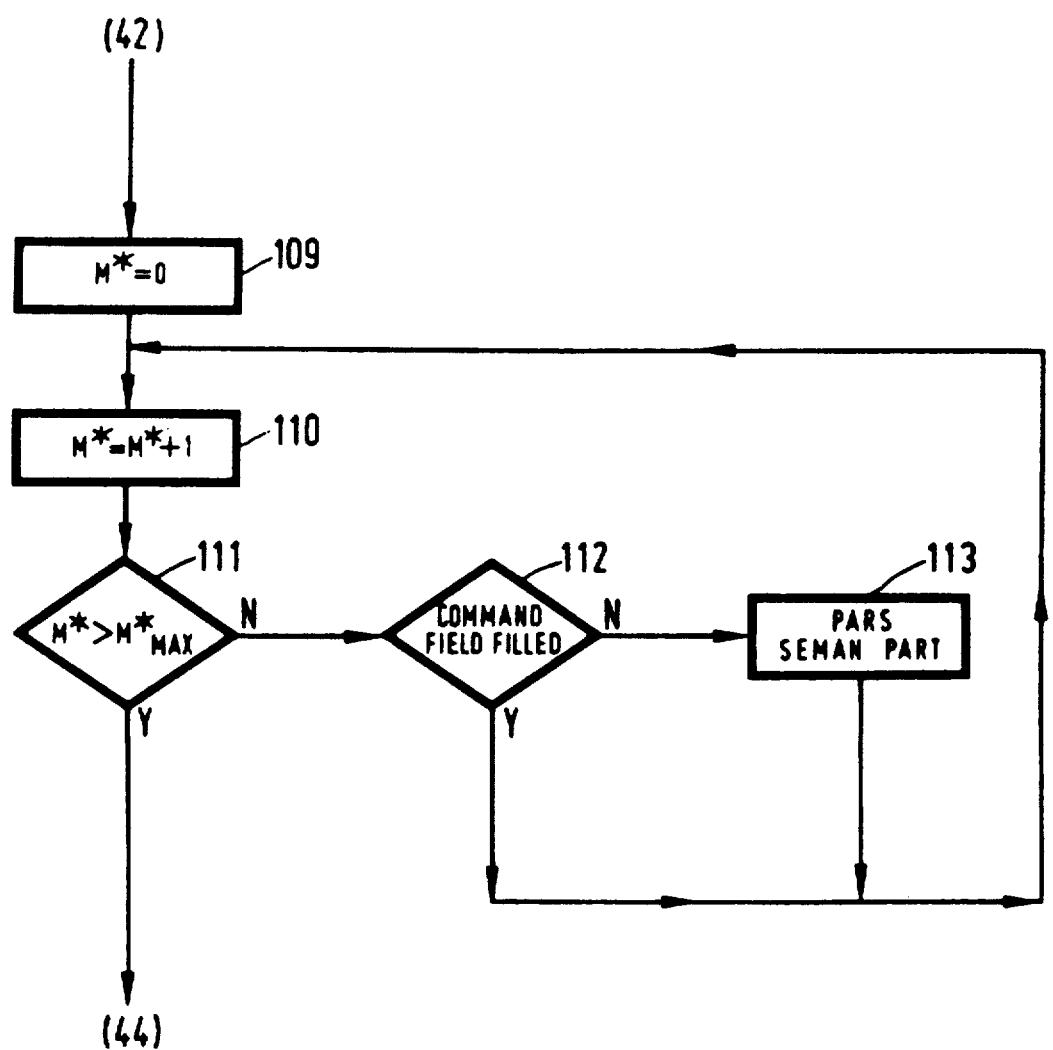
FIG. 10 is a flow diagram of an application-directed part of the flow diagram shown in FIG. 2.

A detailed explanation of the program part 37 relating to the closure of the current Constituent structure will now be given by reference to the flow diagram of FIG. 9.

In step 88 the current Constituent structure presented at the preceding step 36 from the Temporary Memory (see FIG. 3), from the Temporary Switching Memory (see FIG. 4) from the program part 30 (see FIG. 5) or as from the program parts 103 and 108 in FIG. 9, discussed hereinafter, is added to the Representation Memory. Since in step 65 a Constituent structure may have been created in which the Stack field contains no element, it is not permissible to close a constituent of this kind.

Accordingly, in step 89 the question is asked whether the Stack field is idle. If the answer is in the affirmative (Y), this part of the program is considered terminated. In the case of a negative answer (N), then in step 90 the question is asked whether the Command field of the current Constituent has a value. If this is not the case (N), then the Constituent is a Top Constituent, and closure does not apply. In the case of a Top Constituent the program part shown in FIG. 9 is then regarded as terminated. If the answer in step 90 is in the affirmative (Y), step 91 follows, where a Copy Constituent is made from the current Constituent. In the next step 92 the Category of the Copy Constituent, hereinafter referred to as the Member Constituent, is established. Then in step 93 the category of the Parent Constituent is established, by reference to the Command field of the Member Constituent. The associated grammar rule (see Table G) is then selected in step 94 by means of the data obtained in steps 92 and 93 concerning the category of the Member Constituent and its parent constituent and by reference to a memory part designated the seventh tabular memory.

If the category of the Member Constituent is an NP and if the category of the Parent Constituent is an "S", then it follows from the grammar rule NP (S,fNP) that the Member Constituent can be assigned a functional label fNP. In principle, more than one element may occur at this place in the Table.

A filter procedure is then carried out in step 95, in which conditions regarding the elements in the Stack field are tested. The test criteria are stored in the third tabular memory, the test itself being completely identical to that in step 67 (see Tables C and K).

In the next step 96, a check is made whether the value in the Probability field is greater than or equal to the threshold value. Of course it is possible in step 95 that the value of the Probability field has been lowered. If that is not the case (N), then the program part 37 is regarded as terminated. Otherwise (Y), step 97 follows in which the question is put whether the grammar rule selected in step 94 contains functional labels. If not (N), closure of the current Constituent is not possible, and the process for closure of the current Constituent should be regarded as terminated. In the event, however, of an affirmative answer (Y) to this question, then at least a logical closure procedure is possible. A check, however, should be made whether there has been one or more functional labels proposed at step 94. To this end, in the next step 98 the question is put whether there has been exactly one functional label proposed at step 94. If the answer is in the affirmative (Y), step 99 follows while in the negative (N) step 100 follows.

In program part 99, for the current Constituent, NP for example, it is preferable to operate as an element with the functional label, so fNP, as indicated in the grammar rule of step 94, within the Constituent structure of the Parent Constituent. The Parent Constituent is indicated in the Command field of the current Constituent. The current Constituent with the associated proposed functional label is then included in the Members field of the Parent Constituent, this having been discussed in detail in connection with steps 79 to 83. In step 99 a copy of the parent constituent is made (as explained in connection with step 79), and the functional label (fNP) is also written in the Members Field during step 82 in connection with the member (NP). In step 101 a check is made whether an element has been added to the Representation memory during program part 99 (exactly as explained in connection with step 78). In the event of a negative answer (N), this part of the program is regarded as terminated. In the event of an affirmative answer (Y) to the question in step 101 the program proceeds with step 102, where the last element added is called up from the Representation memory, removed therefrom, and then in step 103 subjected to the procedure in relation to closure of this element as indicated in the series of steps starting with number 88. The current Constituent structure is copied in step 100, the Copy thereafter being regarded as the current Constituent.

In program part 104 it is preferred that the current Constituent operate as an element with the functional label indicated as the first element in the grammar rule of step 94, within the Constituent structure of the Parent Constituent. The current Constituent with the functional label proposed is then included in the Members field of the intended Parent Constituent, this having been explained in detail in connection with steps 79 to 87. In step 105 the first element (1st functional element) is removed from the grammar rule. A check is then made in step 106 as to whether the number of Constituents in the Representation memory has increased, something that could have happened in program part 104.

In the event of a negative reply (N) to this question, the program returns directly to step 98 to perform the closure process of the current Constituent by reference to the corrected grammar rule. In the event of an affirmative answer (Y) to the question of step 106, the last Constituent structure added is called up from the Representation memory in the next step 107 and removed therefrom and regarded as the current Constituent, whereupon in the next step 108 the closure program applies as indicated by the series of program steps starting with number 88. After step 108 the program returns to step 98.

Since provisional labels may have been assigned during the preceding program, these provisional labels are replaced by final labels following the actual parsing process in the next part of the program. Thus for the Example Grammar used here, the labels fNP in all the Constituents stored in the Representation memory will be replaced where possible by the final labels Subject, Object, Indirect Object and Predicate, which are respectively used under the following abbreviations: Subj., Obj., Indobj., Pred.

For this purpose, in step 109 the count of the $m^*$-counter with which a reference to the serial number of a Constituent is obtained, is reset to "0", whereupon in step 110 the count of this counter is increased by "1".

In step 111 a check is made whether the count of the $m^*$-counter has already exceeded the maximum value $(m^*_{max})$ corresponding to the number of Constituents. In the event of an affirmative answer (Y), this part of the program is regarded as terminated. In the event of a negative answer (N) to the question in step 111 then in the next step 112 the question is put whether the Command field of the $m^*$-th Constituent structure comprises information. If the question is answered in the affirmative (Y), then it does not relate to a Top Constituent and therefore it is not necessary to assign final labels.

If the question is answered in the negative (N), program phase 113 follows relating to the replacement of the provisional functional labels by final labels, after which the program returns to step 110.

Figure 11:
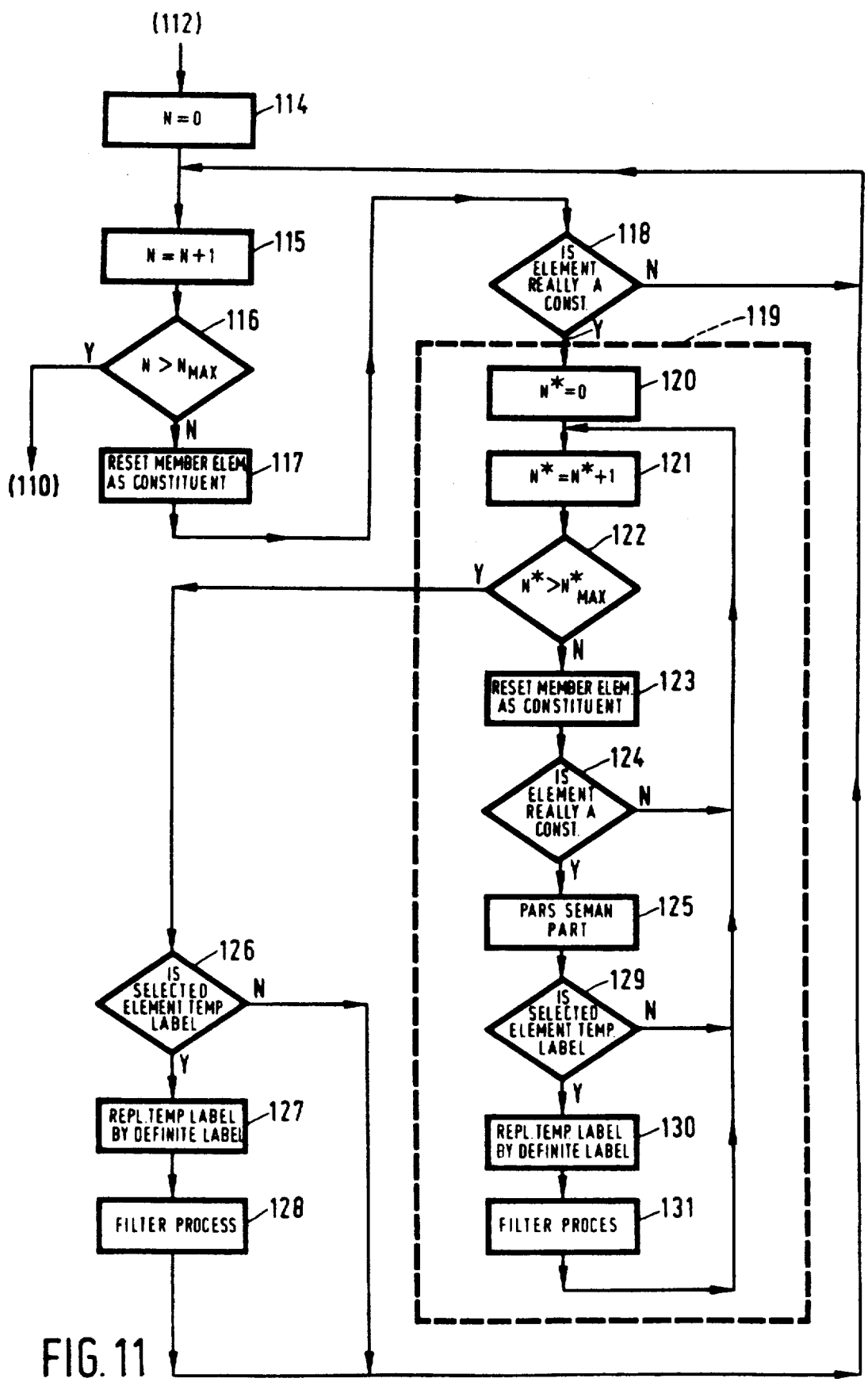
FIG. 11 is a detailed flow diagram of a part of the flow diagram shown in FIG. 10.

A detailed explanation of program phase 113 now follows with reference to FIG. 11.

In step 114, an n-counter whose count refers to the serial number of the pair of members in the Members field of the current Constituent is reset to "0". In step 115 the count of this counter is then increased by "1".

In the next step 116 the question is put whether the count of the n-counter has already exceeded the maximum value $(n_{max})$ which corresponds to the number of pairs of members in that Members field. If that is the case (Y), the program part 113 is regarded as terminated, and the program returns to step 110. In the event of the question being answered in the negative (N) in step 116 then in the next step 117 the second element is determined of the current Constituent pair to be designated by the count of the n-counter, and is considered as the current Constituent. In the next step 118, the question is put whether the element considered as current Constituent really is a Constituent and not a Word. If this is not the case (N), the program returns to step 115. If it is the case (Y), then the current Constituent is checked for its structure and therefore the contents of the Stack field of the current Constituent, i.e. the Constituent designated in step 117. This implies that a same procedure as described in connection with steps 114, 115, 116, 117 and 118 must now again be carried out within program part 119 with the steps 120, 121, 122, 123 and 124, but now on the Member pairs of the element considered as the current Constituent. The serial number of the Member pair is denoted here by $n^*$. If one of the Member pairs has a second element, which represents not a Word but a Constituent (which may be the case for example with relative clauses), then the next step 125 should also be replaced by a program part 119.

In this description the situation is examined in which the second element in the case of all the Member pairs is considered as a Word in step 118. The consequence of this assumption is that step 119 can actually be omitted and the program goes to step 126, where the question is put whether one of the elements of the Stack field of the Constituent selected in step 118, i.e. the second element of the n-th pair, is a provisional label. If this is not the case (N), the program returns to step 115. In the event of an affirmative answer (Y), to the question in step 126, then in step 127 there follows a program part where the provisional functional label is replaced by a final functional label. In these conditions the contents of the Stack field of the $m^*$-th Constituent structure are examined, and these contents are compared with certain grammar rules which are stored in a memory part designated the eighth tabular memory. A rule of this kind could be as follows: ((fNP, $V_{fin-main}$, Smod, fNP, Endmark) (Subj., Obj.) which means that the first fNP is replaced by a label "Subject" and the second fNP by a label "Object" ( see Table H).

If a number of solutions occur for a specific data contents of the Stack field, that leads to a corresponding number of Top Constituents, all of which are written in the Representation memory. This is done by copying the current structure with the provisional functional labels.

First of all, the provisional functional labels in the Members field of each Top constituent are replaced correspondingly.

Then in step 128 a filter process is carried out by reference to a memory part designated the ninth tabular memory (see Table I), in which a check is made to determine whether the conversion of provisional functional labels to final functional labels as produced by the grammar rule of this part of the program is permissible on the basis of obligatory correspondence of certain elements in the Features field in the case of some interrelated Constituents. In particular, there is a relation of this kind between the Constituent structures "Subject" and "Verb", in which the declension indication should be consistent. Table I gives the grammar rules intended for this, which are arranged by Category designation of the Constituent under examination. Each grammar rule also contains a list of elements and a list of features. The Features field is called up for each structure Constituent or Word) which corresponds to one of the elements occurring on the list. The intersection of all these Features fields with one another and with the found list of Features may not be idle.

For example, in the sentence "Hij lopen" (English "He walk"), the intersection of the Features of the "Subject" with the found list of Features will yield "sing 3", after which the intersection becomes idle as a result of the introduction of the Features of the "Verb". Thus there is an ungrammatical sentence construction. The analysis obtained is now made less probable by lowering the value in the Probability field, while the Violations field is also given a violation code.

After the filter process the program returns to step 115. The steps 129, 130 and 131 are the same as the steps 126, 127 and 128. After the "syntax directed parser", a "syntax embedded parser" will now be explained, which is operative in accordance with the inventive idea described. The latter parser differs from the first parser in that the steps to be carried out with a tabular memory are replaced by actions to be carried out according to a program. As an example we shall consider program step 75 (FIG. 7), part of the contents of Table E being represented in the flow diagram of FIG. 12.

Figure 12:
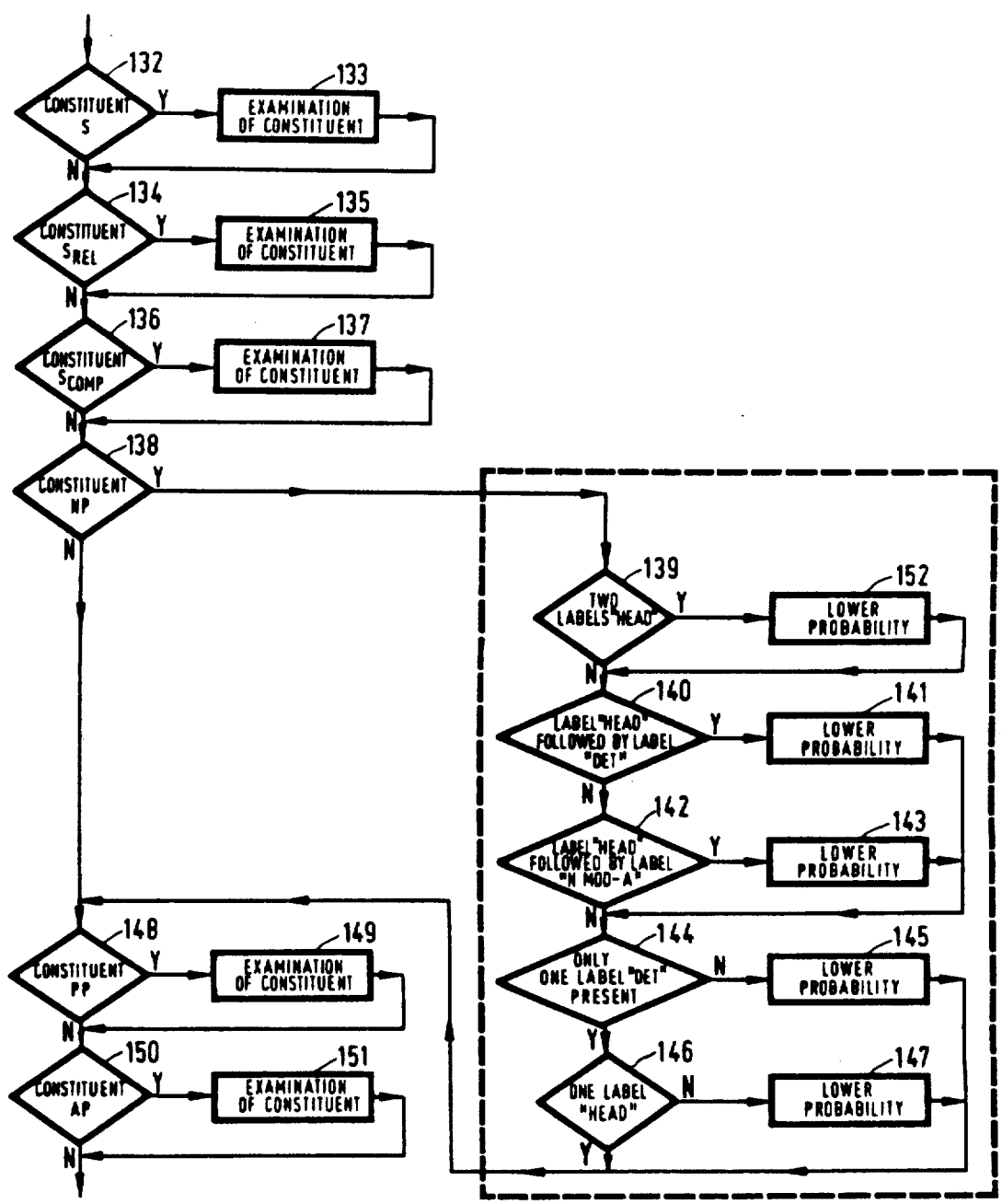
FIG. 12 is a flow diagram showing a modification of a part of the flow diagram shown in FIG. 7.

In FIG. 12, the question is asked in step 132 whether the constituent is of the category "S". If so (Y), program part 133 follows, whereupon the program of step 75 is considered as terminated. If not (N), step 134 follows, where the question is put whether the constituent is of the type $S_{rel}$. If so (Y), a search program 135 aimed at this follows. If it is not the case (N), step 136 follows, where the possible processing phase associated with the constituent Scomp starts with possible use of step 137.

The following program part 138 relating to an NP constituent with the associated search program will now be explained in detail. In step 138 the question is put whether the constituent is an NP. If it is (Y), program step 139 follows, where the question is put whether the functional label "head" occurs twice in succession. If so (Y), then program step 152 follows, where the value of the Probability field is lowered by a certain correction factor, after which the program proceeds to step 140. If the question is answered in the negative (N) in step 139, one or more similar questions follow which are not explained in detail here, but which finally arrive at program step 140. Here the question is asked whether the functional label "head" in the constituent under examination is followed by the label "det". If it is (Y), then there is here an incorrect sequence, and in the following step 141 the value of the Probability field is corrected by a certain factor. In the event of an answer in the negative (N) to the question in step 140 then step 142 follows with the question whether the functional label "head" is followed by the label "nmod-a". If so (Y), then in step 143 the value of the Probability field of the Constituent under examination is lowered by a certain factor. In the case of a negative answer (N) to the question in step 142 a similar question is processed in a following step. Finally, and hence also after the steps 141 and 143, the program arrives at the first step 144 of the next phase of the examination program, where the question is asked whether the label "det" occurs only once in the constituent. In the event of a negative answer (N) to this question, then in the next program step 145 the value of the Probability field is lowered by a certain factor. In the event of an answer in the affirmative (Y), step 146 follows, where the question is asked whether the constituent contains only one functional label "head". If not (N), then in step 147 the value of the Probability field is lowered. After the program steps to be performed in this phase the program run through in step 75 is regarded as terminated. If the question is answered in the negative (N) in step 138, then step 148 follows where the question relates to a PP constituent. In the event of an affirmative answer to the question (Y) in step 138 an examination program relating thereto is performed. A similar program part but for an AP constituent then takes place in steps 150 and 151, whereafter the program of FIG. 2 equivalent to step 75 is regarded as terminated.

A similar programmatical treatment is also possible for the other tables of the "syntax directed parser". An example of this is shown in Example C below.

In the program parts relating to the steps 67, 75, 84, 95 and 128, filter procedures are used whereby certain criteria derived from grammar rules are used to determine whether the input sentence is or is not grammatically correct. If this is not the case, the sentence is given a violation or violation code and a lower probability factor, which in the case of selection of the sentence at step 44 is reproduced by the system, for example, on a screen. The system operator can then correct the input sentence manually. A system which parses the input sentence and also correct it automatically is considered desirable. This correction function is preferably carried out as a program phase 153 after step 4, in the absence of a usable result.

Figure 13:
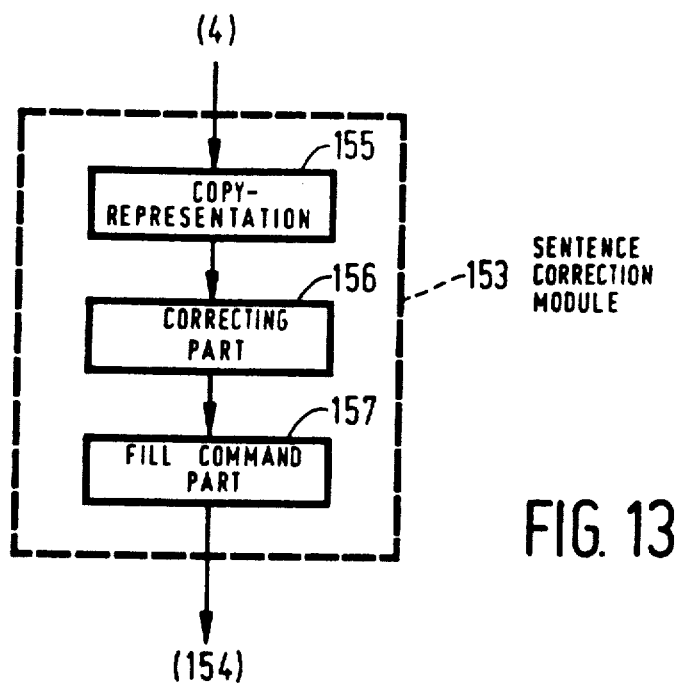
FIG. 13 is a flow diagram of a schematic overview of an extended part of a system for grammatically processing using said parser.
Figure 14:
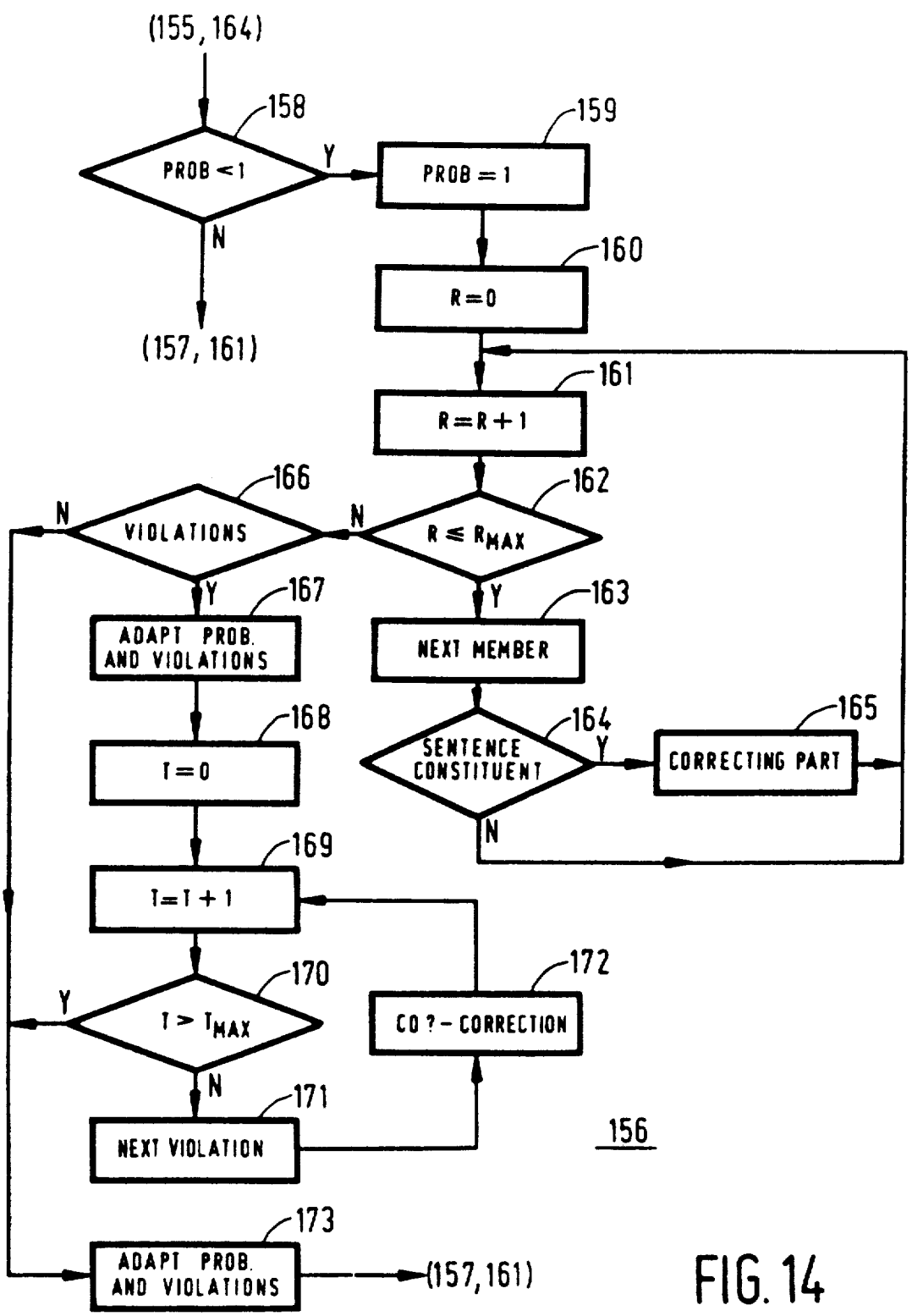
FIG. 14 is a flow diagram of an important phase of said extended part shown in FIG. 13.

In the next step 154 the question is put whether the ungrammatical sentence is sufficiently corrected, this being apparent from that value in the probability field. A negative answer (N) to the question of step 154 implies that the sentence offered is not to be conclusively corrected. The program will then return to step 1 for the operator to type in an amended version of the current sentence. In the case of an affirmative answer (Y) to question 154, the program goes on to step 4. The basic idea behind program phase 153 will now be explained by reference to FIGS. 13, 14 and 15. In order that both the original representation and the corrected representation may be available after the correction action, during step 155 (see FIG. 13) a copy is made of the selected original sentence representation in the representation memory and is then subjected to a correction procedure during phase 156. During the following step 157, a number of fields of the selected top constituent are adapted to the change that has been made. This applies, for example, to the command fields of the member constituents associated with this top constituent and also to the member constituents dependent thereon. These command fields are now filled with a designation or reference to the associated parent constituent, whereafter the program goes on to step 154. The program phase 156 breaks down into a number of program steps as shown in FIG. 14. Since the program phase 156 must be applied only to the top constituent and to the member constituents with an incorrect structure, the program will start at step 158 with the question whether the offered constituent has a probability factor of less than 1. In the case of a constituent having a correct structure, the answer to this is in the negative (N). The actual correction program will therefore not be carried out and the program goes on to step 157.

As will be apparent hereinafter, step 158 may follow on step 164, which results in the program being followed by step 161 after step 158. For a constituent having an incorrect structure the question is answered in the affirmative (Y) and the program will go on with step 159 where the probability field has the value 1. It would after all be incorrect for the current constituent to have an uncorrected probability factor after correction of the constituent itself or its member constituents. Correction of a sentence structure will start at the lowest level in a sentence at which there are still constituents. To be able to drop down to that level in a sentence structure, a counter (r-counter) is reset to 0 ($r=0$) in the next program step 160, and then in the next step 161 the count of this counter is increased by 1 ($r=r+1$). In the next step 162, a check is made, by reference to the condition $r \leq r_{max}$, whether the r-counter has a count which is less than or equal to the number of member constituents in the current constituent. If that is the case (Y), then in step 163 the constituent determined by the r-counter is called up from the word memory of the system and in step 164 the question is put whether this constituent really is a sentence part constituent (and hence not a word constituent). If this question is answered in the affirmative (Y), then a still lower level in the sentence structure must be searched and the program will go on to step 165.

This step, therefore, implies that the correction program from step 158 will be run again for this sentence constituent as the current constituent. If, however, the constituent comes under the category "Words" and hence the question of step 164 is answered in the negative (N), the program returns to step 161. If the question in step 162 is answered in the negative (N), then the current constituent has a constituent structure in which only words occur as member elements. During the following step 166 a check will be made in the case of the current constituent whether the associated Violations Field contains one or more violations. If this is not the case (N) then the correction process is over for that constituent and the program goes on to step 173. If, however, the question is answered in the affirmative (Y), in step 166, then step 167 follows where the values of the Probability Field, the Features Field and the Violations Field of the current constituent are adapted to the changes which already took place during the correction phase. This is in no way imaginary, since step 165 contains the complete correction phase of FIG. 14, and the actual correction of the sentence structure takes place precisely at step 172. Since the program steps 67, 75, 84, 95 and 128 result in a number (1) of types of violations in the form of violation codes, and a correction function characteristic of the associated error belongs to each kind of violation, the current constituent will be searched for possible violations or violation codes in the Violations Field.

In step 168, a t-counter whose count corresponds to a specific serial number in a possible series of violation codes in the Violations Field will be reset ($t=0$). In step 169 the count of the t-counter will then be raised ($t=t+1$) and in step 170 the question will be put whether the count of the t-counter is higher than the number which determines the number of violation codes ($t_{max}$) in the Violations Field ($t > t_{max}$). If this is not the case (N), then in step 171 the violation code corresponding to the count of the t-counter will be called up from the Violations Field and in the following step 172 the correction function applicable to that violation code will be applied to the current constituent. Step 172 will be explained in detail by reference to FIG. 16. The program then goes on to step 169. If, on the other hand, the question is answered in the affirmative (Y) in step 170 so that all the violation codes associated with that constituent have been dealt with, the program goes on to step 173 where an identical program is performed to the one in step 167. After passing through step 173 the program returns—at least if the correction function (FIG. 14) forms a part of step 165—to this step and then continues with step 161. If, however, the correction function (FIG. 14) is not carried out as part of step 165, the program goes on with step 157 after step 173.

If the question is answered in the negative (N) in step 158, then the program returns to this step if the correction function of FIG. 14 forms part of step 165. If not, the program goes on with step 157.

Figure 15:
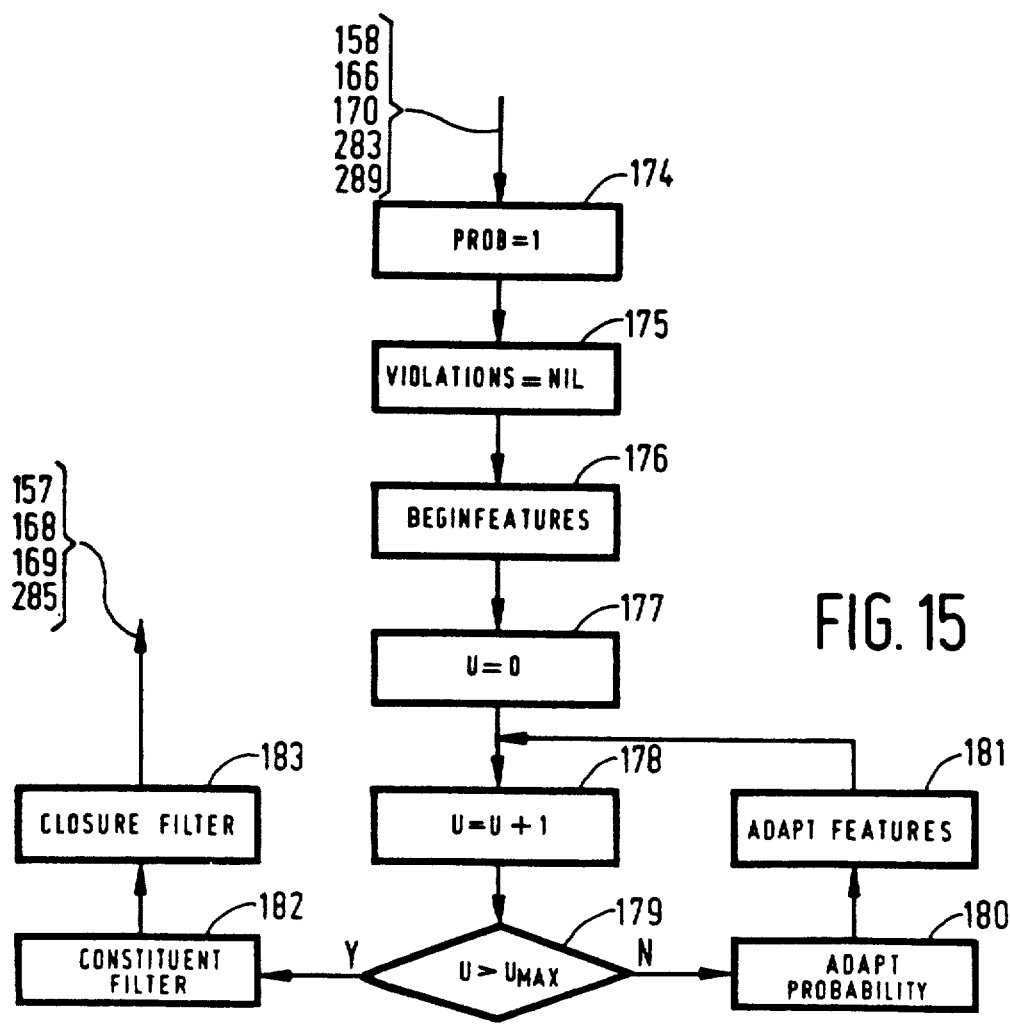
FIG. 15 is a flow diagram of part of a program belonging to FIG. 14.

Steps 167 to 173 require further explanation which will be given by reference to FIG. 15. The function of these steps relates to adaption of the Probability Field, the Violations Field and the Features Field of the current constituent in the situation created. Here use is made of the functionality as described in connection with program steps 67, 74 and 75. Adaptation of the said fields starts with the allocation of a start value to these fields. Thus the Probability Field is allocated the value "1" in step 174, the Violations Field is allocated the value "NIL" in step 175 and the Features Field in step 176 is allocated the complete list of possibly occurring features as indicated in Table A in the column of the current constituent. These fields may be subject to changes, certainly insofar as concerns the Features Field. Adaptation of these fields to the member elements starts at step 177 where a counting unit (u-counter), whose count corresponds to the serial number of the member element within the current constituent, is reset to 0 ($u=0$). In step 178 the count of the u-counter is then raised ($u=u+1$) and in step 179 the question is put whether the count of the u-counter exceeds the number of member elements ($u_{max}$) within the current constituents ($u > u_{max}$). In the event of a negative answer (N) to this question program step 180 follows, where the value of the Probability Field at that moment for that constituent is multiplied by the value of the Probability Field of the associated member constituent. If the member constituent is a word, then the frictive value 1 applies here.

In step 181 the value of the Features Field is then adapted to the data associated with the current member element. This adaptation is carried out by means of Table D in a way which is identical to step 74.

If, in step 179, the question is answered in the affirmative (Y), then in the next step 182 certain filter functions as described in step 75 are carried out on the resulting constituent structure by means of a number of check operations. This is also the case in the next step 183 which is similar to step 67.

The constituent structure is thus brought into readiness to enable corrections to be carried out or to enable a correct representation of the constituent to be obtained.

Figure 16:
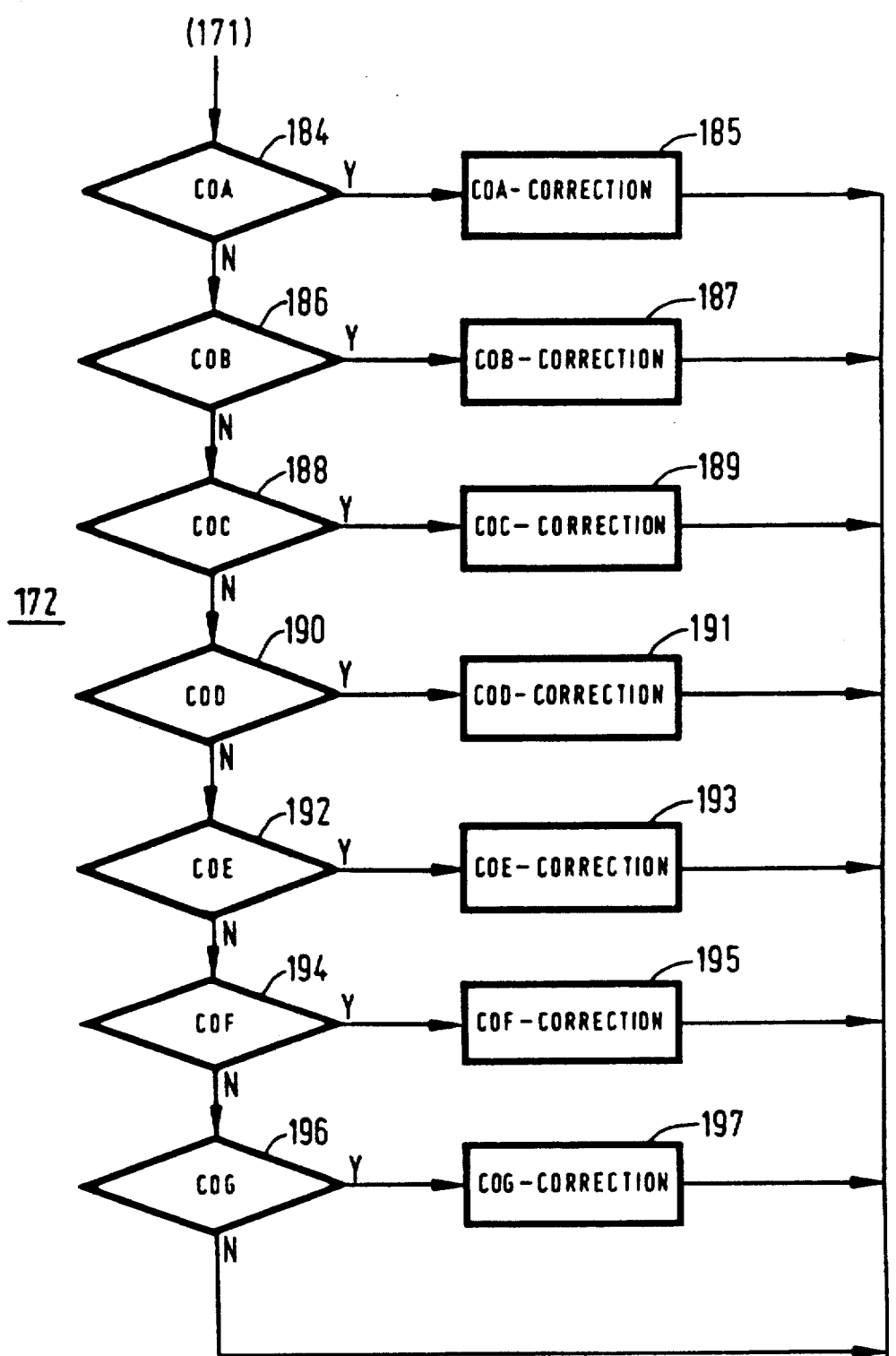
FIG. 16 is a flow diagram of another part of a program belonging to FIG. 14.
Figure 17:
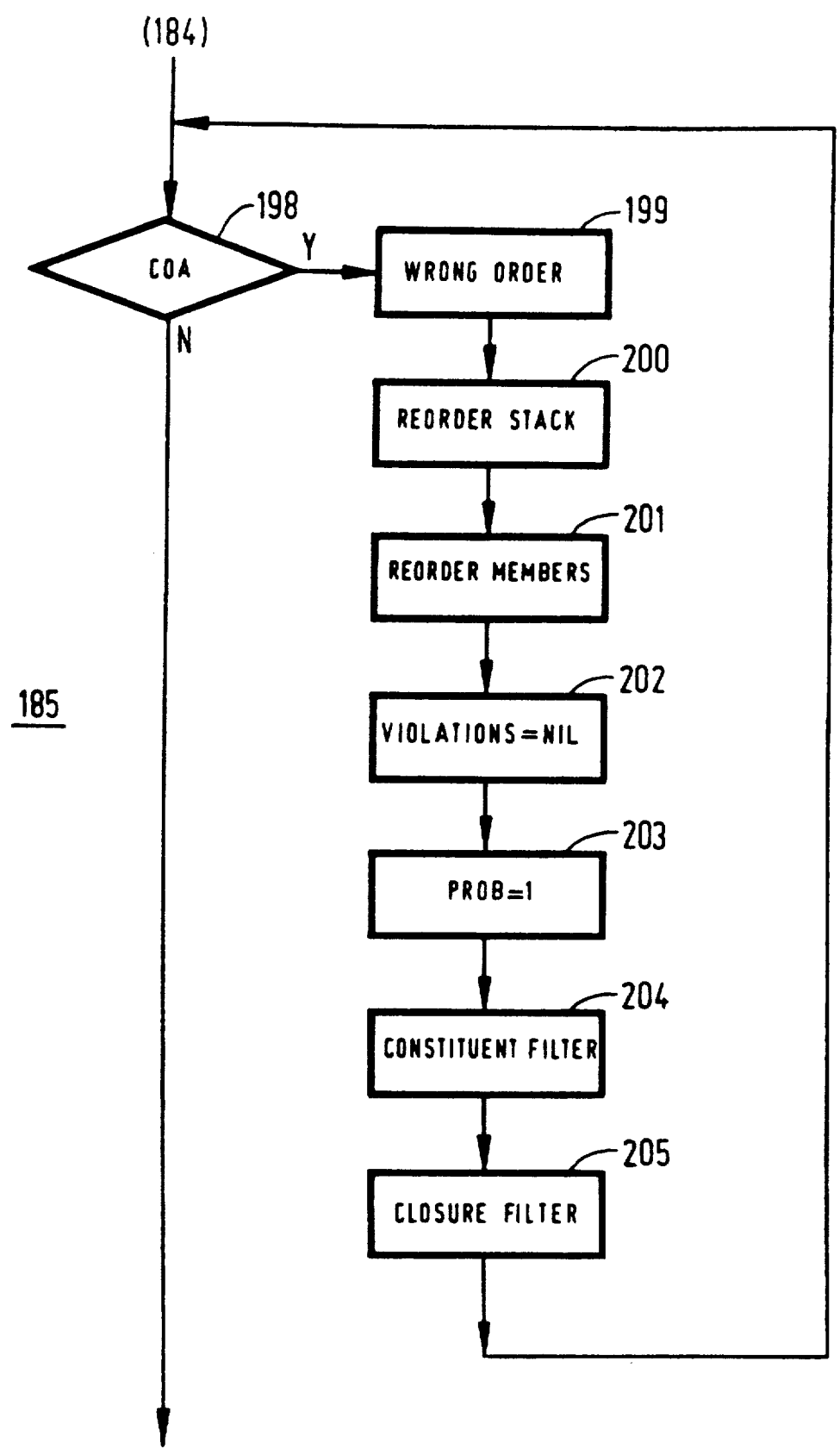
FIGS. 17 to 23 are a number of flow diagrams of detailed correction programs from FIG. 16.
Figure 18:
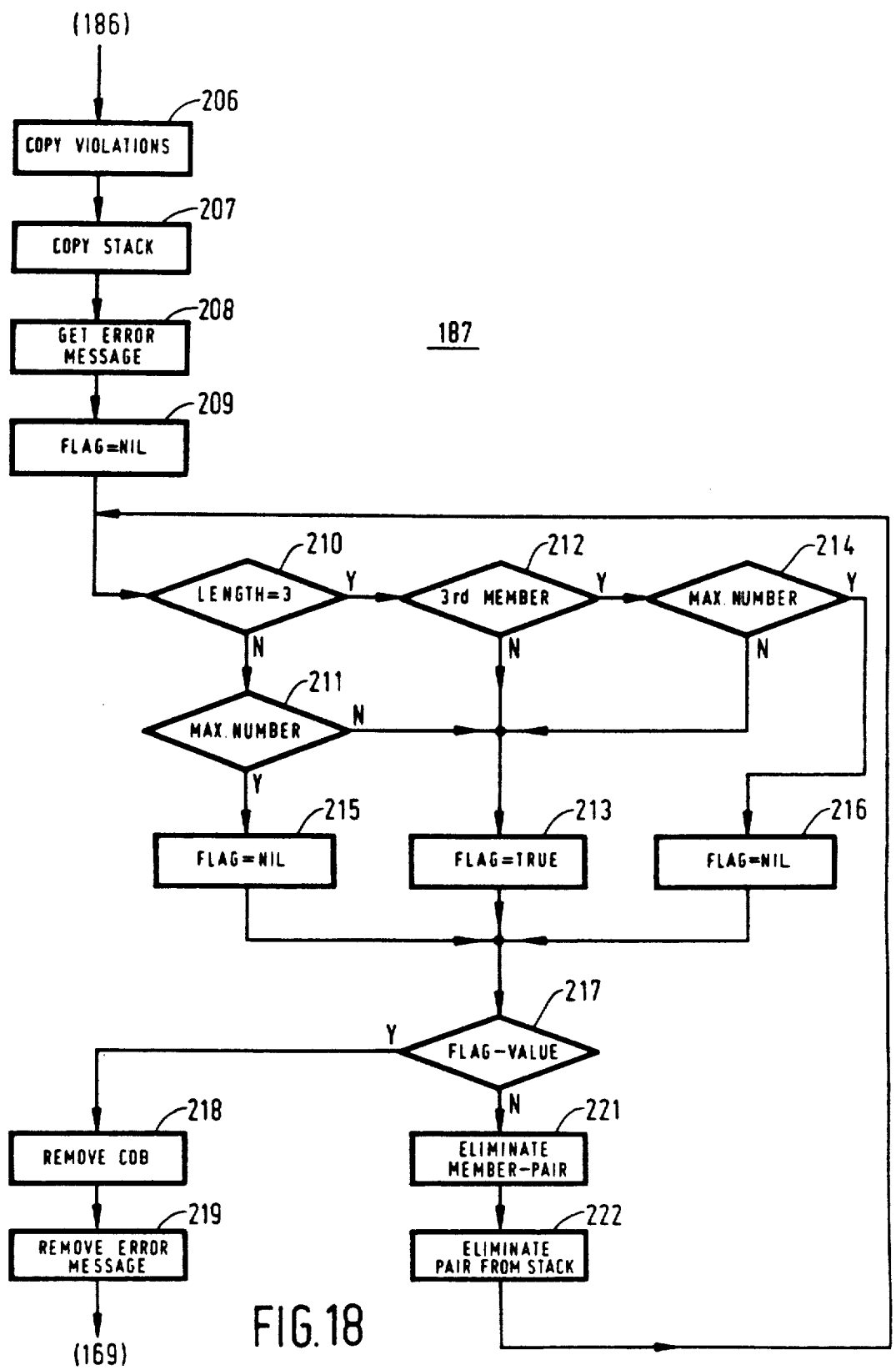

A number of specific correction procedures are run in program step 172 and are executed in accordance with a program shown in FIG. 16. After step 171 the program goes to step 184 where the question is put whether the violation having the serial number t from the current constituent (see step 171) corresponds to a violation of specific quality coupled to that step. If the question is answered in the affirmative (Y), step 185 follows, the correction specified at step 184 being executed on the current constituent. Thus step 184 can be allocated the function of correcting a constituent where a wrong sequence of member elements has been detected. A correction of this kind will be explained with reference to FIG. 17. After step 185 the program will go on to step 169. In the event of a negative answer (N) to the question in step 184 then step 186 follows where the question is put whether the violation element with serial number t corresponds to a specific type of violation element coupled to that step. If that question is answered in the affirmative (Y) then step 187 follows in which another type of correction, e.g. taking certain action in a constituent as a result of an incorrect number of functional lables, is executed on the constituent. This error correction will be explained by reference to FIG. 18. After step 187 the program will go on with step 169.

In the manner indicated a check is made as to which correction step belongs to a certain violation and is to be executed. Apart from the correction steps to be explained with reference to FIGS. 17 and 18, other correction steps which are involved in FIG. 16 will be described with reference to FIGS. 19 to 25. In the correction phase in FIG. 17 it has been assumed that both the violation itself, in this case denoted by "COA", and the element pairs to be interchanged, are given in the Violations Field of the current constituent. This correction phase starts with step 198 with the question whether the Violations Field does contain a violation of the type "COA". In the event of a negative answer (N) to this question the program goes on to step 169 (see FIG. 14) and in the event of an affirmative answer (Y) it goes to step 199 where the element pair to be interchanged is transferred from the Violations Field to the working memory. In the next step 200, the associated elements in the Stack Field are interchanged, and this also is the case in the next step 201 for the Members Field. A check must then be made whether the result achieved is correct in respect of sequence. For this purpose, in step 202 the associated "COA" statement is removed from the Violations Field and in the next step 203 the written-in value in the Probability Field is replaced by the value "1". In step 204 the check procedure as in step 75 is carried out and in the next step 205 a check is made whether the constituent satisfies the condition for closure of a constituent, just as shown in the case of step 67. As a result of these two steps, the Probability Field and the Violations Field are adapted to the new situation.

After step 205 the program returns to step 198 where the question is repeated in respect to the new situation. The result obtained is returned to the representation memory in each case. If the question is answered in the affirmative in step 186, the correction phase indicated by number 187 is started, the program for this being shown in FIG. 18.

This correction phase deals with the errors relating to an incorrect number of functional labels within a sentence or part of a sentence, as established in step 75. It is assumed for this purpose that the violation itself, in this case denoted by COB, the associated functional labels, the maximum number of times that a label of this kind may occur, and in some cases a label which must be urgently present for the purpose, are indicated in the Violations Field of the current constituent. This correction phase starts with steps 206 and 207, in which the Violations Field and the Stack Field are successively copied to the working memory. In step 208 the intended violation is then called up from the Violations Field. In the next step 209 a specific flag (or possibly a variable label) is added to the information in the working memory and allocated the value "NIL". In the next step 210 a check is made whether the violation does or does not contain three elements. For this it is assumed that there are incident-dependent violations in addition to the incident-independent violations described in step 75. An incident-independent violation simply indicates that the occurrence of a certain label in the constituent is tied to a maximum. Thus (det, 1) indicates that a determiner may occur only once in that constituent. We are concerned here with a violation of 2 elements. An incident-dependent violation indicates that the fact that the occurrence of a certain label in the constituent is tied to a maximum applies only to a specific incident. Thus the violation (Vfin intr., fNP, 1) indicates that in the presence of an intransitive verbal form in the sentence the current constituent may contain only one fNP. With this it is possible to detect as incorrect by the system sentences such as "Hij loopt de stad" (English: "he walks the town"), after which the operator can correct the sentence by including a preposition (in, to, through) in the last NP. This is a case of a three-element violation.

In step 210 the question is put whether a three-element violation is involved here. If this question is answered in the negative (N), the program goes to step 211. If, on the other hand, the question is answered in the affirmative (Y), step 212 follows, where the question is put whether the label (the third element) representing the incident is still present in the Stack Field and has not been removed therefrom earlier. In the case of an affirmative answer (Y) to the question in step 212 the program goes to step 214 to check whether a violation correction is to take place. In step 211 and in step 214 the question is put whether more than the permissible number of the intended type of functional label occurs. If this is not the case (N), the program goes to step 213 where the flag (or label) introduced in step 209 is allocated the value "TRUE" (thus indicating that the violation is no longer real). Even in the case of a negative answer (N) in step 212 the violation is no longer real and the program will go on to step 213. If, however, the question is answered in the affirmative (Y) in step 211 or step 214, the program goes on to step 215 or 216 respectively, where the flag (or label) introduced at step 209 is given the value "NIL".

In step 217, which follows on steps 215, 213 and 216, the question is put whether the said flag (or label) has the value "TRUE". If that is the case (Y) then this is no longer a case of a genuine violation and in step 218 the violation itself (COB) will be removed from the Violations Field and in the next step 219 the remaining part of the violation will be removed. Step 169 then follows. If a negative answer (N) is obtained in step 217, and are there therefore too many functional labels of the same intended type, then in step 221 the surplus element pair is removed from the Members Field and in step 222 the corresponding element is removed from the Stack Field. It can be taken as a basic rule in this connection that the last element (pair) always represents the surplus part. A more directed removal of the excess element could also be achieved on the basis of considerations such as "with what noun does the article agree", or "what noun agrees with the personal form". After step 222 the program returns to step 210 in order to check whether there are still too many labels of the intended functional type. If the question is answered in the affirmative (Y) in step 188, the correction phase indicated by number 189 is used, the program for this being shown in FIG. 19.

This correction phase deals with the errors relating to a violation obtained by reference to a check whether there are one or more incorrect combinations of features in the Features Field. This check is carried out by reference to the first series of combinations in Table F in step 75 or 84. In the example described there, none of the elements from the combination (neuter, inneuter) provided by Table F was therefore present in the Features Field. In the Violations Field, therefore, the violation (COC to be used for this type of error and the associated combination of features (neuter, inneuter) will be given in the Violations Field).

In step 223, the intended combination (neuter, inneuter) will be called up from the Violations Field and put in the working memory. In step 224, there will be selected from a priority Table L stored in a ninth tabular memory that list of elements which contains the elements of the constituent and which allocates a priority sequence to these (functional) elements. This priority sequence indicates how the various elements are to be adapted to one another and therefore corrected. In the case of the word combination "de huis" (English: "the house") as NP, a tenth tabular memory will indicate the priority sequence (head determiner), so that the article must be adapted to the noun. As comparable example in the English language can be used: "this houses". In the next step 225 an auxiliary variable HLP is called up and receives the value of the combination copied in step 223, in the Dutch case (neuter, inneuter). In the case of the mentioned example in the English language ("this houses") the value of the word combination will be: "sing 1", "sing 2", "sing 3", "plu 1", "plu 2", "plu 3".

In the next program phase, the most important feature in the variable HLP is selected in accordance with the importance of the elements as indicated in the priority Table 1. In the example "de huis" (English: "the house") in step 75 this means that because of the word "huis" as the most important element "neuter" will remain from the combination (neuter, inneuter) and the other elements associated with that constituent have to be adapted accordingly. In the case of the above example in the English language ("this houses") the element "plu 3" will remain as the most important one from the respective combination, and the other elements associated with that constituent have to be adapted accordingly. Accordingly, in step 226 a counting unit (v-counter) whose count corresponds to the serial number of an element in the list selected in step 224 within the priority Table L is reset (v=0). In step 227 the count of the v-counter is then raised (v=v+1) whereupon in step 228 the question is asked whether the count of the v-counter has exceeded the number of elements ($v_{max}$) of the selected list in the priority Table 1. If this question is answered in the affirmative (Y) then step 229 follows.

In the case of a negative answer, step 230 follows in which the element determined by the count of the v-counter in the selected list of the priority table is selected. In step 231 a counter unit (w-counter) whose count corresponds to a certain serial number in the series of elements in the current constituent is then reset to the initial position (w=0). In the next step 232 the count of this counter is increased (w=w+1) whereupon in step 233 a check is made whether the count of the w-counter has exceeded the number of elements (wmax) from the constituent. If this question is answered in the affirmative (Y) the program returns to step 227. In the event of a negative answer to this question (N) then in the next step 234 that element whose serial number corresponds to the count of the w-counter is selected from the Stack Field.

The following step 235 should either be included in or left out of the program according to the core grammar selected. In the case of a core grammar in which the category of a constituent is described in detail by reference to certain associated features, obligatory guidelines may be allocated to certain violations. If, for example, the category designation "neuter" of "house" in the constituent "the house" is complemented to NP-neuter, this creates the obligatory specification that the entire constituent must be written in the "neuter" form. In other words, it is not the conflicting combination (neuter, inneuter) that is written in the Violations Field but the specification "neuter". In the case of the English example "this houses" the category "plu 3" is completed to "NP-plu 3". This creates the obligatory specification that the entire constituent must be written in the "neuter" form. When violation is established the specification "plu 3" is written in the Violations Field. In this case, in step 235 the question is asked whether the list contained in the Violations Field contains only one element, i.e. specification. If that is the case (Y), step 229 follows, in which as a check step the question is also asked whether the variable "HLP" does contain an element. If "HLP" does not contain an element (N), that concludes the program of FIG. 19, and the program goes on to step 169.

If, on the other hand, the question is answered in the affirmative (Y) in step 229, then step 236 follows. If the question is answered in the negative (N) in step 235, then step 237 follows.

If violations are always generated by reference to combinations of features, e.g. from Table F, step 235 can be omitted and step 237 follows directly on step 234. In step 237 the question is asked whether the element (functional label) characterized by the count of the v-counter (see step 226) from the priority list from Table L is equal to the functional label characterized by the count of the w-counter (see counter 232) from the current constituent. If that is not the case (N), then the program returns to step 232. If the question is answered in the affirmative (Y) in step 237, then in the next step 238 there is determined the common part of the list of features associated with the element from the Members Field as indicated by the count of the w-counter (see step 232) and of the list copied from the Violations Field in step 225 and allocated as a substitute value to the variable "HLP". In the present case, the value (neuter, inneuter) for the variable HLP will be replaced by "neuter", since in step 225 the selected list from the priority Table L gave a reference to "head" and therefore to "house" with the feature "neuter".

In the case of the mentioned example in the English language the value ("sing 1", "sing 2", "sing 3", "plu 1", "plu 2", "plu 3") for the variable HLP will be replaced by "plu 3", as in step 225 the selected list from the priority table L gave a reference to "Head" and therefore to "houses" with the feature "plu 3".

In the next step 239 the check question is put whether the variable HLP has obtained a real value in step 238 and is not, for example, idle. If this question is answered in the negative (N), then step 240 follows. Since the HLP variable cannot in this case make any suggestion whereby the correction of the current constituent should take place, the HLP variable is nevertheless allocated a value for the further progress of the program, and this is the first element from the combination obtained in step 243 or 225. The program then goes to step 236.

If the question is answered in the affirmative (Y) in step 239, then step 241 follows, with the question whether the value of the HLP variable as determined in step 238 contains several elements. If that is not the case (N), then step 242 follows where the first element from the combination determined in step 238 is allocated as a new value to the variable "HLP". The program then goes on to step 236. If the question is answered in the affirmative (Y) in step 241, then in the next step 243 the list called up from the Violations Field in step 223 is replaced by the value of the HLP variable as obtained in step 238. The program then goes on to step 232.

In step 236 a function LHF is called up which is to adapt the structure of the current constituent so that the feature determined by means of the HLP function (see steps 240 and 242 respectively), in this case "neuter", may and will be allocated to that structure. In the mentioned example for the English language the feature "plu 3" may and will be allocated to the structure. The function to be called up by step 236 will be explained in detail with reference to FIG. 25. After step 236 the question is put in step 244 whether the Violations Field of the current constituent still contains a violation of the COC type. In the event of an affirmative answer (Y), the program goes back to step 223 and in the event of a negative answer (N) to step 169 (see FIG. 14).

Figure 19:
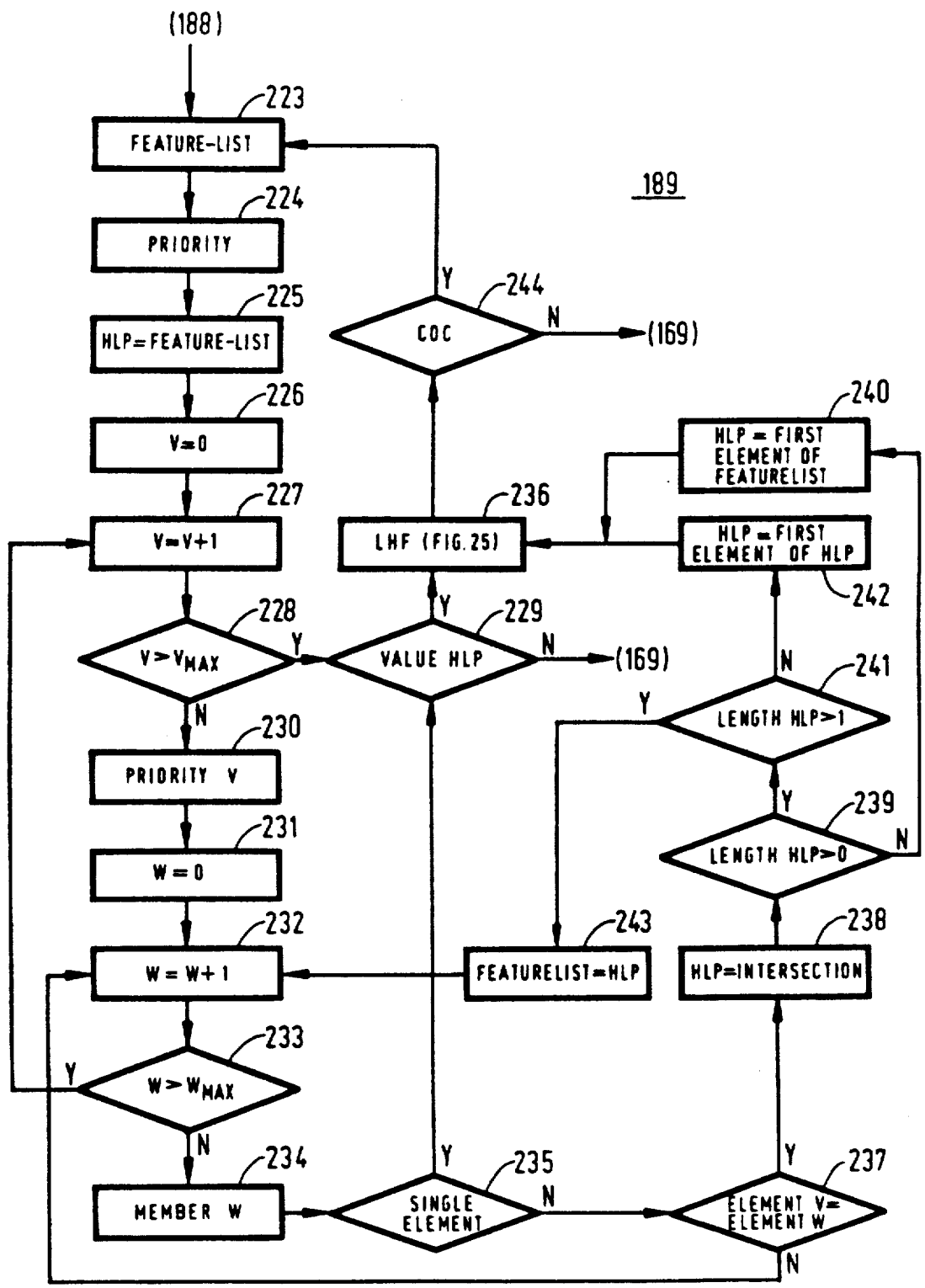
Figure 20:
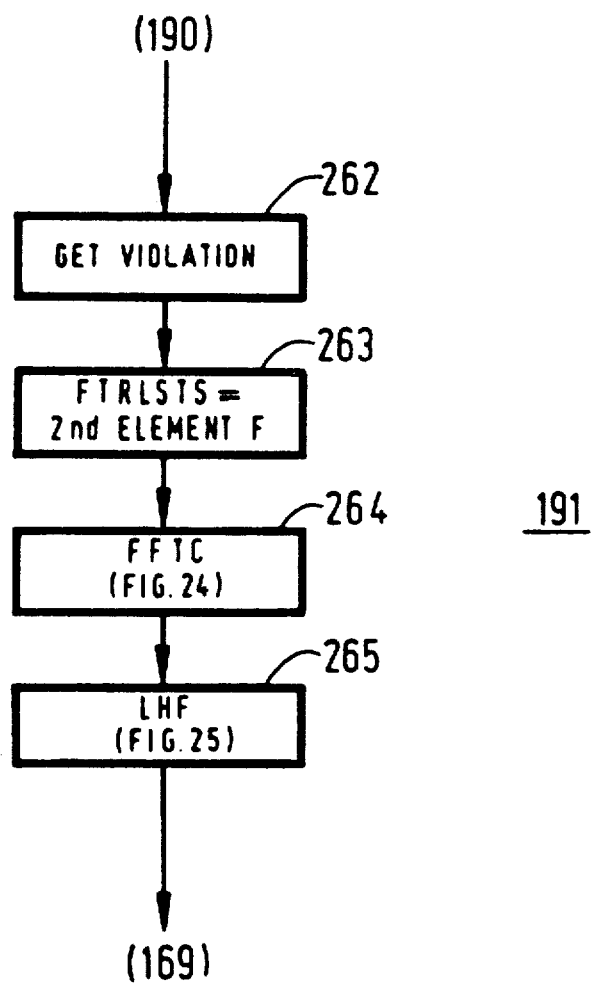
Figure 21:
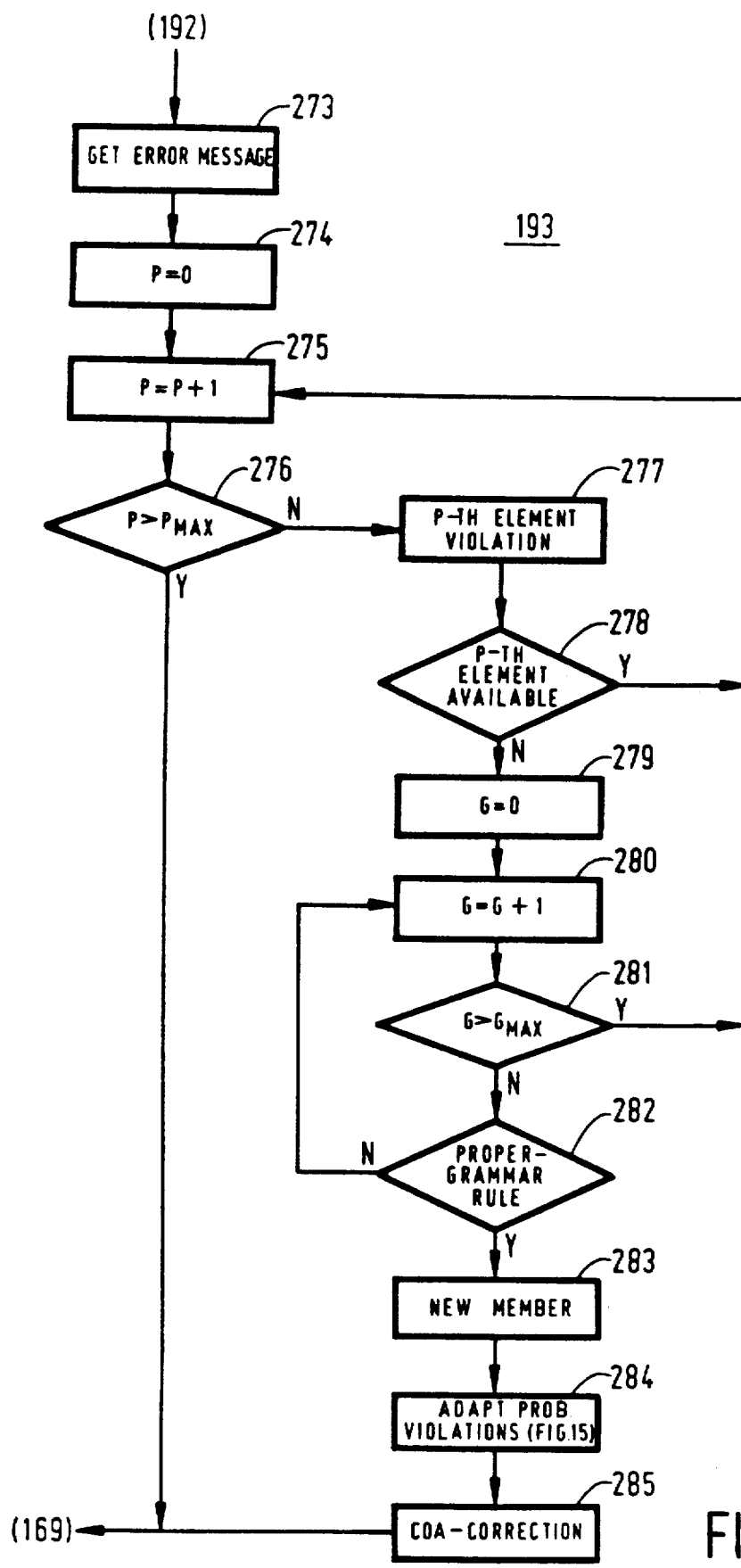
Figure 25:
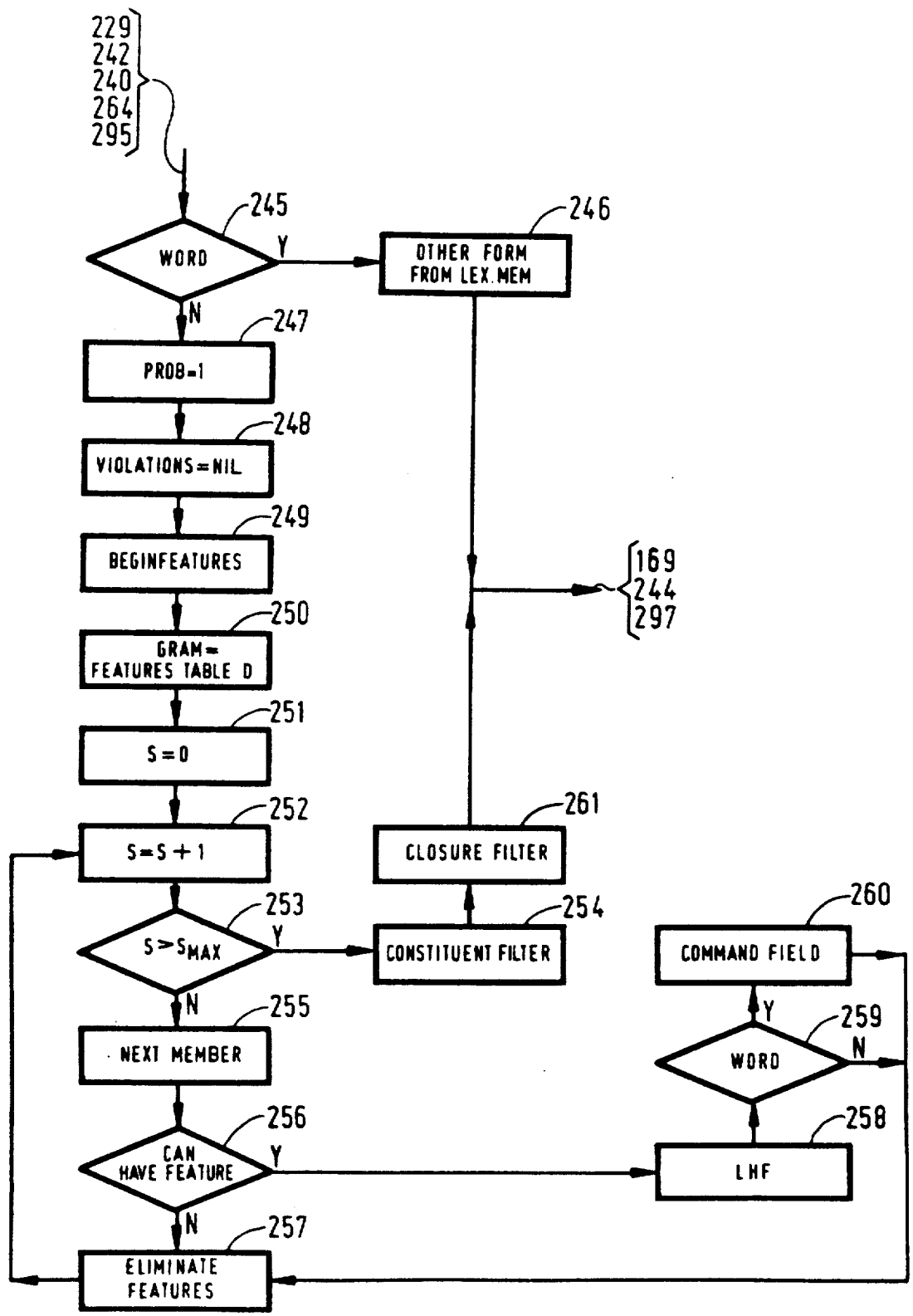
FIG. 25 is a flow diagram of a second auxiliary function from the program relating to the part of a system for grammatically processing.

In FIG. 19 and also FIGS. 20 and 23 which are still to be discussed, the function LHF referred to in step 236 is called up and will be explained with reference to FIG. 25 and starts at step 245 with the question whether the current structure relates to a word. If that is the case (Y), then in the next step 246 a different form is searched in the lexical memory for the current word, which form does satisfy the feature determined by the HP function. The program then goes back to that part of the program which it had left.

In the event of a negative answer (N) to the question in step 245, a number of fields of the constituent are brought into the initial state. This means that in step 247 the Probability Field has the value "1", in step 248 the Violations Field has the value "NIL" and in step 249 the Features Field has the features associated with the category as stated under Table A. Then in step 250 a variable designated "GRAM" is allocated the features which are listed in Table D for the category of the current constituent and the functional label.

The various elements (members) of this constituent should then be adapted to the feature determined by the HLP function, in this case "neuter". For this purpose, in step 251, a counting unit (s-counter) whose count corresponds to the serial number of the member elements in this Constituent is reset to the initial value (s=0), whereupon in step 250 the count of this counter is increased (s=s+1). In step 253 the question is then put whether the count of the s-counter has gone above the number of member elements ($s_{max}$) within this Constituent. If that is the case (Y), then step 254 follows. If the question of step 253 is answered in the negative (N), then step 255 follows in which the member element of the Constituent corresponding to the count of the s-counter is called up from the representation memory and written in the working memory.

In the next step 256 the question is put whether the member element within the Constituent as determined by the count of the s-counter can be allocated the feature determined by the HLP variable, in this case "neuter", and does not already possess it. Thus in the NP-Constituent, "de grote, mooie huis" (English: "the large beautiful house") the article "de" will give an answer in the affirmative, since in Table D the feature "neuter" comes under the possibilities in the case of "NP" and "determiner". When using the NP-constituent "this large, beautiful houses" as an examplary phrase in the English language the pro-adjective "this" will give an answer in comes under the possibilities in the case of "NP" and "determiner".

Via steps 258 and 245 the equivalent of this determiner with the feature "neuter" will be searched in step 246 and this leads to the word "het". In the last-mentioned example in the English language the feature "plu 3" leads to the word "these". For the following combination "grote, mooie" (English: large, beautiful) with the label nmod-A there will be no reference made to nmod-A in Table D, so that the answer to the question of step 256 is negative. In the next step 257 the Features Field of this member element is adapted using Table D as explained in connection with step 74. The word "huis" (English: "house") already has the feature "neuter" and consequently the program will go on to step 257 after step 256. In the case of the last-mentioned example in the English language the word "houses" already has the feature "plu 3" and consequently the program will go on to step 257 after step 256.

In the event of an affirmative answer (Y) to the question in step 256, step 258 follows, where the function LHF to be described in this Figure is again executed. The final result of this function is always in step 246, where the adapted lexical form is selected for the then valid member element.

If the member element has a word structure then the Command Field must also be filled in. To this end, in step 259 a corresponding question is put and in the event of an affirmative answer (Y) in step 260 the pointer to the parent constituent is filled in in the Command Field. The program then goes on to step 257. In the event of a negative answer (N) to the question in step 259 the program goes directly to step 257.

If the question is answered in the affirmative (Y) in step 253, a check is made to determine whether there are still violations to be entered in the Violations Field in connection with the changed constituent. To this end, in step 254 and, then in step 261, some filter operations are performed which have already been described in steps 75 and 67, respectively. The program then returns to that place in the program which is left in order to execute this LHF function.

If the question is answered in the affirmative (Y) in step 190, then the correction phase designated by number 191 is applied. The program for this step is shown in FIG. 20.

This correction phase deals with errors relating to impermissible feature combinations as established in step 75 or 84 by reference to Table F. This correction phase also contains an important part in which a search is made for what the required feature should be. To this end it is assumed that both the violation itself, i.e. "COD", and the features to be replaced are shown in the Violations Field of the current constituent. This correction phase starts with step 262, the second element of this violation being transferred from the representation memory to the working memory. In step 263 the list of legal feature combinations associated with the said second element and with the constituent category is called up from Table F and allocated to a variable "FTRLSTS" in the working memory. In the next step 264, function "FFTC" is called up and gives the required feature by reference to the list of legal feature combinations and the features present on the Features Field of the constituent. The function "FFTC" is explained in detail in FIG. 24. In step 265 the required feature is then added to the current constituent by reference to the function LHF" (see FIG. 25). In this a word will be replaced by another form of the word.

Figure 24:
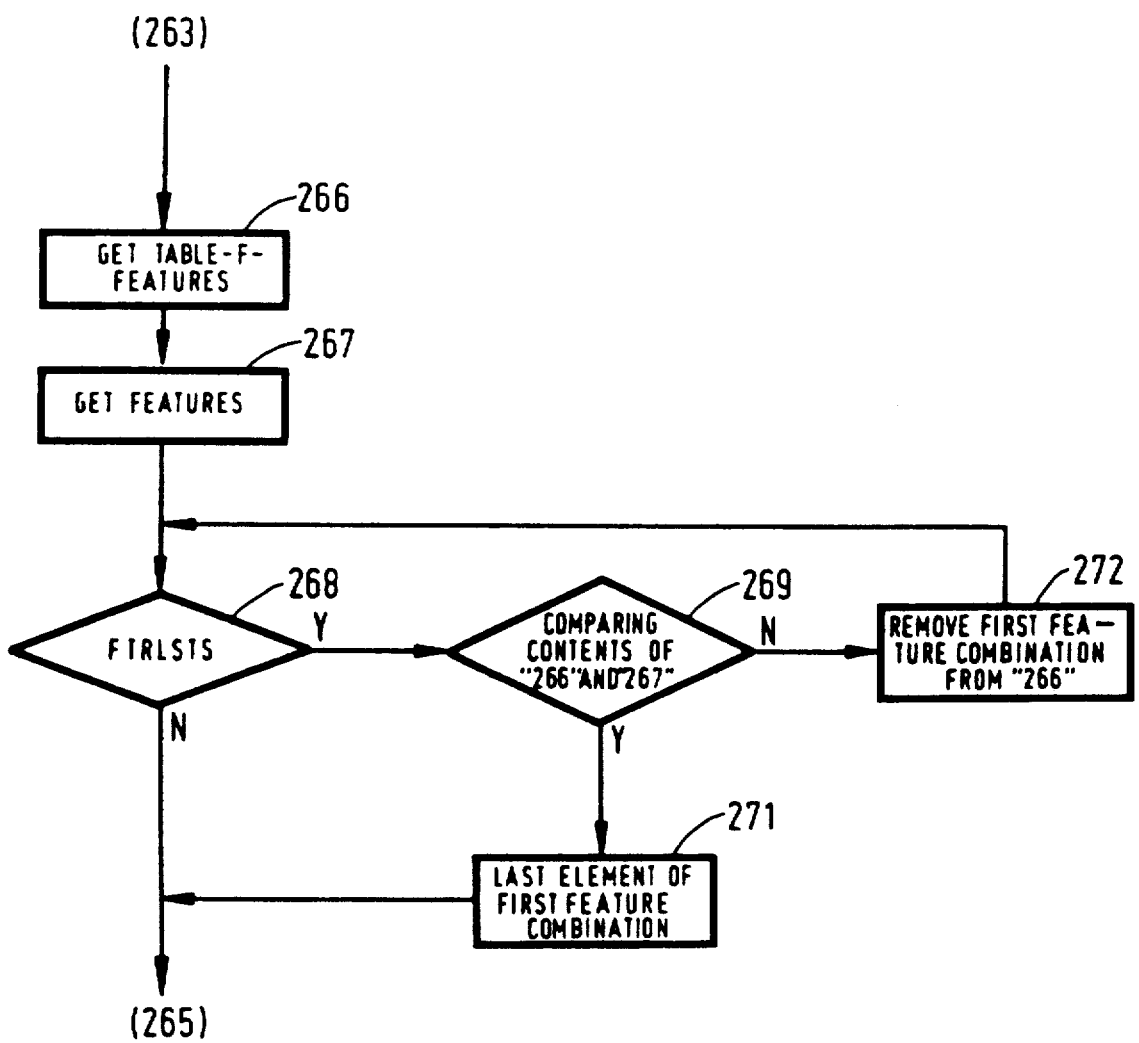
FIG. 24 is a flow diagram of a first auxiliary function from the program relating to the extended part of a system for grammatically processing.

The function "FFTC" in FIG. 24 works with two arguments, namely the list with permitted features from Table F and the list of features from the Features Field, which are placed in the working memory in steps 266 and 267.

In the next step 268 a check is made whether the variable "FTRLSTS" which at the initial phase of execution of the function "FFTC" still had the complete list of permissible feature combinations, still does have such a combination over. In the event of a negative answer to this question (N) the program of FIG. 24 is executed and goes back to FIG. 20 to execute step 265. In the event of an affirmative answer (Y) to the question in step 268, the question is put in the next step 269 whether all the elements of the features combination considered as the first such combination at that time, with the exception of the last element in that combination, are also found in the list of the actual features (see step 267). In the event of a negative answer (N) to this question, the first combination still occurring at that time in the list of permissible feature combinations is removed in the next step 272 and the program goes on to step 268. In the event of an affirmative answer (Y) to the question in step 269 then in the next step 271 the last element from the investigated (first) feature combination is indicated as the required feature.

If, for example, there is only one legal feature combination left over for the variable "FTRLSTS", in this case "neuter indefinite adj-not-inflected" (see Table F), and if "neuter" and "indefinite" also occur on the list of actual elements (see step 267) then the last element, in this case "adj-not-inflected", is the required feature. The program of FIG. 24 is thus also over and then goes on to step 265 of FIG. 20, whereupon this correction phase is left and the program returns to step 169. In the event of an affirmative answer (Y) to the question in step 192 a correction phase designated step 193 follows, the program of this being shown in FIG. 21. This correction phase deals with violations which are generated as a result of the absence of an essential element, such as an article in some NPs, in step 67 and/or 95. The closure phase of the associated constituent occurring in these conditions resulted in a lowering of the probability factor with the generation of a violation COE. This violation and the intended combination of list segments resulting in this violation are transferred from the Violations Field to the working memory in step 273. In the next step 274 a check is made as to what functional label is absent in the second list segment. Although only one label generally fills this list segment it is possible that a plurality of labels occur therein. To this end, a counter unit (p-counter) whose count corresponds to the serial number of a functional label in the second list segment is reset to the starting value (p=0). The p-counter is then raised in step 275 (p=p+1) and in step 276 the question is asked whether the count of the p-counter has already exceeded the number of functional labels ($p_{max}$) in the second list segment ($p > p_{max}$). If this is the case (Y) the program goes on to step 169 while if it is not the case (N) step 277 follows, in which the $p^{th}$ element is selected in the second list segment.

In step 278, a check is made to determine whether the $p^{th}$ element really does not occur in the Stack Field. (For this purpose the elements of the Stack Field are compared one by one with the $p^{th}$ element and if non-identity is established between the compared elements up to and including the last label of the Stack Field, the $p^{th}$ element is absent in the Stack Field). If the presence of the $p^{th}$ element is established in step 278 (Y), step 275 follows, if not (N) then step 279 follows. If the $p^{th}$ element functioning as functional label is established as an absent element, this label can be added to the Stack Field. However, an associated word structure or constituent structure is still lacking. In practice this is usually a word structure.

The associated word structure is obtained by checking Table B for what word category is permissible for a specific parent constituent and functional label of the absent member element, and by then selecting in the lexical memory the first word that satisfies this. To this end, in step 279 a counting unit (g-counter) whose count corresponds to the serial number of a specific combination in the tabular memory divided up in accordance with Table B is first reset to the starting position (g=0). In step 280 the count of the g-counter is then raised (g=g+1) and in the next step 281 a check is made whether the count of the g-counter has come out above the number of grammar rules in the tabular memory according to Table B. If so (Y) the program goes back to step 275 and if not (N) step 282 follows where a check is made whether the grammar rule has the absent functional label from which the word category then follows. If, for example, the functional label "det" is absent in an NP (see step 67 and 95), then it follows from the first grammar rule "article" (NP(det))"that a word category "article" is possible in the constituent.

If the proper grammar rule is not detected (N) in step 282, the program goes back to step 280. Otherwise (Y) in step 283 the first word structure occurring in connection with the word category found is searched in the lexical memory and the Stack Field and the Members Field are filled up with the associated functional label or with that label and the word structure found.

In step 284 in connection with the current constituent the Probability Field, the Violations Field and the Features Field are then adapted to the current situation as explained in connection with steps 174 and 183 (see FIG. 15). Then in step 285 a check must be made to determine whether the newly introduced element is in the correct place, and this implies running a program phase as described in connection with steps 98 to 205

Figure 22:
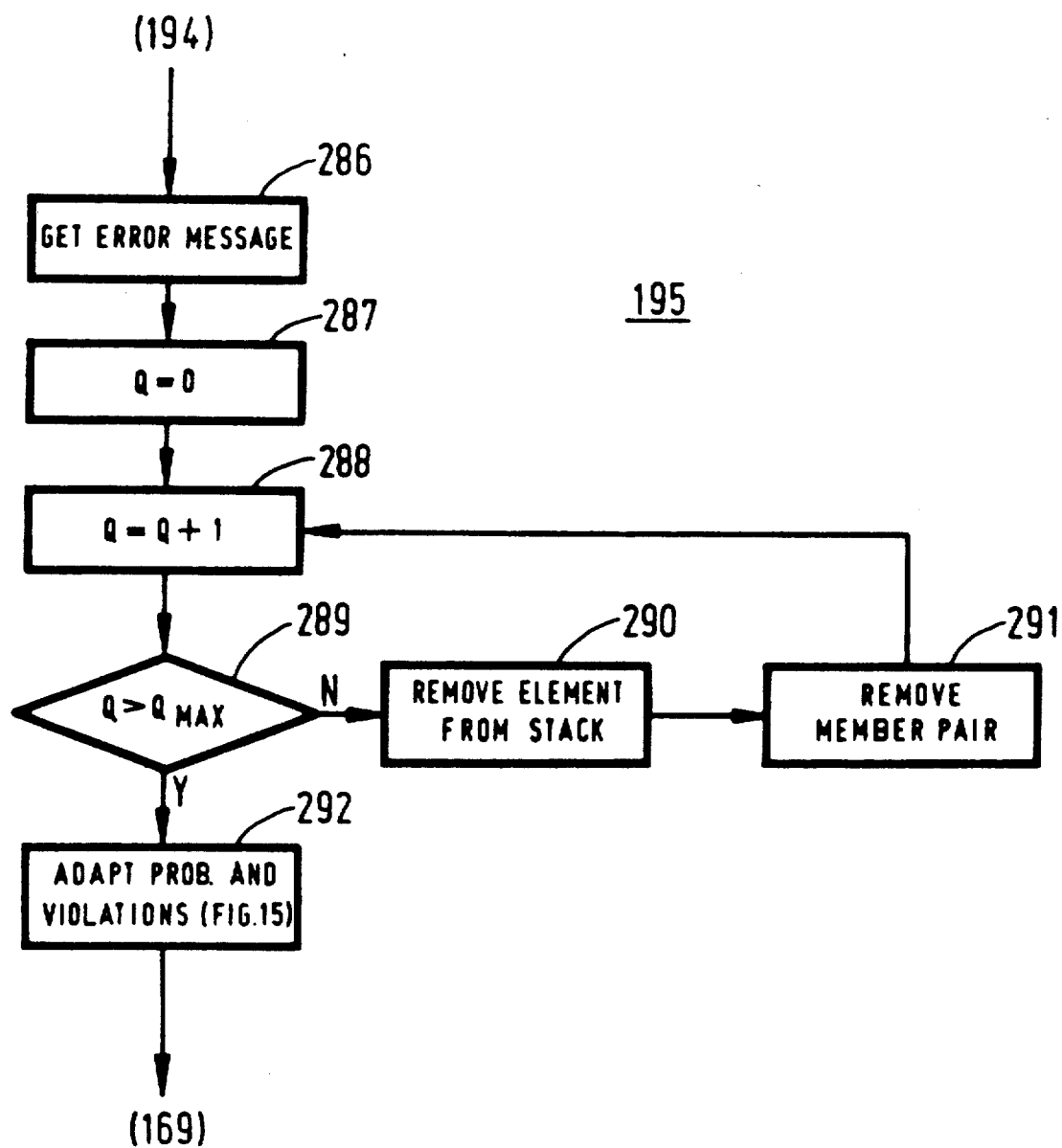

(see FIG. 17), after which the correction phase for violation "COE" is finished and the program goes on to step 169. In the event of an affirmative answer to the question in step 194 (Y) the correction phase designated 195 is applied, the program for which is shown in FIG. 22.

This correction phase is in fact a counterpart of that associated with the "COE" violation. In the correction phase to be considered here, a surplus element is involved, and this is established by reference to Table K as in the case of step 67 and/or 95. The violation itself, in this case "COF", and the list of surplus functional labels are transferred from the Violations Field to the working memory step 286.

In step 287 a counting unit (q-counter) whose count corresponds to the serial number of an element in the list of surplus functional labels is then reset to the starting value (q=0) and in step 288 the count of the q-counter is raised (q=q+1). In step 289 a check is then made to determine whether the count of the q-counter has exceeded the number of elements ($q_{max}$) in the third list segment of the associated grammar rule. If this is not the case (N) then during step 290 the associated element is removed from the Stack Field and during step 291 the associated pair of elements is removed from the Members Field. The program then returns again to step 288. In the event of an affirmative answer (Y) to the question in step 289, then in step 292 the probability Field, the Violations Field and the Features Field will be adapted to the current situation in connection with the current constituent as explained in connection with steps 174 to 183 (see FIG. 5). This correction phase is then left and the program returns to step 169.

Figure 23:
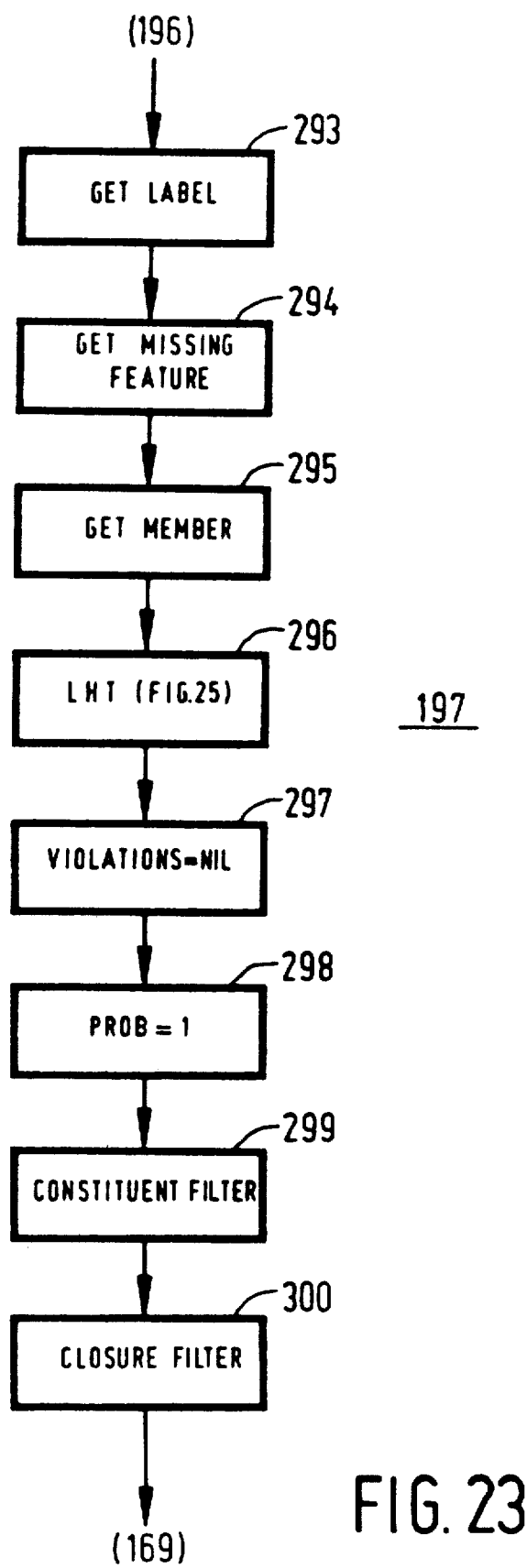

In the event of an affirmative answer (Y) to the question in step 196, the correction phase designated 197 is applied, the program for this being shown in FIG. 23. This correction phase deals with errors relating to an absent feature in the Violations Field, this being established by reference to Table I in step 128. A fairly detailed violation is taken as the basis for this, containing not only the violation "COG" but also the functional label of the structure to be corrected and the absent feature. For the example in step 128 this was: (vfin main, sing 3). In steps 293 and 294 the label "vfin main" and the absent feature "sing 3" are successively called up from the Violations Field. The label corresponds to a specific constituent structure or word structure, in this case "lopen" (English: "walk"), in the Members Field. This structure is called up in step 295. In step 296 the function "LHF" is then executed, this having already been explained by reference to FIG. 25. Finally, in step 246 in the above-mentioned case the structure "lopen" (English: walk") will be replaced by "loopt" (English: "walks"), which satisfies the feature "sing 3". The higher level constituent should then be adapted to the change introduced, for which purpose in step 297 the Violations Field of that constituent is emptied and in step 298 the Probability Field is allocated the value "1". In steps 299 and 300 some check operations are then carried out on the current constituent and these have been described successively in connection with steps 75 and 67 respectively. This correction phase is then left and the program returns to step 169. To elucidate the above correction procedure of a wrong text program sequences for correcting a text phrase in the Dutch language (Example A) and in the English language (Example B) are added to this description.

A special application of the parser described and the associated correction procedure is obtained by replacing words in a text by other words. In a multi-author system in which a number of people each provides his own text contribution to an extensive document it may occur, as a result of the individual contribution of the people concerned, that the word usage in the document is not consistent. To obtain a consistent word usage in the document certain words should be replaced by others. The replacement of one word by another may have certain consequences. In the case of an example in the Dutch language the replacement of a neuter noun by a noun of the non-neuter type sometimes requires adaptation of the article or adjective. In the English language the replacement of a "neutral"-noun by a noun of the male or female type may also have its consequences as to the replacement of the other words. This may occur, for instance, at the relative pronoun. Adaption of the sentence is also necessary if a singular subject is replaced by a plural subject.

Figure 26:
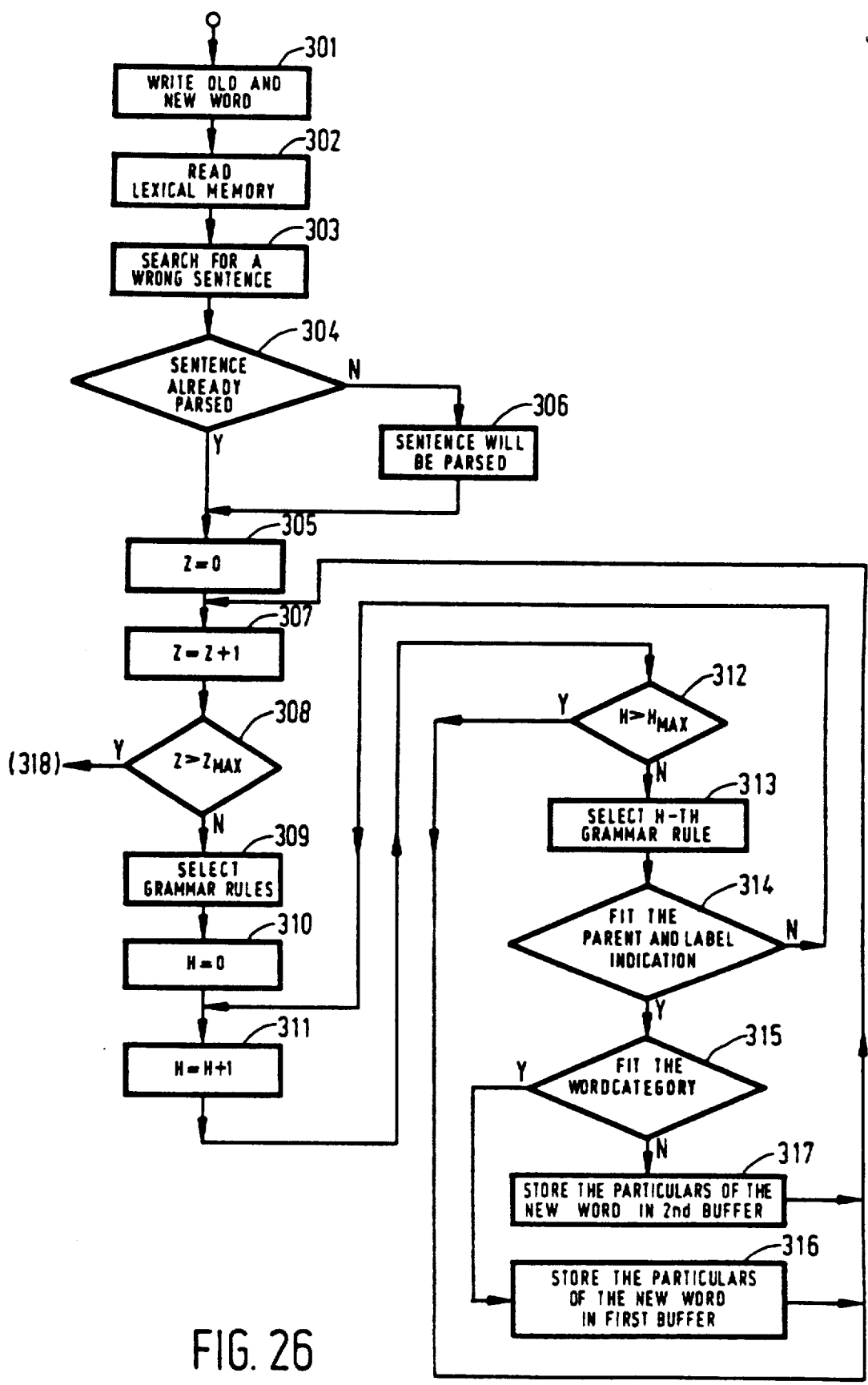
FIG. 26 is a flow diagram of a first part of a specific method of use of the form of said extended part shown in FIG. 13.

The replacement procedure starts with step 301 (see FIG. 26), the replacement word and the word to be replaced being written into the working memory. In step 302 the word structure for the replacement word is called up from the lexical memory and written in the working memory.

In step 303 the program then runs the text to stop at the first sentence in which the word for replacement occurs. In step 304 the question is put whether there is already a parsing result of this sentence stored in the memory.

If so (Y) the program goes to step 305, otherwise (N) to step 306, where the sentence is parsed and the program then goes to step 305. In the first place, during replacement a check is made whether a corresponding word category can be found for both words. There is also the possibility that there may be agreement in the functional label despite a difference in word category. Thus the word categories "noun" and "pronoun substantive" carry the same labels in the grammar rules as shown in Table B. A "noun" in an NP with the label "head" can therefore be replaced by a "pronoun substantive". Similar possibilities apply to an "article" and "pronoun adjective". A check can therefore be made whether the combination of a constituent and a functional label as established by the parser also occurs in grammar rules associated with one of the word categories of the replacement word structure. Since the replacement word must be inspected for each category occurring, a z-counter is reset to zero (z=0) in step 305. The count of the z-counter corresponds to the serial number of the word category as it occurs in a word structure in the lexical memory. In step 307 the count of the z-counter is then raised (z=z+1) and in step 308 the question is put whether the count of the z-counter has exceeded ($z>z_{max}$) the number of categories occurring in connection with the replacement word. If not (N) then in step 309 the set of grammar rules associated with the word category determined by the count of the z-counter is selected in the tabular memory with the information of Table B.

Within this set a check is made in the case of each grammar rule to determine whether the same label is possible within the intended constituent for the current word category. For this purpose, in step 310 a counting unit (h-counter) is reset (h=0) and in step 311 the count of this counter is raised (h=h+1). In step 312 a check is then made whether the count of-the h-counter is larger than the number of grammar rules in connection with the current word category ($h > h_{max}$). If so (Y) the program goes back to step 307. If not (N) the program goes to step 313. In step 313 from the set of grammar rules there is selected that rule whose serial number corresponds to the count of the h-counter and in step 314 a check is made whether the parent constituent and the functional label in that grammar rule satisfy those of the word structure to be replaced. If not (N) the program goes back to step 311. If, however, it is the case (Y), step 315 follows in which a check is made whether the intended word category of the replacement word agrees with that of the word to be replaced. If so (Y) the program goes to step 316, the replacement word with the current word category and associated features being written in a first buffer. If the question is answered in the negative (N) in step 315, step 317 follows, the replacement word with the current word category and the associated features being written in a second buffer. After step 316 or 317 the program goes back to step 307.

Figure 27:
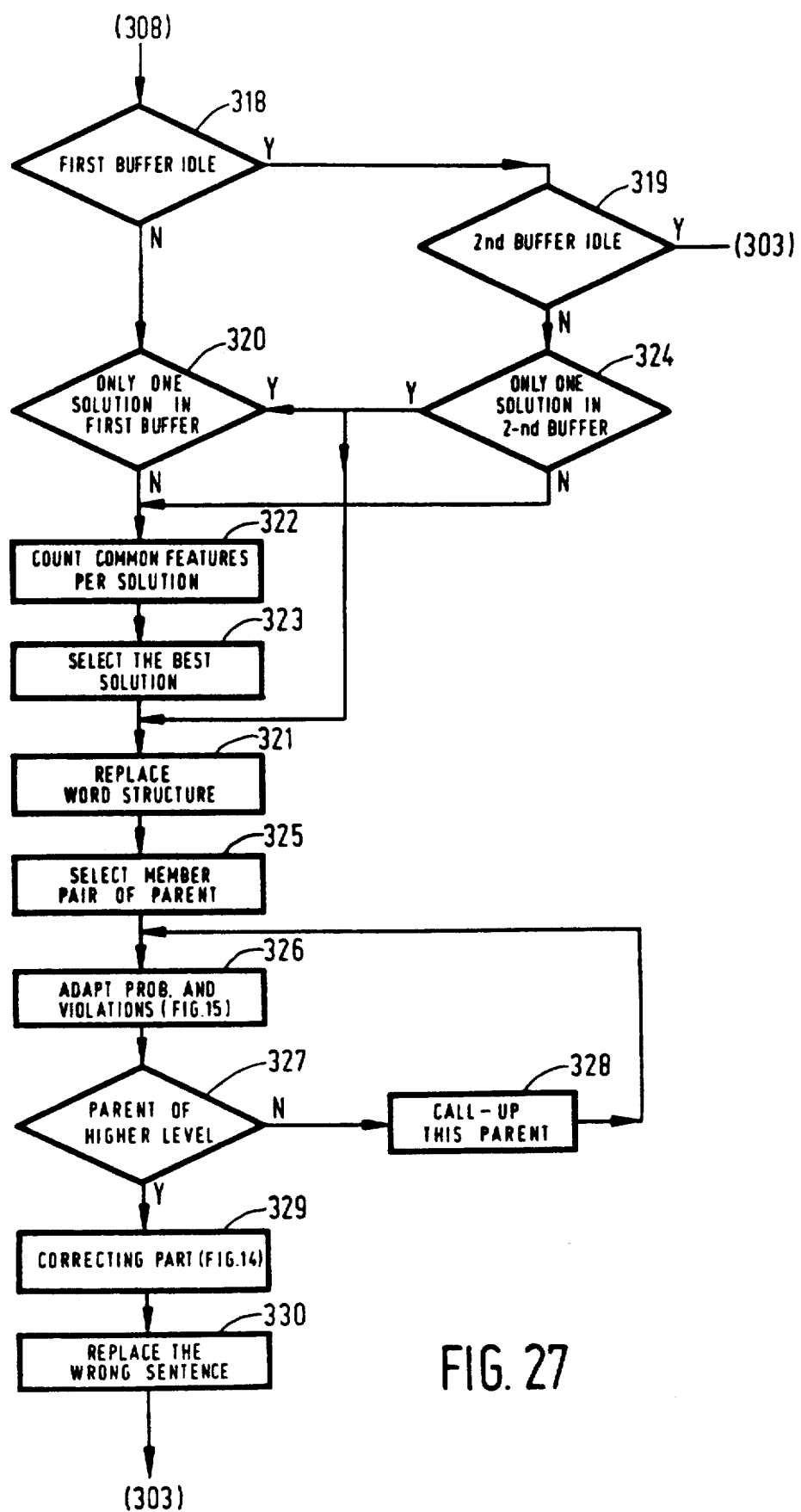
FIG. 27 is a flow diagram of the part following the flow diagram in FIG. 26.

If the question is answered in the affirmative (Y) in step 308, then in the next step 318 (see FIG. 27) the question is asked whether no solution has been written into the first buffer in step 316. If this question is answered in the affirmative (Y), step 319 follows in which the question is asked whether no solution has been written into the second buffer in step 316. If this question is answered in the affirmative (Y) the word for replacement may not be replaced by the replacement word at this place in the text and the program returns to step 303. The word for replacement and the replacement word agree only in spelling, otherwise disagree. Something of this kind may occur with words such as "like" in English and "regent" in Dutch. Thus in a Dutch sentence "het regent" (English: "it rains") the word "regent" may not be replaced by the Dutch word "bestuurder" (which is the equivalent of the English word "ruler"). An equivalent example in the English language is obtained with the sentence "She is like her mother", in which the word "like" may not be replaced by "love".

If the question is answered in the negative (N) in step 318, step 320 follows, in which the question is put whether precisely one solution result has been written in the first buffer in step 316. If so (Y) step 321 follows. If, however, this is not the case (N), step 322 follows, where the number of features of each solution result in common with the word structure for replacement is determined, whereafter in step 323 the solution result having the largest number of common features is selected and the program goes on to step 321.

If the question is answered in the negative (N) in step 319, step 324 follows, in which the question is put whether there is precisely one solution result written into the second buffer in step 317. In the event of an affirmative answer (Y), step 321 follows while a negative answer (N) is followed by the said steps 322 and 323 one after the other, whereupon the program goes on to step 321.

In step 321 the old word structure is replaced by the new word structure which is or is not obtained by selection in steps 322 and 323. In this the pointer in the Command Field of the old word structure is taken over in favor of the Command Field of the new word structure.

In step 325 the constituent structure of the parent constituent is then called up from the representation memory and there is selected in the Members Field that combination which has a pointer to the old structure. This pointer is replaced by one which refers to the new word structure. The functional label associated therewith naturally does not change. In the next step 326 there is run for the parent constituent called up, a program part as described in connection with steps 174 to 183 (see FIG. 15), so that the features and Violations Field are adapted to the new situation.

In step 327 a check is then made whether there is a parent constituent of a higher level. To this end, a check is made whether the Command Field of the current constituent is idle (NIL). In the event of a negative answer (N) to this question, step 328 follows, the parent constituent of the higher level being called up from the representation memory, the program then returning to step 326 to apply the associated program to that parent constituent. In the event of an affirmative answer (Y) to the question in step 327 then in the next step 329 a program is executed as described in connection with steps 158 to 173 (see FIG. 14). In this way the sentence structure is corrected further if necessary.

Once it is clear that the entire action after step 301 has given a result, then in the next step 330 the old sentence structure can be replaced by the new one. The program then returns to step 303 searching for the next word for replacement. Thus if the word "apparaat" (English: "apparatus") is to be replaced throughout the text by "copiers" a sentence such as "Net apparaat, dat daar staat" (English: "the apparatus which is over there") is automatically replaced by "De copiers, die daar staan" (English: "the copiers which are over there").

Example A

| het minister (English: the minister) | |
|---|---|
| --FNP | --NP CO6(NEUTER INNEUTER) |
| ---DET | ---ARTICLE - het |
| ---HEAD | ----NOUN - minister |
| --ENDMARK | --INTERPUNCTION - |

S(CONSTITUENT CATEGORY S COMMAND NIL MEMBERS
    ((ENDMARK #S (WORD CATEGORY INTERPUNCTION COMMAND
        NIL STRING "." FEATURES NIL))
    (FNP #S(CONSTITUENT CATEGORY NP COMMAND NIL MEMBERS
        ((HEAD #S(WORD CATEGORY NOUN COMMAND
            NIL STRING
            "minister"
            FEATURES
            (SING3 INNEUTER TYPE2))
        (DET #S(WORD CATEGORY ARTICLE COMMAND
            NIL STRING
            "het" FEATURES
            (NEUTER
            SING3 DEFINITE))))
        STACK (HEAD DET) PROB
            0.9500000000000001
        FEATURES
        (DEFINITE SING3 NO-ADJ) VIOLATIONS
        (CO6 (NEUTER INNEUTER)))))
STACK (ENDMARK FNP) PROS 0.9500000000000001
FEATURES
NIL VIOLATIONS NIL) - CONSTITUENT The following program steps are passed through during the correction procedure of the above phrase.

155, 156, 158, 159, 161, 162, 163, 164 (It is not a constituent, but a word with label Endmark), 161, 162, 163, 164 (It is really a constituent with label fNP), 158, 159, 160, 161, 162, 163, 164 (a word Head), 161, 162, 163, 164

(a word Det), 161, 162 (the current constituent has only two members), 166, 167 (this step does not result in any change), 168, 169, 170, 171, 172 (the violation COC is mentioned), 184, 186, 188, 189 (COC-correction is called up), 223, (feature-list is "neuter inneuter"), 224 (priority: "head, det, nmods, nmod-a"), 225, 226, 227, 228, 230, 231, 232, 233, 234, 235, 237, 238 (HLP: "inneuter"), 239, 241, 242 (HLP is now inneuter), 236 (LHF is called up), 245 (NP is not a word), 247, 248, 249, 250, 251, 252, 253, 255, 256 (the Head can have the feature "inneuter"), 258, 245, 246 (the Head has already the feature "inneuter", so no change takes place), 259, 260, 257, 252, 253, 255, 256 (Also a Determiner can have the feature "inneuter"), 258, 245, 246 (the Word-structure is replaced by another Word-structure, namely that of the article "de"), 259, 260, 257 (the NP has still the feature "inneuter") 252, 253, 254, 261, 244 (COC-code is disappeared), 169, 170, 173, 174, 175, 176, 177, 178, 179, 180, 181, 178, 179, 180, 181, 178, 179, 182, 183, 161, 162 (Also the Constituent S has only two members), 166 (Constituent S has not any violation), 173, 174, 175, 176, 177, 178, 179, 180, 181, 178, 179, 180, 181, 178, 179, 182, 183 (there are no changes), 157 (this is the end of the correction program).

The following program steps are passed through during the correction procedure of the above phrase. 155, 156, 158, 159, 160, 161, 162, 163, 164 (It is not a constituent, but a word with label Endmark), 161, 162, 163, 164 (It is really a constituent with label fNP), 158, 159, 160, 161, 162, 163, 164 (a word: Head), 161, 162, 163, 164 (a word Det), 161, 162 (the current constituent has only two members), 166, 167 (this step does not result in any change), 168, 169, 170, 171, 172 (the violation COC is mentioned), 84, 186, 188, 189 (COC-correction is called up), 223, (feature-list is "sing 1 sing 2 sing 3 plu 1 plu 2 plu 3"), 224 (priority: "head, det, nmod-s, nmod-a"), 225, 226, 227, 228, 230, 231, 232, 233, 234, 235, 237, 238 (HLP: "plu 3"), 239, 241, 242 (HLP is now plu 3), 236 (LHF is called up), 245 (NP is not a word), 247, 248, 249, 250, 251, 252, 253, 255, 256 (the Head can have the feature "plu 3"), 258, 245, 246 (the Head has already the feature "plu 3", so no change takes place), 259, 260, 257, 252, 253, 255, 256 (Also a Determiner can have the feature "plu 3"), 258, 245, 246 (the Word-structure is replaced by another Word-structure, namely that of the article "these"), 259, 260, 257 (the NP has still the feature "plu 3") 252, 253, 254, 261, 244 (COC-code is disappeared), 169, 170, 173, 174, 175, 176, 177, 178, 179, 180, 181, 178, 179, 180, 181, 178, 179, 182, 183, 161, 162 (Also the Constituent S has only two members), 166 (Constituent S has not any violation), 173, 174, 175, 176, 177, 178, 179, 180, 181, 178, 179, 180, 181, 178, 179, 182, 183 (there are no changes), 157 (this is the end of the correction program).

Example B

| this houses | |
|---|---|
| --FNP | --NP CO6 (sing 1 sing 2 sing 3 plu 1 plu 2 plu 3) |
| ---DET | ---PRO-ADJ-this |
| ---HEAD | ---NOUN - houses |
| --ENDMARK | --INTERPUNCTION - |

S(CONSTITUENT CATEGORY S COMMAND NIL
MEMBERS
    ((ENDMARK #S (WORD CATEGORY INTERPUNCTION
        COMMAND NIL STRING "."
        FEATURES NIL))
(FNP #S(CONSTITUENT CATEGORY NP
COMMAND NIL
    MEMBERS
    ((HEAD#S(WORD CATEGORY
    NOUN COMMAND
        NIL STRING
        "houses" FEATURES
        (plu 3 neutral TYPE2))
    (DET #S(WORD CATEGORY PRO-AJD
        COMMAND NIL STRING "this"
        FEATURES (SING3
        DEFINITE))))
    STACK (HEAD DET) PROB
        0.9500000000000001 FEATURES
    (DEFINITE NO-ADa) VIOLATIONS
    (CO6 (sing 1 sing 2 sing 3 plu 1
    plu 2 plu 3)))))
STACK (ENDMARK FNP) PROB
0.9500000000000001
        FEATURES NIL VIOLATIONS
        NIL) -
        CONSTITUENT Example C Enter an English sentence The minister gives a petition.

```
--SUBJ                  --NP
----DET                 ----ARTICLE - The
----HEAD                ----NOUN - minister
--VFIN-MAIN             --VERB - gives
--OBJ                   --NP
----DET                 ----ARTICLE - a
----HEAD                ----NOUN - petition
--ENDMARK               --INTERPUNCTION - .

#S(CONSTITUENT CATEGORY S COMMAND NIL MEMBERS
    ((ENDMARK #S(WORD CATEGORY INTERPUNCTION COMMAND NIL STRING "."
                FEATURES NIL))
    (OBJ #S(CONSTITUENT CATEGORY NP COMMAND NIL MEMBERS
            ((HEAD #S(WORD CATEGORY NOUN COMMAND NIL STRING
                        "petition" FEATURES (SING3)))
            (DET #S(WORD CATEGORY ARTICLE COMMAND NIL STRING "a"
                        FEATURES (INDEFINITE SING3))))
            STACK (HEAD DET) PROB 1 FEATURES
            (INDEFINITE SING3 NO-ADJ) VIOLATIONS NIL))
    (VFIN-MAIN
        #S(WORD CATEGORY VERB COMMAND NIL STRING "gives" FEATURES
            (SING3 TRANSITIVE)))
    (SUBJ #S(CONSTITUENT CATEGORY NP COMMAND NIL MEMBERS
            ((HEAD #S(WORD CATEGORY NOUN COMMAND NIL STRING
                        "minister" FEATURES (SING3)))
            (DET #S(WORD CATEGORY ARTICLE COMMAND NIL STRING
                        "The" FEATURES (DEFINITE PLU3 SING3))))
            STACK (HEAD DET) PROB 1 FEATURES
            (DEFINITE SING3 NO-ADJ) VIOLATIONS NIL)))
    STACK (ENDMARK OBJ VFIN-MAIN SUBJ) PROB 1 FEATURES NIL
```

VIOLATIONS
    NIL) - CONSTITUENT

Enter an English sentence

The minister give a petitions.
Threshold verlaagd tot 0.9
(Threshold lowered to 0.9)

C010
(VFIN-MAIN SING3)

| | |
|---|---|
| --SUBJ | --NP |
| ----DET | ----ARTICLE - The |
| ----HEAD | ----NOUN - minister |
| --VFIN-MAIN | --VERB - give |
| --OBJ | --NP C09(DET) |
| ----DET | ----ARTICLE - a |
| ----HEAD | ----NOUN - petitions |
| --ENDMARK | --INTERPUNCTION - . |

S(CONSTITUENT CATEGORY S COMMAND NIL MEMBERS
    ((ENDMARK #S(WORD CATEGORY INTERPUNCTION COMMAND NIL STRING "."
                FEATURES NIL))
    (OBJ #S(CONSTITUENT CATEGORY NP COMMAND NIL MEMBERS
            ((HEAD #S(WORD CATEGORY NOUN COMMAND NIL STRING
                    "petitions" FEATURES (PLU3)))
            (DET #S(WORD CATEGORY ARTICLE COMMAND NIL STRING "a"
                    FEATURES (INDEFINITE SING3))))
            STACK (HEAD DET) PROB 0.9700000000000002 FEATURES
            (INDEFINITE NO-ADJ) VIOLATIONS C09 (DET))))
    (VFIN-MAIN

S(WORD CATEGORY VERB COMMAND NIL STRING "give" FEATURES
    (TRANSITIVE SING1 SING2 PLU1 PLU2 PLU3)))

```
(SUBJ #S(CONSTITUENT CATEGORY NP COMMAND NIL MEMBERS
            ((HEAD #S(WORD CATEGORY NOUN COMMAND NIL STRING
                        "minister" FEATURES (SING3)))
            (DET #S(WORD CATEGORY ARTICLE COMMAND NIL STRING
                        "the" FEATURES (DEFINITE PLU3 SING3))))
            STACK (HEAD DET) PROB 1 FEATURES
            (DEFINITE SING3 NO-ADJ) VIOLATIONS NIL)))
STACK (ENDMARK OBJ VFIN-MAIN SUBJ) PROB 0.9312000000000004
FEATURES NIL VIOLATIONS (CO10 (VFIN-MAIN SING3))) - CONSTITUENT Enter an English sentence the ministers gives a petitions.
    Threshold verlaagd tot 0.9
    (Threshold lowered to 0.9)

CO10
    (VFIN-MAIN PLU3)
```

| | |
|---|---|
| --SUBJ | --NP |
| ----DET | ----ARTICLE - the |
| ----HEAD | ----NOUN - ministers |
| --VFIN-MAIN | --VERB - gives |
| --OBJ | --NP CO9(DET) |
| ----DET | ----ARTICLE - a |
| ----HEAD | ----NOUN - petitions |
| --ENDMARK | --INTERPUNCTION - . |

```
    #S
(CONSTITUENT CATEGORY S COMMAND NIL MEMBERS
    ((ENDMARK #S(WORD CATEGORY INTERPUNCTION COMMAND NIL STRING "."
            FEATURES NIL))
    (OBJ #S(CONSTITUENT CATEGORY NP COMMAND NIL MEMBERS
            ((HEAD #S(WORD CATEGORY NOUN COMMAND NIL STRING
                        "petitions" FEATURES (PLU3)))
            (DET #S(WORD CATEGORY ARTICLE COMMAND NIL STRING "a"
                        FEATURES (INDEFINITE SING3))))
            STACK (HEAD DET) PROB 0.9700000000000002 FEATURES
            (INDEFINITE NO-ADJ) VIOLATIONS CO9 (DET))))
```

```
       (VFIN-MAIN
             #S(WORD CATEGORY VERB COMMAND NIL STRING "gives" FEATURES
                   (SING3 TRANSITIVE)))
       (SUBJ #S(CONSTITUENT CATEGORY NP COMMAND NIL MEMBERS
                   ((HEAD #S(WORD CATEGORY NOUN COMMAND NIL STRING
                                "ministers" FEATURES (PLU3)))
                    (DET #S(WORD CATEGORY ARTICLE COMMAND NIL STRING
                                "the" FEATURES (DEFINITE PLU3 SING3))))
             STACK (HEAD DET) PROB 1 FEATURES
             (DEFINITE PLU3 NO-ADJ) VIOLATIONS NIL)))
STACK (ENDMARK OBJ VFIN-MAIN SUBJ) PROB 0.9312000000000004
FEATURES NIL VIOLATIONS (C010 (VFIN-MAIN PLU3))) - CONSTITUENT
```

Enter an English sentence

He saw the saw that I saw.

```
--SUBJ                  --NP
----HEAD                ----PRO-SUBST - He
--VFIN-MAIN             --VERB - saw
--OBJ                   --NP
----DET                 ----ARTICLE - the
----HEAD                ----NOUN - saw
----NMOD-S              ----S
------OBJ-REL           ------NP-REL
--------HEAD            --------PRO-REL - that
------SUBJ              ------NP
--------HEAD            --------PRO-SUBST - I
------VFIN-MAIN         ------VERB - saw
--ENDMARK               --INTERPUNCTION - .
```

```
#S(CONSTITUENT CATEGORY S COMMAND NIL MEMBERS
       ((ENDMARK #S(WORD CATEGORY INTERPUNCTION COMMAND NIL STRING "."
                   FEATURES NIL))
        (OBJ #S(CONSTITUENT CATEGORY NP COMMAND NIL MEMBERS
                   ((NMOD-S #S(CONSTITUENT CATEGORY S COMMAND NIL
                                MEMBERS
                                ((VFIN-MAIN
```

```
                    #S(WORD CATEGORY VERB COMMAND NIL
                          STRING "saw" FEATURES
                          (TRANSITIVE SING3 PAST)))
               (SUBJ #S(CONSTITUENT CATEGORY NP
                          COMMAND NIL MEMBERS
                          ((HEAD
                                #S(WORD CATEGORY PRO-SUBST
                                   COMMAND NIL STRING "I"
                                   FEATURES
                                   (PRO NOMINATIVE SING3
                                    PERSONAL))))
                          STACK (HEAD) PROB 1 FEATURES
                          (PRO SING3 NO-ADJ
                           NOMINATIVE)
                          VIOLATIONS NIL))
               (OBJ-REL #S(CONSTITUENT CATEGORY
                              NP-REL COMMAND NIL
                              MEMBERS
                              ((HEAD
                                   #S(WORD CATEGORY
                                      PRO-REL COMMAND NIL
                                      STRING "that"
                                      FEATURES
                                      (PRO PLU3 SING3))))
                              STACK (HEAD) PROB 1
                              FEATURES (SING3 PLU3)
                              VIOLATIONS NIL)))
               STACK (VFIN-MAIN SUBJ OBJ-REL) PROB 1
               FEATURES (SING3 PLU3 RELATIVE)
               VIOLATIONS NIL))
          (HEAD #S(WORD CATEGORY NOUN COMMAND NIL STRING "saw"
                     FEATURES (SING3)))
          (DET #S(WORD CATEGORY ARTICLE COMMAND NIL STRING
                     "the" FEATURES (DEFINITE PLU3 SING3))))
          STACK (NMOD-S HEAD DET) PROB 1 FEATURES
          (DEFINITE SING3 NO-ADJ) VIOLATIONS NIL))
     (VFIN-MAIN
```

Dutch Grammar Core

Table A p (adj-inflected adj-not-inflected))
np (definite indefinite neuter inneuter sing1 sing2 sing3
plu1 plu2 plu3 no-adj. adj.-inflected adj-not-inflected))
(conj-np (definite indefinite neuter inneuter))

Table B (artile (np (det)) (pp (det np)) (s (det np)) (s-rel (det
          np)) (s-comp (det n)))
adj 1ap (head)) (np (head ap)) Is (head ap np) (head
          ap-adj))
          (s-rel (head ap np) (head ap-adj))
                    (s-comp (head ap np) (head ap-adj))
                    (ap-adj (head)))
adv (s (head ap-adv)) (s-rel (head ap-adv)) (s-comp (head
ap-adv))) advmod 1ap (mod ap)) (np (mod ap ap)) (s (mod ap
ap np)(mod ap-adj))
          (s-rel (mod ap ap np)(mod ap-adj)) (s-comp (mod
          ap ap np)
          (mod ap-adj)))
p-word (np (head pp)) (pp (head)) (s (head pp)
          (vfinparticle))
          (s-rel (head pp)(vfinparticle)) (s-comp (head
          pp) (vfin-particle)))
(c-word (s (comp s-comp)))
(noun (np (head)) (pp (head np)) (s (head np)) (s-rel
          (head np)) (s-comp (head)))
(pro-subst (np (head)) (pp (head np)) Is (head np)) (s-rel
          (head np)) (s-comp (head np)))
(pro-rel (np (head np s-rel)))
(pro-adj (np (det)) (pp (det np)) (s (det np)) (s-rel (det
          np)) (s-comp (det np)))

(verb (s (vfin-main)) (s-rel (vfin-main)) (s-comp
    (vfin-main)))
(verb-intr.    (s($V_{fin}$intr))    (s-rel($V_{Fin}$-intr))
(s-comp($V_{fin}$-intr)))
(interpunction (s (endmark)))

Table C np (det nmod-a) head)
pp () pobj)
ap (mod) )
(ap-adj (mod) head)
(ap-adv (mod) head)
(s () fnp)
(s-rel (fnp) vfin-main)
(s-comp (fnp) vfin-main)
(conj-s (seq))
(conj-pp (seq))
(conj-ap (seq))
(conj-s-rel (seq))

Table D (ap (head( adj-inflected adj-not-inflected))
    (amod( adj-inflected adj-not-inflected)))
np (det (neuter inneuter sing1 sing2 sing3 plu1 plu2 plu3
    definite indefinite))
    (head(  sing1 sing2 sing3 plu1 plu2 plu3 neuter
    inneuter))
    (nmod-a(adj.-inflected no-adj. adj.-not-inflected)))

Table E

```
(s    ((fnp    fnp)(smod    smod)   (smod    fnp)    (fnp
smod)(vfin-particle fnp)
        (vfin-particle)(fnp vfin-particle vfin-main fnp)
        (fnp vfin-particle fnp vfin-main fnp) )
        ((vfin-main 1) (fnp 3) (V_fin-intr fnp 1)))
(s-rel () () ((vfin-main 1) (fnp 3) (V_fin-intr fnp 1)))
(s-comp () () ((vfin-main 1) (fnp 3)(V_fin-intr fnp 1)))
(np ((head head)) ((det head) (nmod-a head)
        (head nmod-s) (det nmod-s)) ((det 1) (head 1)
        (nmod-a 1)))
(pp ((head head) (head head pobj head)) () ((pobj 1)))
```

Table F

```
np ((neuter inneuter) (sing1 sing2 sing3 plu1 plu2 plu3))
    ((definite adj-inflected) (plu3 adj-inflected)
    (inneuter adj-inflected)
    (neuter indefinite adj-not-inflected)))
```

Table G

```
(np (conj-np conj) (pp pobj) (s fnp) (s-rel fnp) (s-comp
    fnp))
(conj-np (pp pobj) (s fnp) (s-rel fnp) (s-comp fnp))
(ap (ap amod) (np nmod-a) (s smod) (s-rel smod) (conj-ap
    conj) (s-comp smod))
(conj-ap (ap amod) (np nmod-a) (s smod) (s-rel smod)
    (s-comp smod))
(ap-adj (s fnp) (s-rel fnp) (s-comp fnp))
(ap-adv (s smod) (s-rel smod) (s-comp smod))
(pp (np nmod-p) (s smod) (s-rel smod) (conj-pp conj)
    (s-comp conj))
(conj-pp (np nmod-p) (s smod) (s-rel smod) (s-comp smod))
```

```
(s (conj-s conj))
(s-comp (s fnp))
(s-rel (np nmod-s) (conj-s-rel conj))
(conj-s-rel (np nmod-s))
```

Table H

```
((fnp vfin-main endmark) (subj))
((fnp vfin-main smod endmark) (subj))
((smod vfin-main fnp endmark) (subj))
((smod vfin-main fnp smod endmark) (subj))
((vfin-main fnp endmark) (obj))
((vfin-main fnp smod endmark) (obj))

((fnp vfin-main fnp endmark) (subj obj) (obj subj))
((fnp vfin-main smod fnp endmark) (subj obj))
((smod vfin-main fnp fnp endmark) (subj obj))
((fnp-vfin-main fnp smod endmark) (subj obj) (obj subj))
((vfin-main fnp fnp endmark) (indobj obj))
((vfin-main fnp smod fnp endmark) (indobj obj))
((vfin-main fnp fnp smod endmark) (indobj obj))
((vfin-main smod fnp fnp endmark) (indobj obj))
((fnp vfin-main fnp smod smod endmark) (subj obj) (obj
subj))
((fnp vfin-main smod fnp smod endmark) (subj obj));etc ((fnp vfin-main fnp fnp endmark) (subj indobj obj)
          (indobj subj obj)(obj subj indobj))
((fnp vfin-main smod fnp fnp endmark) (subj indobj obj))
((smod vfin-main fnp fnp fnp endmark) (subj indobj obj))
((fnp vfin-main fnp smod fnp endmark) (subj indobj obj)
          (indobj subj obj)(obj subj indobj))
((fnp vfin-main fnp fnp smod endmark) (subj indobj obj)
          (indobj subj obj)(obj subj indobj));etc ((fnp vfin-main) (subj))
((fnp fnp vfin-main) (subj obj))
((fnp fnp fnp vfin-main) (subj indobj obj))
```

Table I

```
(s ((subj vfin-main) (sing3 sing2 sing1 plu3 plu2 plu1))
    ((subj) (nominative definite indefinite proper))
    ((obj) (not-nominative definite indefinite proper))
    ((indobj)  (not-nominative   definite   indefinite
    proper)))

(s-rel
    ((subj vfin-main) (sing3 sing2 sing1 plu3 plu2 plu1))
    ((subj-rel vfin-main)  (sing3  plu3 sing1 sing2 plu1
    plu2))
    ((subj) (nominative definite indefinite proper))
    ((obj) (not-nominative definite indefinite proper))
    ((indobj)   (not-nominative   definite   indefinite
    proper)))

s-comp
    ((subj vfin-main) (sing3 sing2 sing1 plu3 plu2 plu1))
    ((subj) (nominative definite indefinite proper))
    ((obj) (not-nominative definite indefinite proper))
    ((indobj)   (not-nominative   definite   indefinite
    proper)))
```

Table K

```
(np ((plu3 proper pro) (det) ()) ((sing3 definite) ()
(det))
    ((definite indefinite) () (nmod-a nmod-s))
    ((definite   indefinite   adj-inflected   adj-not
    inflected) () (det)))
```

Table L

```
(np (head det nmod-s nmod-a))
(ap-adj (head))
```

English Grammar Core

Table A (ap ( ))
(np (definite indefinite male female neutral  sing1  sing2 sing3 plu1 plu2 plu3))
(conj-np (definite indefinite))
(S-rel (male  female  neutral sing1 sing2 sing3 plu1 plu2 plu3))

Table B (artitle  (np (det)) (pp (det np)) (s (det np))
    (s-rel (det np)) (s-comp (det n)))
(adj 1ap (head)) (np (head ap)) (s (head ap np)
    (head ap-adj)) (s-rel (head ap np) (head ap-adj))
        (s-comp (head ap np) (head ap-adj)) (ap-adj
        (head)))
(adv (s (head ap-adv)) (s-rel (head ap-adv))
    (s-comp (head ap-adv)))
(advmod (ap (mod ap)) (np (mod ap ap)) (s (mod ap ap np) (mod ap-adj))
    (s-rel (mod ap ap np) (mod ap-adj)) (s-comp (mod ap ap np) (mod ap-adj)))
(p-word (np (head pp)) (pp (head)) (s (head pp) (vfin-particle))
        (s-rel (head pp)(vfin-particle)) (s-comp (head pp) (vfin-particle)))
(c-word (s (comp s-comp)))
(noun (np (head)) (pp (head np)) (s (head np)) (s-rel (head np))
    (s-comp (head)))
(pro-subst (np (head)) (pp (head np)) (s (head np)) (s-rel (head np))
    (s-comp (head np)))

```
(pro-rel (np (head np-rel s-rel)))
(pro-adj (np (det)) (pp (det np)) (s (det np)) (s-rel (det np))
    (s-comp (det np)))
(verb (s  (vfin-main))  (s-rel  (vfin-main))  (s-comp (vfin-main)))
(verb-intr.       (s($V_{fin}$-intr))       (srel($V_{fin}$intr))
(s-comp($V_{fin}$-intr)))
(interpunction (s (endmark)))
```

Table C

```
(np (det nmod-al head)
(pp () pobj)
(ap (mod) )
(ap-adj (mod) head)
(ap-adv (mod) head)
(s () fnp)
(s-rel (fnp) vfin-main)
(s-comp (fnp) vfin-main)
(conj-s (seq))
(conj-pp (seq))
(conj-ap (seq))
(conj-s-rel (seq))
```

Table D

```
(ap (head( ))
    (amod( )))
(np (det (male female neutral sing1 sing2 sing3 plu1 plu2
    plu3 definite indefinite))
    (head (sing1 sing2 sing3 plu1 plu2 plu3))
    (nmod-s (male female neutral)))
(S-rel (fnp-rel (sing1 sing2 sing3 plu1 plu2 plu3 male
    female neutral))
    (subj-rel (sing1 sing2 sing3 plu1 plu2 plu3 male
    female neutral)))
```

Table E

```
(s (smod smod) (smod fnp) (fnp smod) (vfin-particle fnp)
    (vfin-particle)(fnp vfin-particle vfin-main fnp)
    (fnp vfin-particle fnp vfin-main fnp))
    () ((vfin-main 1) (fnp 3) (V_{fin}-intr fnp 1)))
(s-rel () () ((vfin-main 1) (fnp 3) (V_{fin}-intr fnp 1)))
(s-comp () () ((vfin-main 1) (fnp 3) (V_{fin}-intr fnp 1)))
(np ((head head)) ((det head) (nmod-a head)
    (head   nmod-s)  (det nmod-s))  ((det  1)  (head  1)
    (nmod-a 1)))
(pp ((head head) (head head pobj head)) (1 ((pobj 1)))
```

Table F

```
(np ((male female neutral) (sing1 sing2 sing3 plu1 plu2
    plu3)
    ( ()))
(np-rel (s-rel fnp-rel))
(np (conj-np conj) (pp pobj) (s fnp) (s-rel  fnp)  (s-comp
fnp))
(conj-np (pp pobj) (s fnp) (s-rel fnp) (s-comp fnp))
(ap (ap amod) (np nmod-a) (s smod) (s-rel smod)
    (conj-ap conj) (s-comp smod))
(conj-ap (ap amod) (np nmod-a) (s smod) (s-rel smod)
    (s-comp smod))
(ap-adj (s fnp) (s-rel fnp) (s-comp fnp))
(ap-adv (s smod) (s-rel smod) (s-comp smod))
(pp (np nmod-p) (s smod) (s-rel smod) (conj-pp conj)
    (s-comp conj))
(conj-pp (np nmod-p) (s smod) (s-rel smod) (s-comp smod))
(s (conj-s conj))
(s-comp (s smod))
(s-rel (np nmod-s) (conj-s-rel conj))
conj-s-rel (np nmod-s))
```

Table H

```
((fnp vfin-main endmark) (subj))
((fnp vfin-main smod endmark) (subj))
((smod vfin-main fnp endmark) (subj))
((smod vfin-main fnp smod endmark) (subj))
((vfin-main fnp endmark) (obj))
((vfin-main fnp smod endmark) (obj))
((fnp vfin-main fnp endmark) (subj obj))

((fnp fnp vfin-mairi endmark) (obj subj))
((fnp vfin-main smod fnp endmark) (subj obj))
((fnp vfin-main fnp smod endmark) (subj obj))
((vfin-main fnp fnp endmark) (indobj obj))
((vfin-main fnp smod fnp endmark) (indobj obj))
((vfin-main fnp fnp smod endmark) (indobj obj))
((fnp vfin-main fnp smod smod endmark) (subj obj))
((fnp vfin-main smod fnp smod endmark) (subj obj));etc ((fnp fnp vfin-main fnp endmark)
        (indobj subj obj) (obj subj indobj))
((fnp vfin-main smod fnp fnp endmark) (subj indobj obj))
((smod vfin-main fnp fnp fnp endmark) (subj indobj obj))
((fnp vfin-main fnp smod fnp endmark) (subj indobj obj))
((fnp vfin-main fnp fnp smod endmark)
        (subj indobj obj));etc ((fnp-rel vfin-main) (subj-rel))
((fnp-rel fnp vfin-main) (subj-rel obj))
((fnp-rel fnp fnp vfin-main) (subj-rel indobj obj))
```

Table I

```
(s ((subj vfin-main) (sing3 sing2 sing1 plu3 plu2 plu1))
    ((subj) (nominative definite indefinite proper))
    ((obj) (not-nominative definite indefinite proper))
    ((indobj)   (not-nominative  definite  indefinite
    proper)))
```

```
(s-rel
    ((subj vfin-main) (sing3 sing2 sing1 plu3 plu2 plu1))
    ((subj-rel vfin-main) (sing3 plu3  sing1  sing2  plu1
    plu2))

((subj) (nominative definite indefinite proper))
    ((obj) (not-nominative definite indefinite proper))
    ((indobj)   (not-nominative   definite   indefinite
    proper)))
(s-comp
    ((subj vfin-main) (sing3 sing2 sing1 plu3 plu2 plu1))
    ((subj) (nominative definite indefinite proper))
    ((obj) (not-nominative definite indefinite proper))
    ((indobj)   (not-nominative   definite   indefinite
    proper)))
```

Table K

```
(np ((plu3  proper  pro)  (det)   ()) ((sing3 definite) ()
(det))
    ((definite indefinite) () (nmod-a nmod-s))
    ((definite indefinite () (det)))
```

Table L

```
(np (head det nmod-s rimod-a))
(ap-adj (head))
```

What is claimed is:

1. A computer method for grammatically processing a natural language sentence made up of word units using processing means comprising the steps of:
   a. Lexicalizing each of said word units in accordance with verbal categories and application directed categories registered in a lexical memory, for storing the lexicalized word units in a word memory;
   b. Parsing said lexicalized word units read out from said word memory to provide at least one sentence representation for storing in a sentence representation memory for storing in a sentence representation memory, and including the steps of generating at least one constituent structure having functional indications from said word units, each of said sentence representations having associated therewith a probability factor and
      a) determining successively for each word unit supplied by the word memory and for each constituent supplied by the sentence representation memory and allocated with a constituted category the functional word category belonging to that word unit within the structure of said constituent by reference to grammar data list in a grammar data memory and concerning said verbal category of said word unit and the category of said constituent for updating or supplementing the respective sentence representations,
      b) describing for each constituent supplied by sentence representation memory and allocated with a category of a parent constituent, said parent constituent dominating said constituent, a closure process for said constituent based upon grammar data entered in the grammar data memory and concerning the category of said constituent and said parent constituent and (ii) allocating a functional label that can be provisional to said constituent to be closed by said closure process; and
      c) testing the interrelation between the words and constituents of said parent constituent as to functional categories of said words and said constituents during at least step b) (i) or b) (ii) against rules stored in said grammar data memory and based upon syntax and changing said probability factor if an error is detected and selecting each sentence representation having a probability factor above a preselected threshold value.

2. A method of grammatically processing a natural language sentence according to claim 1, wherein said determination of said functional category for each word unit and each constituent includes the step of referring to said functional category of any preceding word unit.

3. A method of grammatically processing a natural language sentence according to claim 1, including the step of
   d) replacing an allocated provisional functional label of each constituent closed by said closure process by a final functional label based upon grammar from the grammar data memory.

4. A method of grammatically processing a natural language sentence according to claim 3, including the step of: (e) revaluating the probability factor assigned to the sentence representation in which a provisional functional label has been replaced by a final functional label and selection of the sentence representation having the highest probability factor.

5. A method of grammatically processing a natural language sentence according to claim 1, in which said selection of each sentence representation having a probability factor above said preselected threshold value, includes the steps of:
   (i) examining whether a sentence representation having a probability factor above said preselected threshold value is present;
   (ii) lowering the threshold value to another preselected threshold value after establishing the absence of a sentence representation having a probability factor above said preselected threshold value, and
   (iii) repeating the steps pertaining to said method of grammatically processing a natural language sentence.

6. A method of grammatically processing a natural language sentence according to claim 1, wherein said method includes determining for each word unit, each word structure relating to said word unit, and, successively, each constituent generated the functional word category of said word unit within said constituent or the constituent to be generated.

7. A method of grammatically processing a natural language sentence according to claim 6, wherein after determining for all the word structures of said word unit, the respective functional word category within the constituent or constituent to be generated, the description of a step relating to closure of the constituent is executed.

8. A method of grammatically processing a natural language sentence according to claim 6, wherein after each step of determining, for each word structure relating to a word unit, of the functional word category within the constituent or constituent to be generated, the description of a step relating to closure of the constituent is executed.

9. A method of grammatically processing a natural language sentence according to claim 1, which method is characterised by determining, for each word unit, each word structure relating to said word unit, and each constituent made, successively, the functional word category within the constituent or constituent to be generated and by describing a step relating to the closure of the constituent.

10. A method of grammatically processing a natural language sentence, according to claim 1, wherein for each word unit, each constituent made and, successively, each word structure relating to said word unit, the functional word category within said constituent or the constituent to be generated is determined.

11. A method of grammatically processing a natural language sentence, according to claim 10, wherein after determining for all the constituents the functional word category within said constituent or constituent to be generated, describing said process relating to closure of the constituent.

12. A method of grammatically processing a natural language sentence, according to claim 10, wherein after each determination for each constituent, of said functional word category within said constituent or constituent to be generated, describing a process relating to closure of the constituent.

13. A method of grammatically processing a natural language sentence, according to claim 1, wherein for each word unit, each constituent made and each word structure relating to said word unit, successively, the functional word category within the constituent or constituent to be generated is determined and by describing a process relating to closure of the constituent.

14. A method of grammatically processing a natural language sentence, according to claim 1, wherein said step of determining said functional category comprise the steps of:
  a. Selecting from the grammar data memory information relating to the functional label to be assigned to the word unit by reference to information relating to the word structure and that of the constituent presented;
  b. Adding said word unit with the selected functional label to the presented constituent;
  c. Searching each constituent for the presence of incorrect combinations, incorrect sequence, and incorrect number of the assigned functional label; and
  d. Testing the probability factor associated with said constituent against the preselected threshold value.

15. A method of grammatically processing a natural language sentence, according to claim 1, including, with reference to the description of a process relating to closure of the constituent, the following steps:
  a. Determining the functional label for a constituent by means of the category of said constituent and that of any of the parent constituent of said constituent by referring to the grammar data memory;
  b. Searching whether the last word unit added to the constituent is suitable to function on the basis of said functional label assigned to said word unit, as an end element within said constituent;
  c. (i) Searching to determine whether the constituent satisfies the grammar rule stored in the grammar data memory and relating to a minimum number of necessarily occurring elements by referring to said functional labels assigned to said word units within said constituent, and, (ii) is necessary, revaluating the probability factor assigned to said constituent; and
  d. Testing the probability factor associated with said constituent against the applicable preselected threshold value.

16. A method of grammatically processing a natural language sentence, according to claim 1, whereby the probability factor assigned to the respective sentence representation is revaluated, including the step of selecting the grammatically incorrect constituent within said sentence and then changing said incorrect constituent by referring to regulations based on grammar rules.

17. A processing means for grammatically processing a natural language sentence, characterized in that said means comprises:
  a. Means for determining successively, for each word unit supplied by a word memory and for each constituent supplied by the sentence representation memory, the functional word category for that word unit within the constituent or within a constituent which is to be generated, by reference to grammar data concerning the verbal category of the relevant word unit and the category of said constituent said grammar data being available in a grammar data memory;
  b. Means for describing, for each constituent from said sentence presentation memory by reference to grammar data available in the grammar data memory and concerning the category of the constituent and the category of the constituent dominating the said constituent, a step relating to closure of the constituent, and allocating a functional label, which may be provisional, to the constituent to be closed by said closure process; and
  c. Means for testing of a current constituent from said sentence presentation memory against regulations available in the grammar data memory and, based on syntax rules, concerning the interrelation between the words and/or constituents within said constituent as to their functional categories in at least one of the two steps a) and b) and, if necessary, revaluating a probability factor assigned to the sentence representation, and selecting each sentence representation whose probability factor is above a certain threshold value.

18. A means for grammatically processing a natural language sentence, according to claim 17, wherein said processing means for selecting the grammatically incorrect constituent within the sentence and then changing this constituent by reference to regulations based on said syntax rules.

* * * * *